United States Patent [19]
Aritake et al.

[11] Patent Number: 6,061,083
[45] Date of Patent: May 9, 2000

[54] STEREOSCOPIC IMAGE DISPLAY METHOD, MULTI-VIEWPOINT IMAGE CAPTURING METHOD, MULTI-VIEWPOINT IMAGE PROCESSING METHOD, STEREOSCOPIC IMAGE DISPLAY DEVICE, MULTI-VIEWPOINT IMAGE CAPTURING DEVICE AND MULTI-VIEWPOINT IMAGE PROCESSING DEVICE

[75] Inventors: Hirokazu Aritake; Manabu Ishimoto; Junji Tomita; Satoshi Maeda; Takahiro Matsuda; Masato Nakashima; Satoshi Iwata; Yusaku Fujii, all of Kawasaki, Japan

[73] Assignee: Fujitsu Limited, Kawasaki, Japan

[21] Appl. No.: 08/845,174

[22] Filed: Apr. 21, 1997

[30] Foreign Application Priority Data

Apr. 22, 1996 [JP] Japan .................................. 8-100445

[51] Int. Cl.⁷ .................................................. H04N 13/04
[52] U.S. Cl. ............................................. 348/51; 348/42
[58] Field of Search .................................. 348/42, 46–59; 352/58; 359/462–464, 466; H04N 7/18, 13/00, 13/04

[56] References Cited

U.S. PATENT DOCUMENTS

| | | | |
|---|---|---|---|
| 4,717,949 | 1/1988 | Eichenlaub | 348/54 |
| 4,740,073 | 4/1988 | Meacham | 352/58 |
| 4,807,965 | 2/1989 | Garakani | 359/466 |
| 4,829,365 | 5/1989 | Eichenlaub | 348/42 |
| 4,853,769 | 8/1989 | Kollin | 348/42 |
| 4,987,487 | 1/1991 | Ichinose et al. | 348/59 |
| 5,311,220 | 5/1994 | Eichenlaub | 348/55 |
| 5,457,574 | 10/1995 | Eichenlaub | 359/462 |
| 5,465,175 | 11/1995 | Woodgate et al. | 359/463 |
| 5,510,832 | 4/1996 | Garcia | 348/51 |

FOREIGN PATENT DOCUMENTS

| | | |
|---|---|---|
| 0 354 851 | 2/1990 | European Pat. Off. . |
| 0 650 301 | 4/1995 | European Pat. Off. . |

*Primary Examiner*—Richard Lee
*Attorney, Agent, or Firm*—Staas & Halsey LLP

[57] ABSTRACT

Images of an object are taken from a plurality of angles so as to generate two-dimensional images obtained from the plurality of angles. The two-dimensional images are sequentially displayed in the form of stripes by a displaying device. The two-dimensional images displayed by the displaying device are deflected by a parallel scanning part by a deflection angle dependent on the individual two-dimensional images and supplied to respective virtual apertures.

48 Claims, 60 Drawing Sheets

FIG.2A
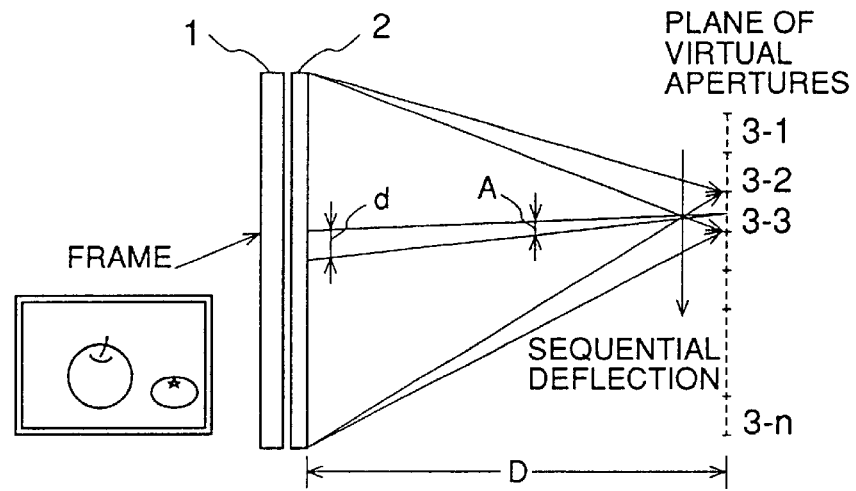
FIG. 2B
FIG.3A
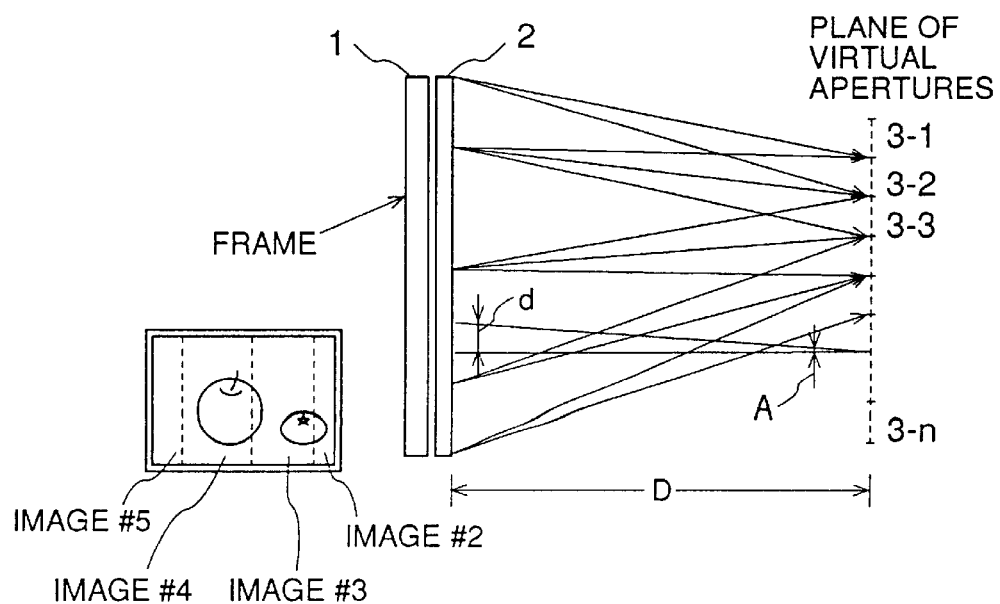
FIG. 3B

FIG. 4A
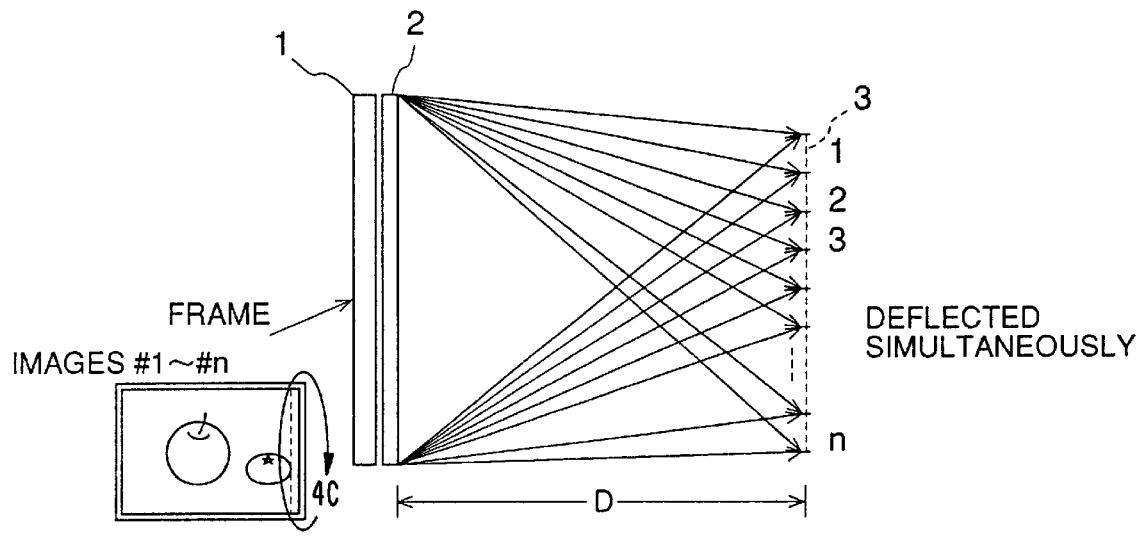
FIG. 4B
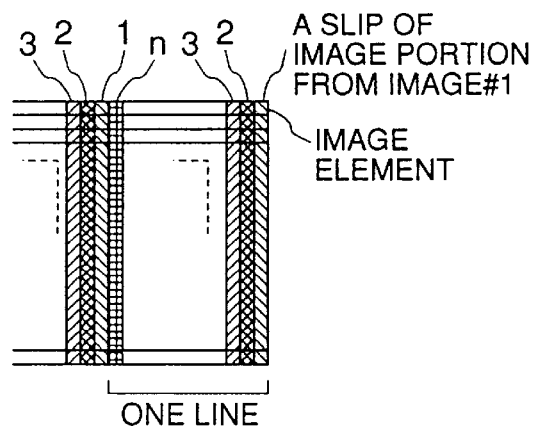
FIG. 4C

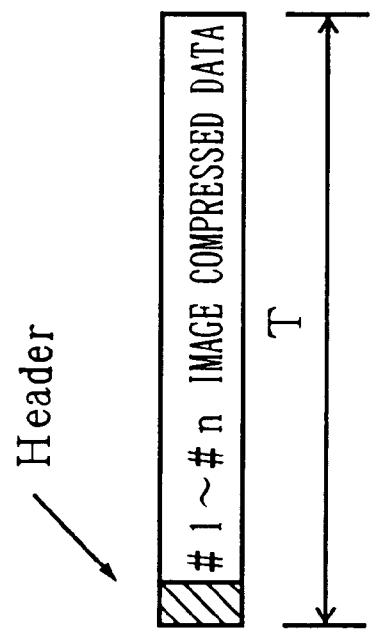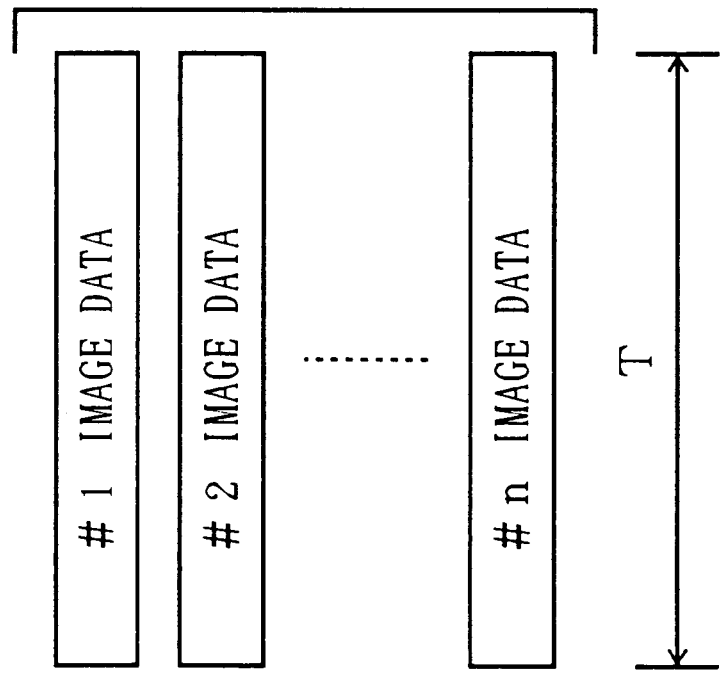

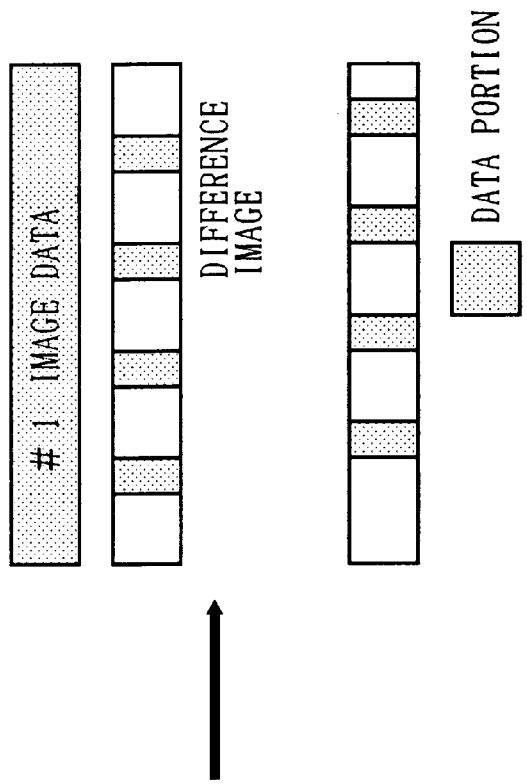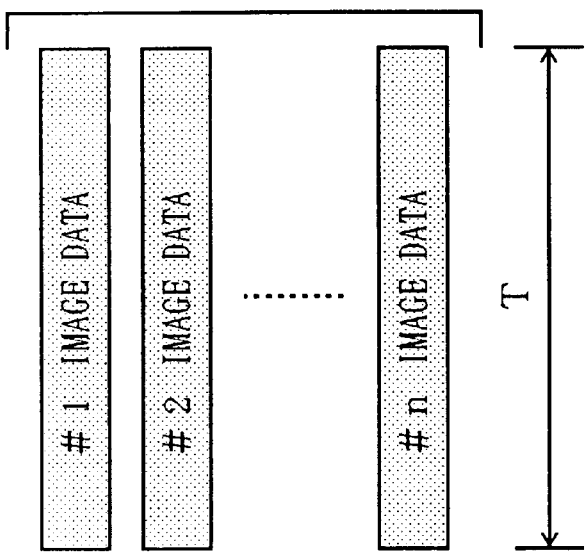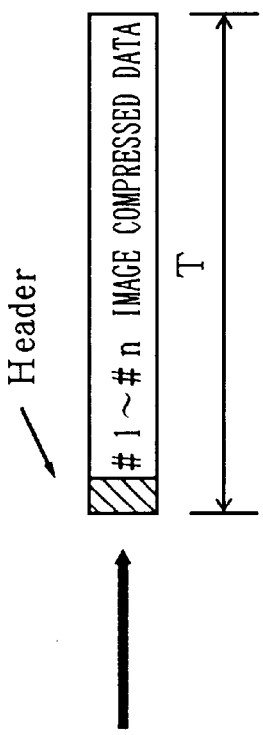

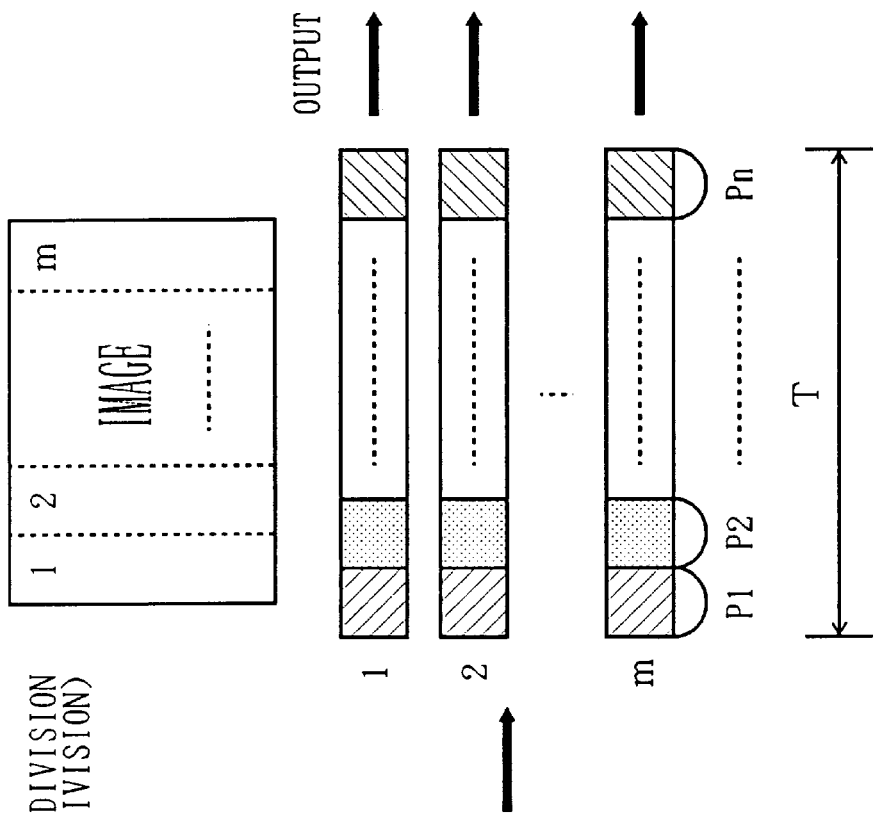
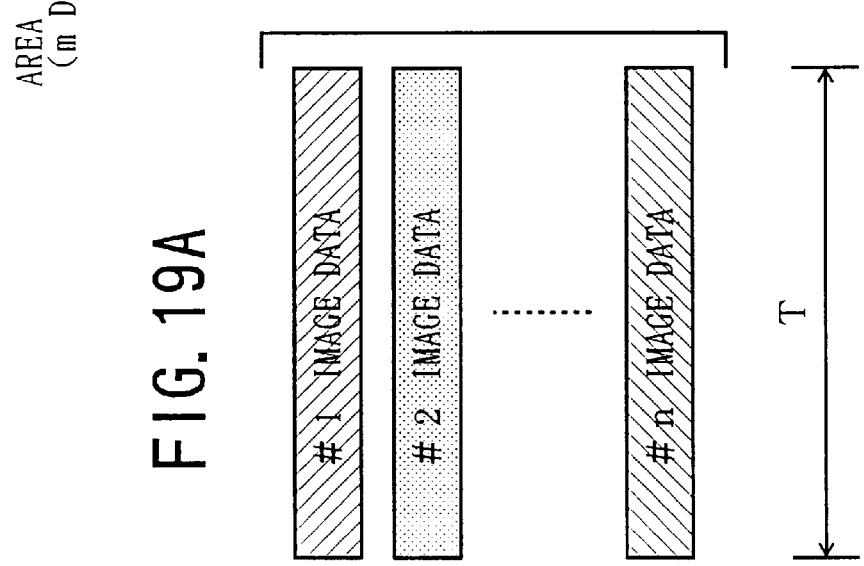

FIG.32C
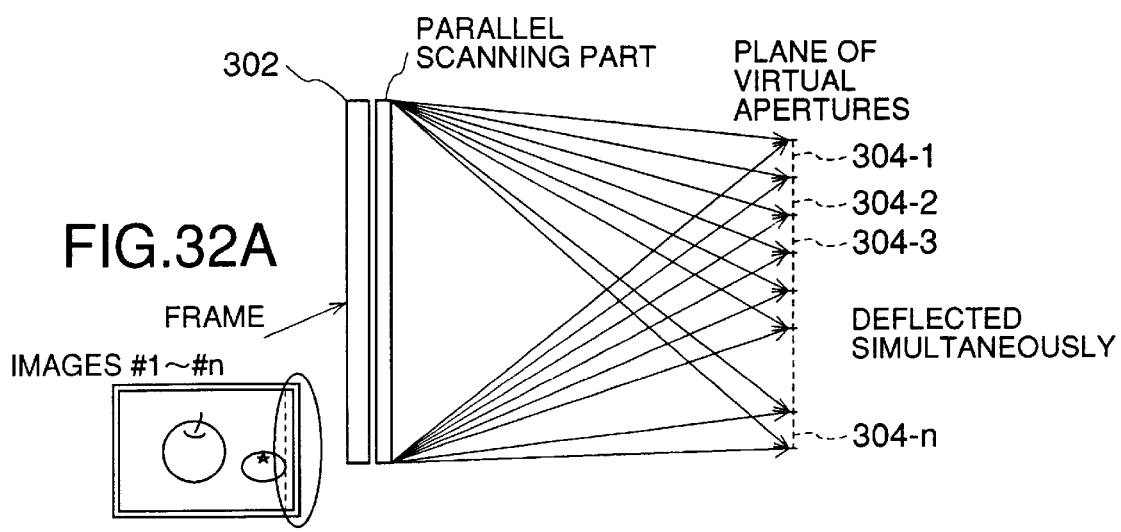
FIG.32A
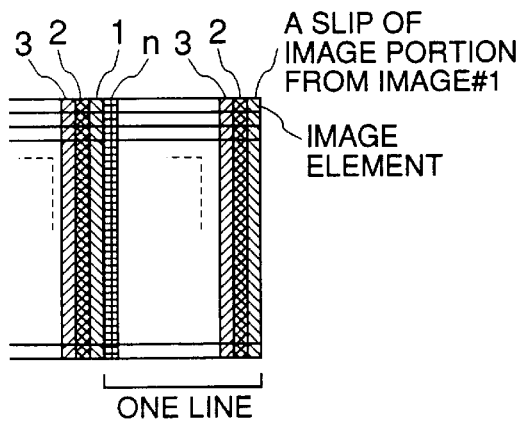
FIG.32B

LC-STRIPE SHUTTER
(PIXEL SIZE)

LC-MATRIX SHUTTER
(PIXEL SIZE)

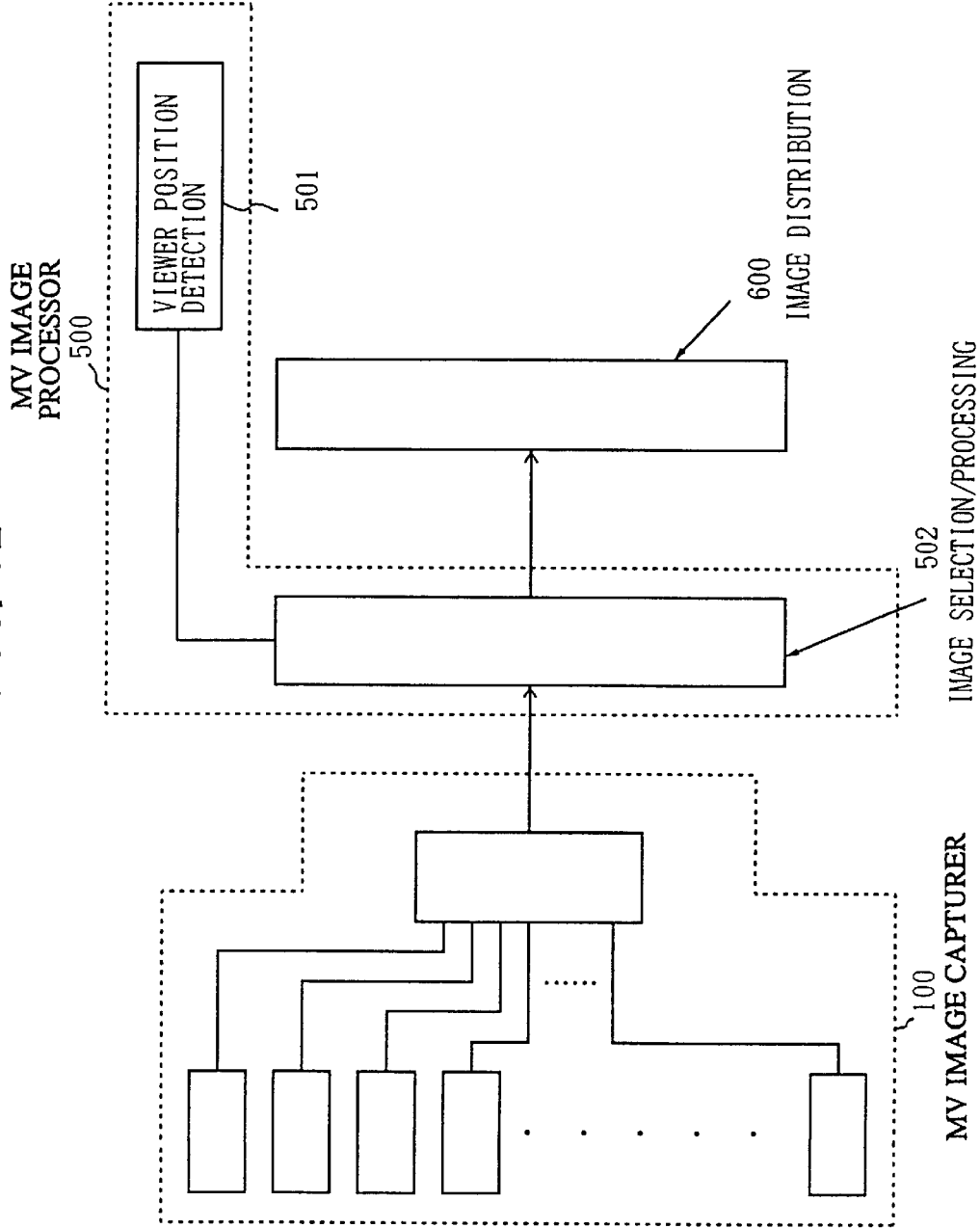

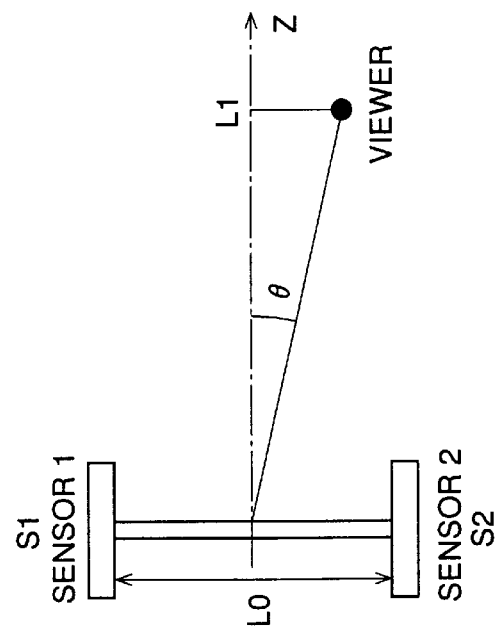
FIG.55C
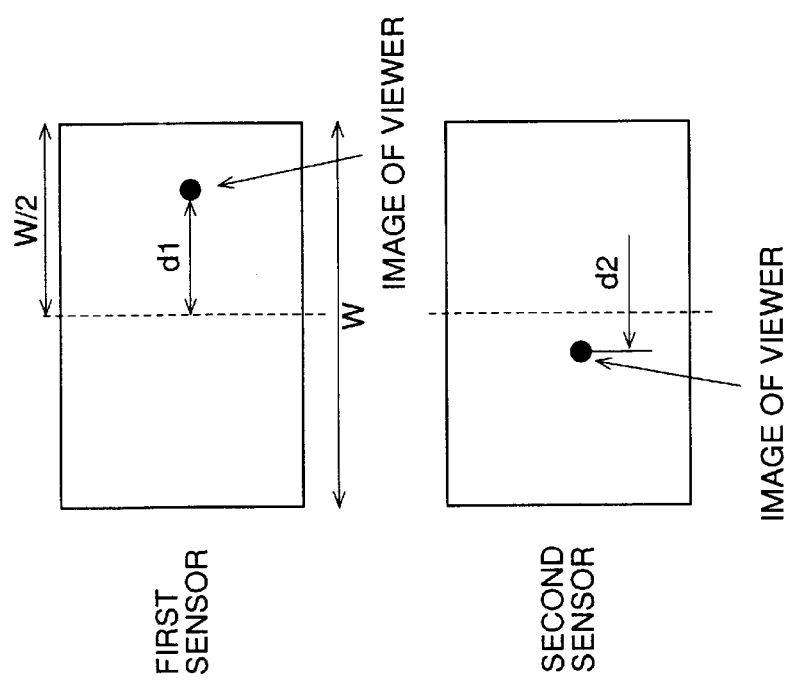
FIG.55A
FIG.55B

L+R SYNTHESIS #(R+L)

EXAMPLE OF SYNTHESIS

DISPLAYED IMAGE #R

DISPLAYED IMAGE #L

RECONSTRUCTION

MULTI-VIEWPOINT IMAGE DATA (FOR SELECTED AREAS)

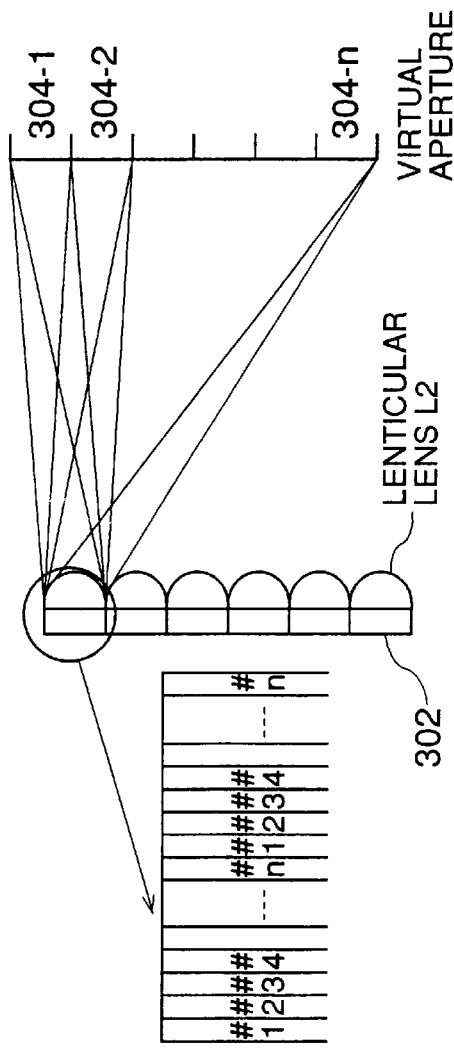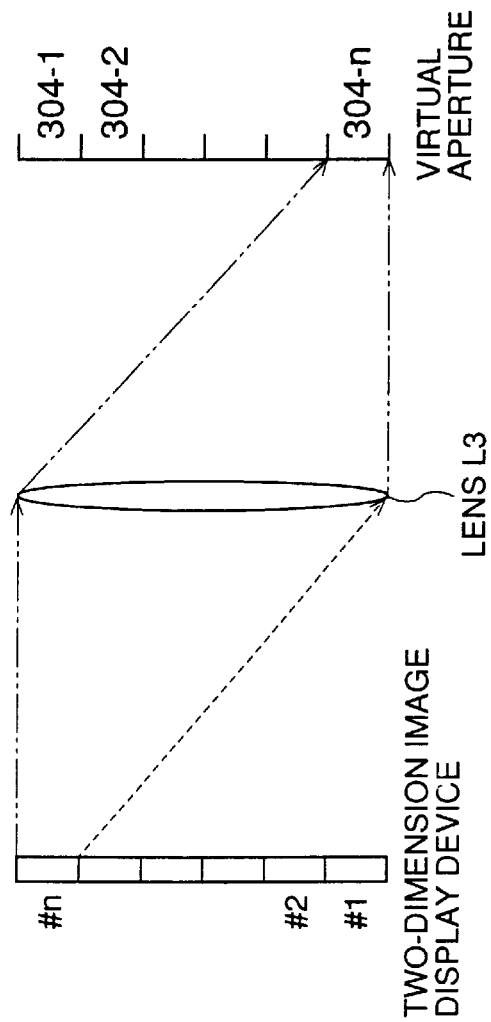
FIG.63A
FIG.63B

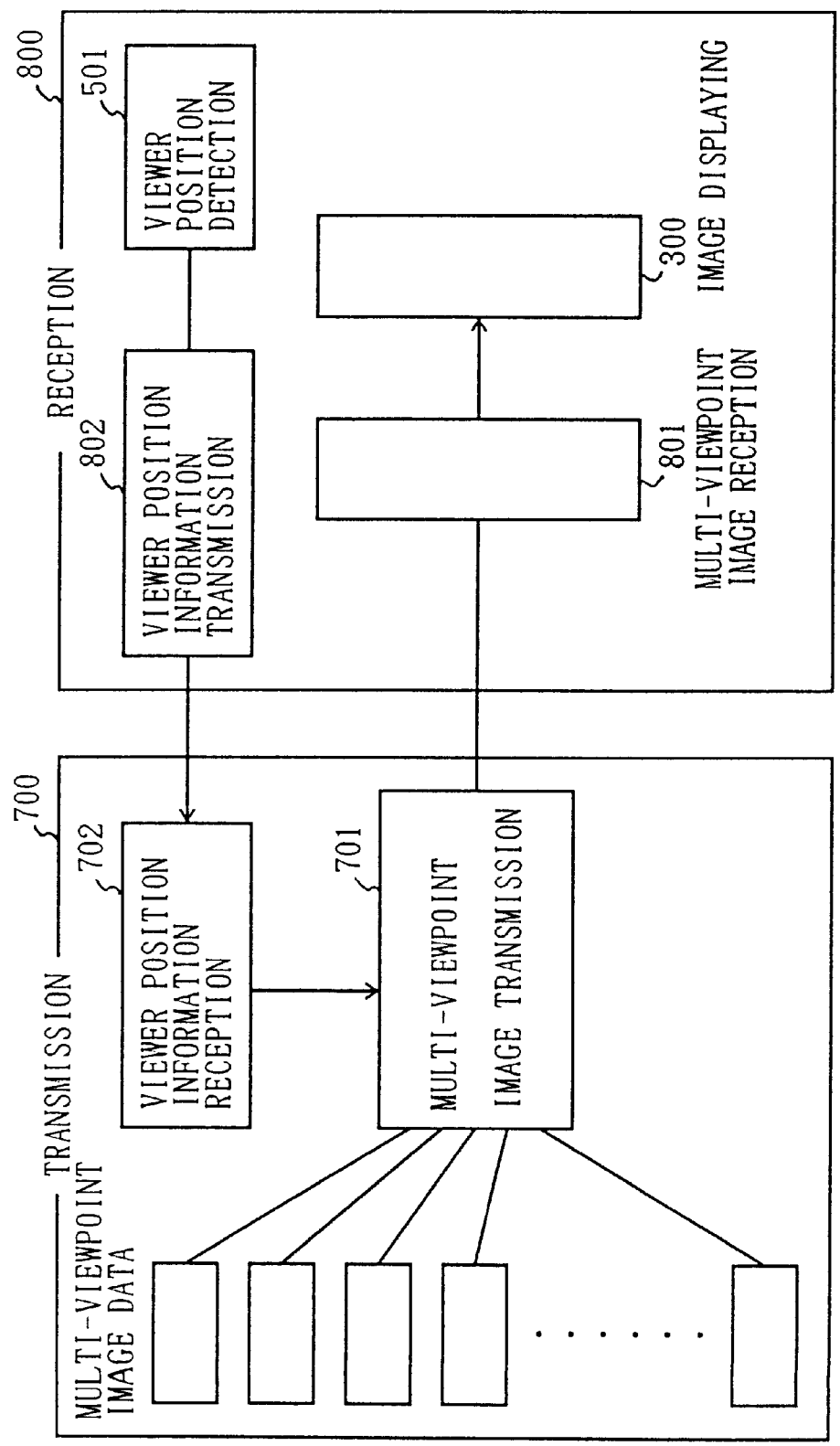

STEREOSCOPIC IMAGE DISPLAY METHOD, MULTI-VIEWPOINT IMAGE CAPTURING METHOD, MULTI-VIEWPOINT IMAGE PROCESSING METHOD, STEREOSCOPIC IMAGE DISPLAY DEVICE, MULTI-VIEWPOINT IMAGE CAPTURING DEVICE AND MULTI-VIEWPOINT IMAGE PROCESSING DEVICE

BACKGROUND OF THE INVENTION

1. Field of the Invention

The present invention relates to stereoscopic image display methods, multi-viewpoint image capturing methods, multi-viewpoint image processing methods, stereoscopic image display devices, multi-viewpoint image capturing devices and multi-viewpoint image processing devices, and, more particularly, to a stereoscopic image display method, a multi-viewpoint image capturing method, a multi-viewpoint image processing method, a stereoscopic image display device, a multi-viewpoint image capturing device and a multi-viewpoint image processing device in which a relatively large field of view is provided and different viewpoints provide different angles of view in stereoscopic images displayed.

Recently, stereoscopic image display devices for displaying stereoscopic images on a two-dimensional display device are actively being developed. Stereoscopic image display devices that use a lenticular lens system or a parallax barrier system are already available in the market.

The stereoscopic image display devices currently available display stereoscopic images viewed from a predetermined angle. It is desired that a stereoscopic image display device provides different angles of view depending on different viewpoints so that objects are displayed in a natural manner.

2. Description of the Related Art

FIG. 1 is a schematic diagram showing a construction of a conventional stereoscopic image display device 1.

The stereoscopic image display device 1 comprises two cameras 3 and 4 for taking an image of an object 2 from respective angles and supplying the taken image to a display unit 5. The display unit 5 alternately displays an image #1 supplied by the camera 3 and an image #2 supplied by the camera 4. The image displayed on the display unit 5 is distributed by an image distributing unit 6 for deflecting the image using a lenticular lens or a parallax barrier.

As indicated by the solid line in FIG. 1, the image #1 taken by the camera 3 is deflected so as to be directed to a right eye 7a of a viewer 7 and, as indicated by the broken line, the image #2 taken by the camera 4 is deflected so as to be directed to a left eye 7b of the viewer 7. A parallax is produced between the image directed to the right eye 7a and the image directed to the left eye 7b. Accordingly, the viewer 7 is able to perceive a stereoscopic image.

As has been described, the conventional stereoscopic image display device displays right and left images from the two cameras on the display unit. The image distributing unit coupled to the display unit and embodied by a lenticular lens or the like distributes the right and left images to the right and left eyes, respectively. The stereoscopic binocular vision results. However, a visible range in which the stereoscopic vision is available is limited. When the viewer moves his or her head right or left, the eyes can easily leave the visible range, resulting in a failure to obtain stereoscopic vision. Also, the eyes may move to the front or the rear only a limited distance to maintain stereoscopic vision. Further, the stereoscopic image remains unchanged even when the viewpoint is shifted, causing an impression that the display is unnatural.

SUMMARY OF THE INVENTION

Accordingly, a general object of the present invention is to provide a stereoscopic image display method and a stereoscopic image display device in which the aforementioned problems are eliminated.

Another and more specific object of the present invention is to provide a stereoscopic image display method and a stereoscopic image display device in which a relatively large field of view is provided and different viewpoints provide different angles of view in stereoscopic images displayed.

FIGS. 2 through 4 show operating principles of the present invention. FIG. 2 shows a principle of a stereoscopic image display method using a single-image display; FIG. 3 using a composite-image display; and FIG. 4 using a synthesized-image display. In FIGS. 2 through 4, 1 indicates a plane of display, 2 indicates a plane of projection and 3 indicates a plane of virtual apertures.

The plane of display 1 is a plane on which an image is displayed. The plane of projection 2 is a plane on which the image is apparently formed from the viewpoint of the viewer. The plane of virtual apertures 3 is a plane closest to the plane of projection 2 in a range in which stereoscopic vision is available.

A plurality of virtual apertures 3-1–3-$n$ are provided on the plane of virtual apertures 3. Given that there is a distance D between the plane of virtual apertures 3 and the plane of projection 2, an interval d exists between image elements on the plane of projection 2, and the viewer has a resolution of A, the distance D and the interval d are set such that $$d/D < \tan A. \qquad (1\text{-}1)$$

According to the stereoscopic image display method using the single-image display shown in FIG. 2, a plurality of two-dimensional images taken of an object from a plurality of angles are displayed sequentially, that is, one after another, on the plane of display 1. The two-dimensional images displayed on the plane of display 1 are directed, by deflection, to respective ones of the plurality of virtual apertures 3-1-3-$n$, the deflection occurring on the plane of projection 2. For example, a first image #1 is directed to the virtual aperture 3-1, a second image #2 is directed to the virtual aperture 3-2, a third image #3 is directed to the virtual aperture 3-3, . . . , and an nth image is directed to the virtual aperture 3-$n$.

Accordingly, images involving a parallax are formed on the plurality of virtual apertures 3-1–3-$n$ on the plane of virtual apertures 3.

According to the stereoscopic image display method using the composite-image display shown in FIG. 3, a composite image formed of image portions derived from a plurality of images is displayed on the plane of display 1. The image displayed on the plane of display 1 is divided on the plane of projection 2 into individual images so that each individual image is directed, by deflection, to respective ones of the plurality of virtual apertures 3-1–3-$n$. For example, the image #2 is directed to the virtual apertures 3-2 and 3-3; the image #3 is directed to the virtual apertures 3-2, 3-3 and 3-4; the image #4 is directed to the virtual apertures 3-3, 3-4 and 3-5; and the image #5 is directed to the virtual apertures 3-4 and 3-5.

Accordingly, images involving a parallax are formed on the plurality of virtual apertures 3-1–3-n on the plane of virtual apertures.

According to the stereoscopic image display method using the synthesized-image display shown in FIG. 4, a synthesized image produced by alternately arranging slips of image portions derived from a plurality of two-dimensional images is displayed on the plane of display 1. The image displayed on the plane of display 1 is deflected on the plane of projection 2 and directed to the plane of virtual apertures 3 such that the slips of image portions derived from a given two-dimensional image are deflected as a group. Accordingly, the image #1 is directed to the virtual aperture 3-1, the image #2 is directed to the virtual aperture 3-2, the image #3 is directed to the virtual aperture 3-3, . . . , and the image #n is directed to the virtual aperture 3-n.

Accordingly, images involving a parallax are formed on the plurality of virtual apertures 3-1–3-n on the plane of virtual apertures.

BRIEF DESCRIPTION OF THE DRAWINGS

Other objects and further features of the present invention will be apparent from the following detailed description when read in conjunction with the accompanying drawing, in which:

FIG. 2 shows a principle of a stereoscopic image display method using a single-image display;

FIG. 3 shows a principle of a stereoscopic image display method using a composite-image display;

FIG. 4 shows a principle of a stereoscopic image display method using a synthesized-image display;

FIG. 13A shows digital video data D1–Dn supplied by the multi-viewpoint captured image buffer;

FIG. 13B shows how compressed data is synthesized;

FIG. 16A shows a total of n digital video data;

FIG. 16B shows how difference images derived from the n digital video data with reference to reference digital video data D1 are obtained;

FIG. 16C shows synthesized data including a header and compressed data derived from the n digital video data;

FIG. 19A shows the digital video data supplied from the multi-viewpoint output buffer to the speed converting part in a parallel manner;

FIG. 19B shows how each of the digital video data supplied to the speed converting part is horizontally divided into m individual data;

FIG. 19C shows how one of the digital video data is output simultaneously as m sets of divided data;

FIGS. 32A–32C show an operating principle of the image distributing part according to the first embodiment;

FIG. 52 shows a schematic construction of a stereoscopic image display device according to a second embodiment of the present invention;

FIGS. 55A, 55B and 55C depict an operation of the comparing/calculating circuit;

FIGS. 63A and 63B depict alternative methods of deflection;

FIG. 64 is a block diagram showing a third embodiment of the present invention.

DESCRIPTION OF THE PREFERRED EMBODIMENTS

Figure 1:
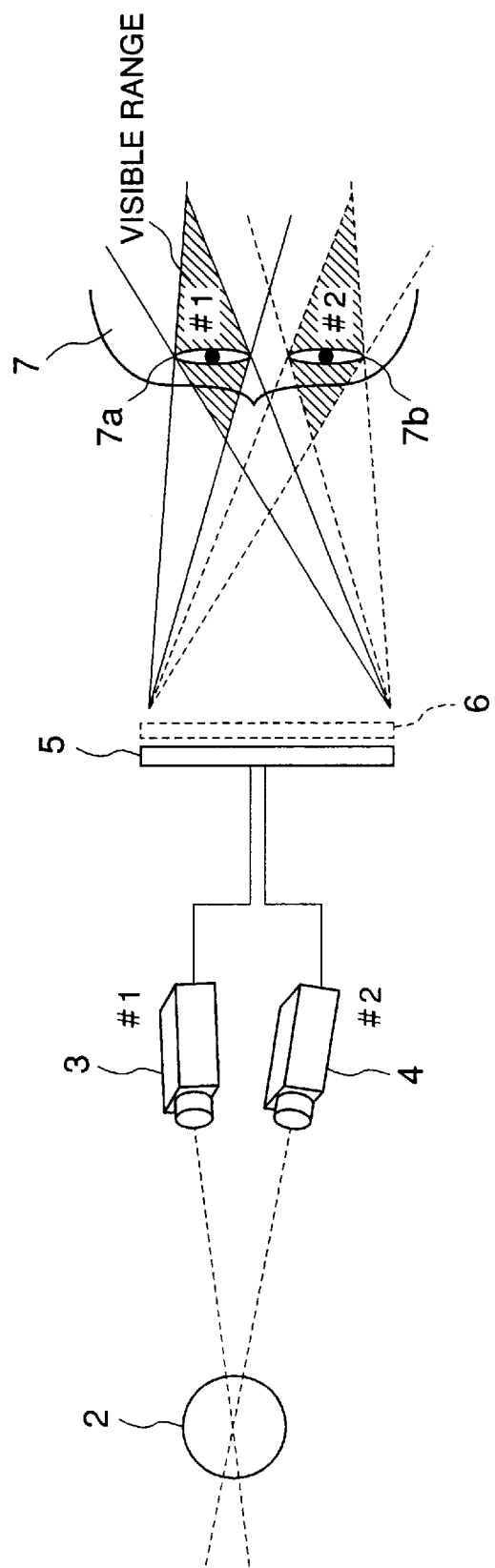
FIG. 1 is a schematic diagram showing a construction of a conventional stereoscopic image display device.
Figure 5:
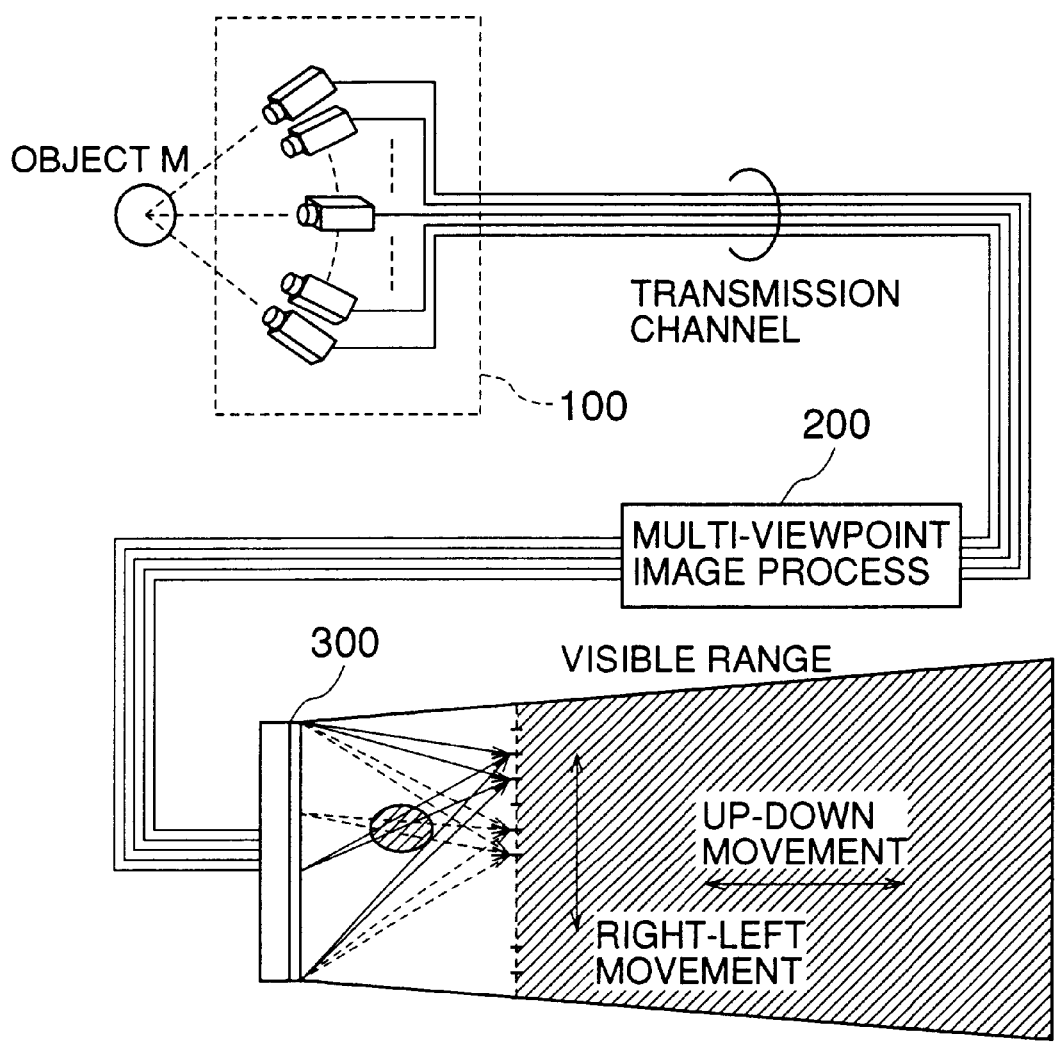
FIG. 5 is a block diagram showing a stereoscopic image display device according to a first embodiment of the present invention.

FIG. 5 is a block diagram showing a stereoscopic image display device 10 according to a first embodiment of the present invention.

The stereoscopic image display device 10 comprises a multi-viewpoint image capturing part 100 for capturing multi-viewpoint images of an object M from a plurality of angles for the purpose of forming a stereoscopic image; a multi-viewpoint image processing part 200 for compressing and storing the multi-viewpoint image captured by the multi-viewpoint image capturing part 100 and for decompressing the compressed and stored image so as to reproduce the multi-viewpoint image; and an image distributing part 300 for forming and distributing a stereoscopic image from the multi-viewpoint image processed in the multi-viewpoint image processing part 200.

A plurality of image signals relating to multi-viewpoint images taken of the object M from a plurality of angles are produced in the multi-viewpoint image capturing part 100 (MV IMAGE CAPTURE). The plurality of image signals are supplied to the multi-viewpoint image processing part 200.

The multi-viewpoint image processing part 200 compresses the plurality of image signals and also decompresses the compressed image signals so as to reproduce the multi-viewpoint images. The reproduced multi-viewpoint images are supplied to the image distributing part 300.

The image distributing part 300 causes the multi-viewpoint images supplied by the multi-viewpoint image processing part 200 to be displayed on respective ones of a plurality of fine virtual apertures.

Figure 6:
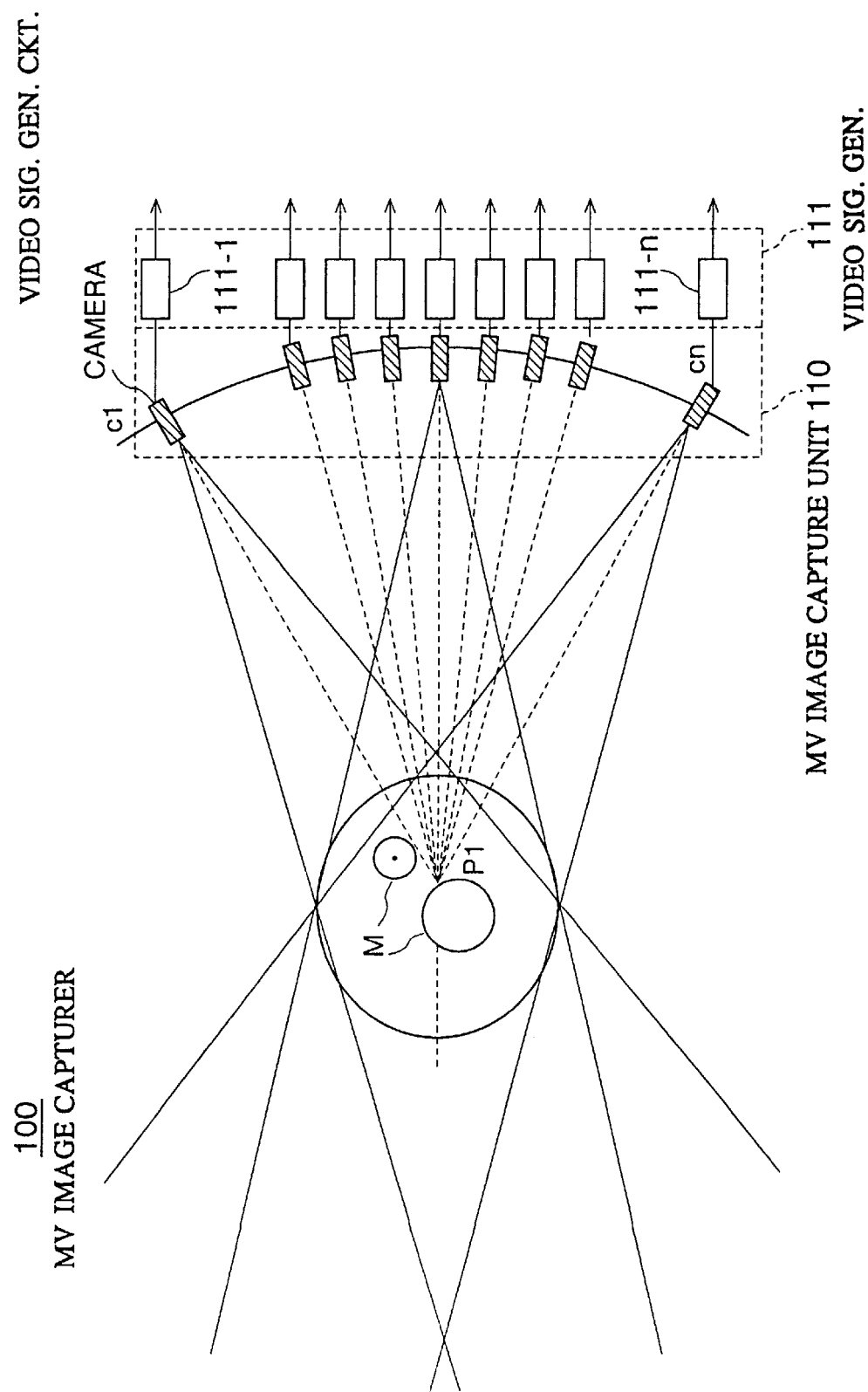
FIG. 6 shows a construction of a multi-viewpoint image capturing part according to the first embodiment.

FIG. 6 shows a construction of the multi-viewpoint image capturing part 100 according to the first embodiment.

The multi-viewpoint image capturing part 100 (Video Sign Gen) according to the first embodiment comprises a multi-viewpoint image capturing unit 110 for taking a plurality of images of the object M from a plurality of angles, and a video signal generating circuit part 111 for converting electric signals produced in the multi-viewpoint image capturing unit 110 into video signals.

The multi-viewpoint image capturing unit 110 comprises a total of n video cameras c1–cn arrayed on a circle around the object M. The optical axes of the video cameras c1–cn are made to cross each other at the point P1. The video cameras c1–cn take images of the object from a total of n different angles and convert taken images into electrical signals. The electric signals generated in the multi-viewpoint image capturing unit 110 are supplied to the video signal generating circuit part 111 (VIDEO SIG. CKTS).

The video signal generating circuit part 111 comprises a total of n video signal generating circuits (VIDEO SIG. GEN. CKTS) 111-1–111-$n$ provided for the video cameras c1–cn, respectively. The video signal generating circuit part 111 converts the electric signals generated in the video cameras c1–cn into video signals and supplies the same to the multi-viewpoint image processing part 200.

The video signals necessary to form stereoscopic images are generated according to the above-described arrangement.

Figure 7:
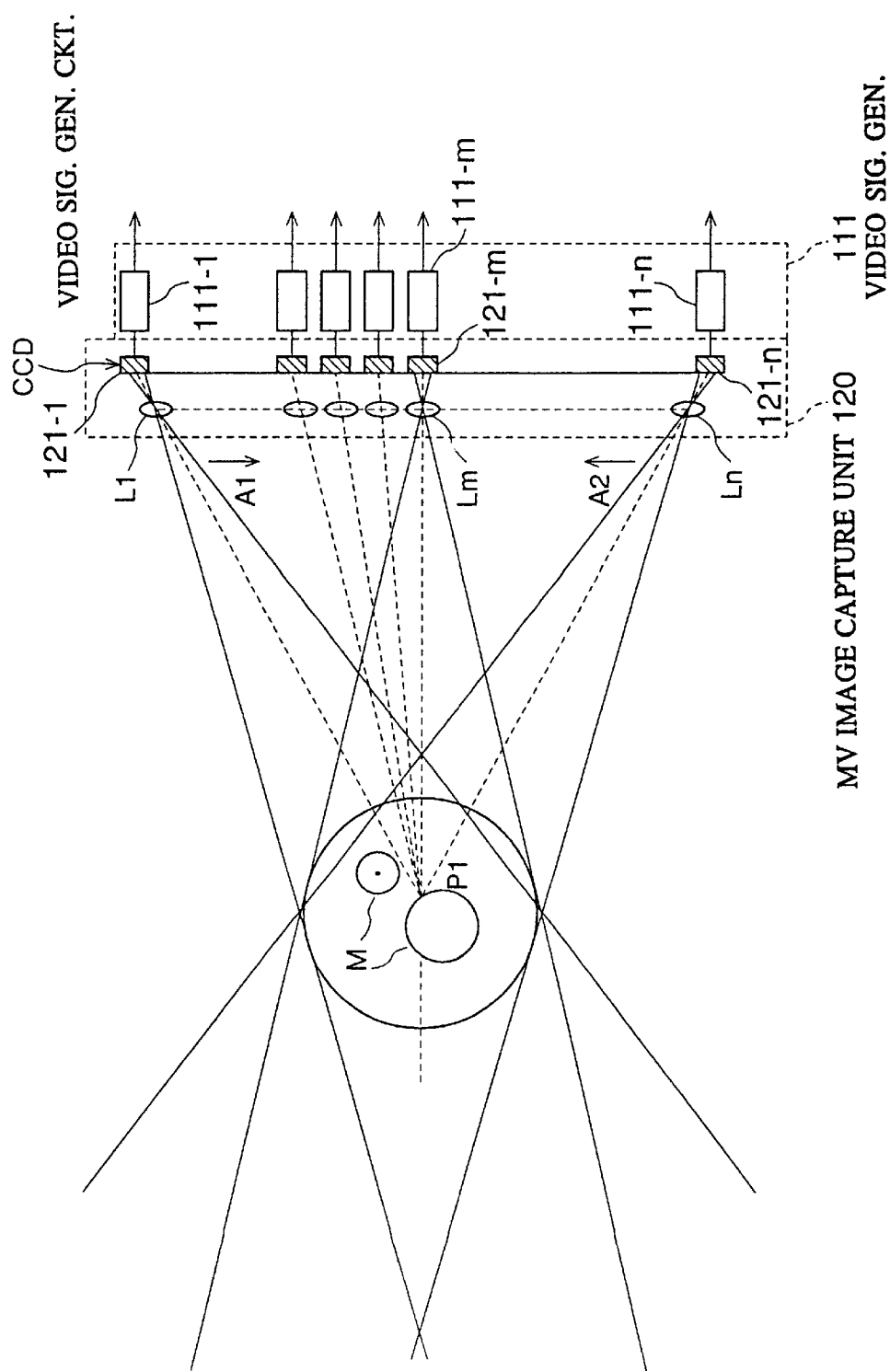
FIG. 7 shows a construction of a first variation of the multi-viewpoint image capturing part according to the first embodiment.

FIG. 7 shows a construction of a first variation of the multi-viewpoint image capturing part according to the first embodiment. In FIG. 7, those components that are the same as the components of FIG. 6 are designated by the same reference numerals, and the description thereof is omitted.

The construction of the multi-viewpoint image capturing part of the first variation differs from the multi-viewpoint image capturing part 100. Referring to FIG. 7, a multi-viewpoint image capturing unit (MV IMAGE CAPTURE UNIT) 120 of the first variation comprises a total of n charge coupled devices (CCD) 121-1–121-n for converting images taken of the object M into electric signals, and a total of n lenses L1–Ln for causing images of the object M to be incident on the CCDs 121-1–121-n, respectively. The CCDs 121-1–121-n are substantially arrayed on a straight line such that the axes perpendicular to the light-intercepting surfaces of the CCDs 121-1–121-n are parallel with each other.

The lenses L1–Ln are substantially arrayed on a straight line to cause the images taken of the object M from different angles to be incident on the CCDs 121-1–121-n, respectively. The lens Lm that corresponds to the CCD 121-m at the center is disposed such that the light-intercepting surfaces of the lens Lm and the CCD 121-m are aligned with each other. The lens L1 that corresponds to the CCD 121-1 at one end is disposed such that the lens L1 is displaced from the light-intercepting surface of the CCD 121-1 in the A1 direction indicated by the arrow. The lens Ln that corresponds to the CCD 121-n at the other end is disposed such that the lens Ln is displaced from the light-intercepting surface of the CCD 121-n in the A2 direction indicated by the arrow.

The lenses L1–Ln, except for the lens Lm at the center, are displaced from the light-intercepting surface of the CCDs 121-1–121-n, respectively in the A1 direction or in the A2 direction. In this way, the optical axes of the CCDs 121-1–121-n are made to cross each other at a point.

While the multi-viewpoint image capturing parts described above are designed to process images actually taken of the object M for the purpose of producing the stereoscopic image, the multi-viewpoint image capturing part may also process artificially produced three-dimensional computer graphics (CG) images.

Figure 8:
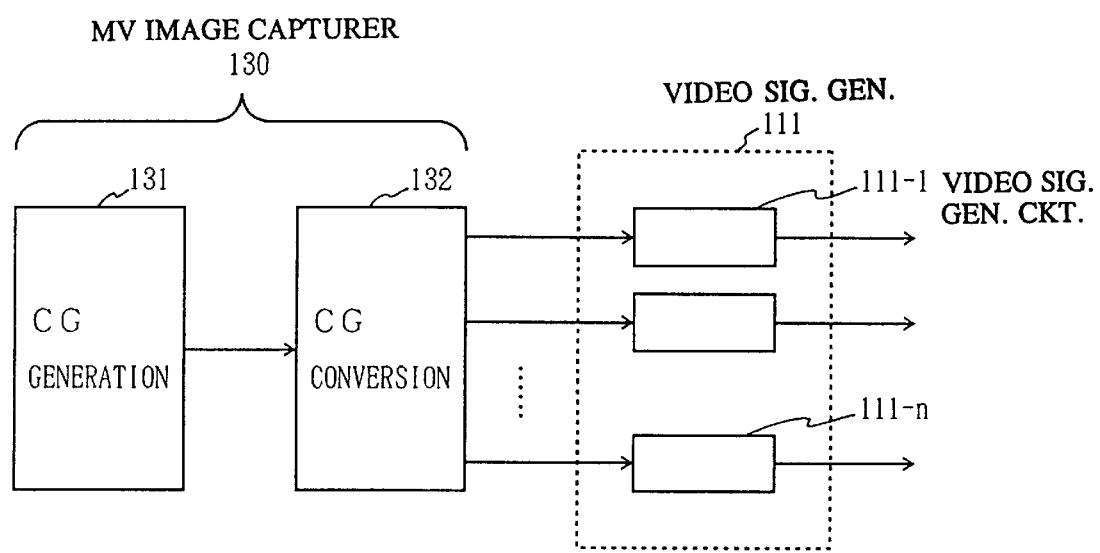
FIG. 8 shows a construction of a second variation of the multi-viewpoint image capturing part according to the first embodiment.

FIG. 8 shows a construction of a second variation of the multi-viewpoint image capturing part according to the first embodiment. In FIG. 8, those components that are the same as the components of FIG. 6 are designated by the same reference numerals, and the description thereof is omitted.

The construction of the multi-viewpoint image capturing part of the second variation differs from the corresponding constructions shown in FIGS. 6 and 7. Referring to FIG. 8, a multi-viewpoint image capturing unit 130 of the second variation comprises a CG generating part 131 for generating three-dimensional CG images, and a CG converting part 132 for generating a total of n two-dimensional images taken of the three-dimensional CG images from a total of n different angles.

The CG generating part 131 generates three-dimensional CG images and supplies the same to the CG converting part 132. The CG converting part 132 generates a total of n two-dimensional images taken of the three-dimensional CG images, supplied by the CG generating part 131, from a total of n angles. The CG converting part 132 outputs the n two-dimensional images independently. The n two-dimensional images output by the CG converting part 132 are supplied to the video signal generating circuit part 111 and converted into video signals by the video signal generating circuits 111-1–111-n in the video signal generating circuit part 111. The resultant video signals are supplied to the multi-viewpoint image processing part 200.

Figure 9:
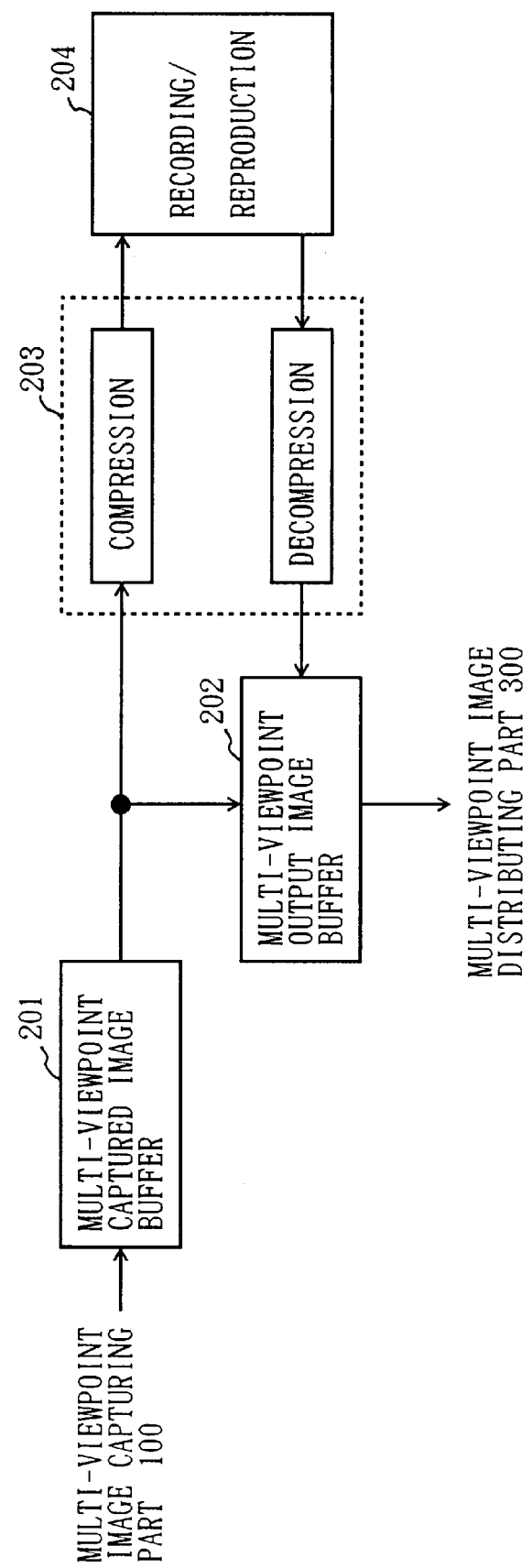
FIG. 9 is a block diagram showing a construction of a multi-viewpoint image processing part according to the first embodiment.

FIG. 9 is a block diagram showing a construction of the multi-viewpoint image processing part 200.

The multi-viewpoint image processing part 200 comprises a multi-viewpoint captured image buffer 201 for storing the multi-viewpoint image obtained in the multi-viewpoint image capturing part 100, a multi-viewpoint output image buffer 202 for temporarily storing the multi-viewpoint image to be supplied to the multi-viewpoint image distributing part 300, a compressing/decompressing part 203 for compressing and decompressing the multi-viewpoint image, and a recording/reproducing part 204 for recording the multi-viewpoint image compressed by the compressing/decompressing part 203 and for reproducing the compressed and recorded multi-viewpoint image.

The multi-viewpoint captured image buffer 201 stores a total of n images supplied from the multi-viewpoint image capturing part 100. The n images stored in the multi-viewpoint captured image buffer 201 are output one after another in the order that they are stored. The image to be recorded is supplied to the compressing/decompressing part 203. The image to be displayed is supplied to the multi-viewpoint output image buffer 202. The multi-viewpoint image processing part 200 is provided with a function allowing a viewer to select a portion of the captured image that needs to be displayed so that the amount of information processed is reduced.

Figure 10:
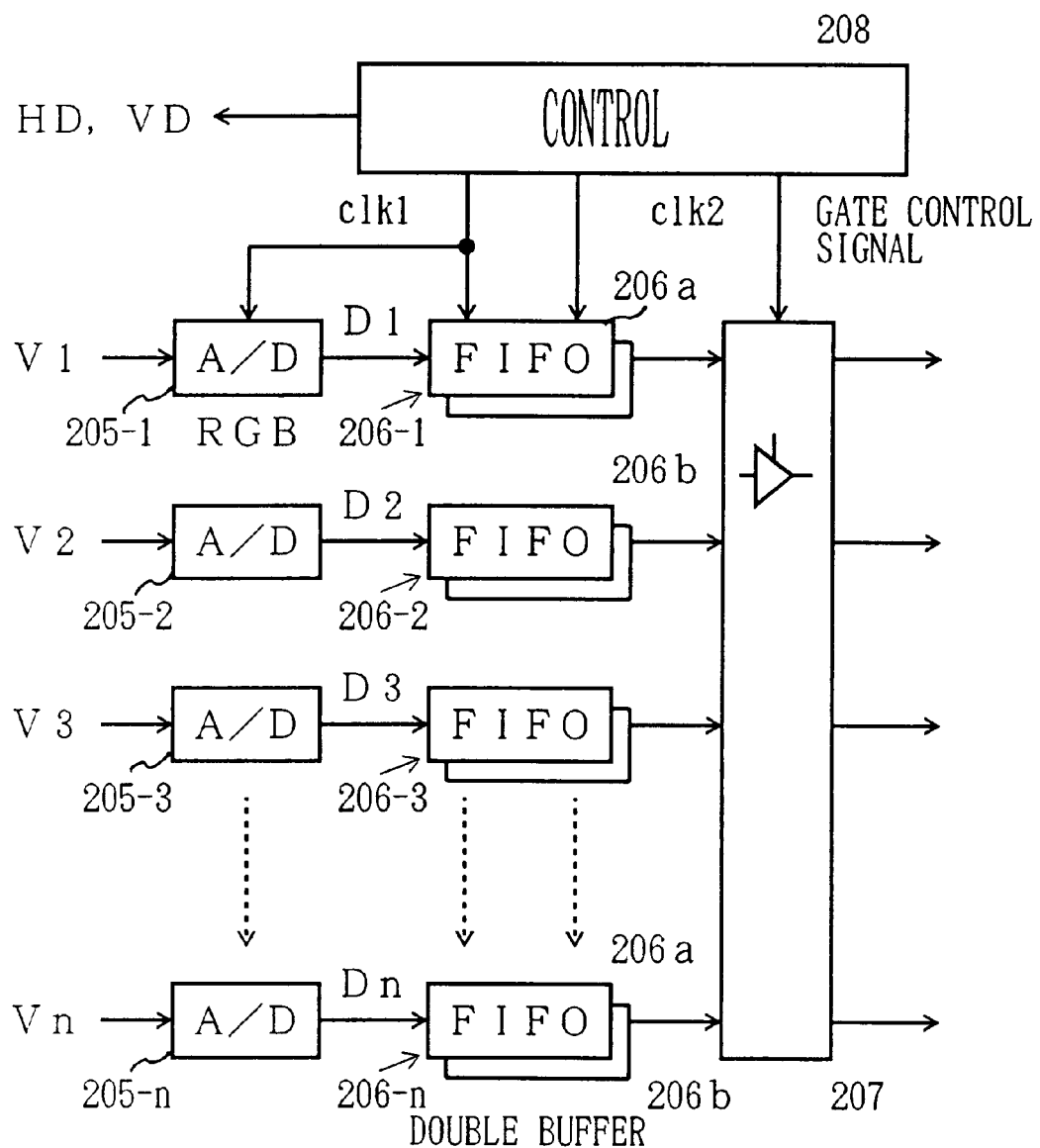
FIG. 10 is a block diagram showing a construction of a multi-viewpoint captured image buffer according to the first embodiment.

FIG. 10 is a block diagram showing a construction of the multi-viewpoint captured image buffer 201.

The multi-viewpoint captured image buffer 201 comprises a total of n analog-digital (A/D) converters 205-1–205-n for converting a total of n video signals V1–Vn, respectively, supplied from the multi-viewpoint image capturing part 100 into digital video data D1–Dn, respectively; a total of n buffer memories 206-1–206-n for storing the digital video data D1–Dn, respectively; a gate circuit 207 for selectively outputting data corresponding to a designated area and selected from the digital video data D1–Dn stored in the n buffer memories 206-1–206-n, respectively; and a control circuit 208 for timing the conversion by the n A/D converters 205-1–205-n, for timing writing data to the n buffer memories 206-1–206-n and reading data therefrom, and for controlling selection of an area by the gate circuit 207.

The n A/D converters 205-1–205-n are supplied by the control circuit 208 with a clock CLK1 synchronized with a horizontal synchronizing signal HD so that the conversion of the video signals V1–Vn into the digital video data D1–Dn, respectively, is timed according to the horizontal synchronizing signal HD. Each of the n buffer memories 206-1–206-n is a double buffer memory composed of a pair of FIFO (first-in first-out) memories 206a and 206b.

The buffer memories 206-1–206-n are supplied by the control circuit 208 with the clock CLK1 synchronized with the horizontal synchronizing signal HD and a clock CLK2 synchronized with a vertical synchronizing signal VD. Writing digital video data D1–Dn to the two FIFO memories 206a and 206b and reading digital video data D1–Dn therefrom are timed according to the horizontal synchronizing signal HD.

Switching between a writing operation and a reading operation in the FIFO memories 206a and 206b is performed according to the clock CLK2 synchronized with the vertical synchronizing signal VD. The digital video data D1–Dn for one frame is written, then the digital video data D1–Dn is read. An interlace signal is converted into a non-interlace signal such that, when the digital video data D1–Dn is written in one of the FIFO memories according to the clock CLK2, the digital video data D1–Dn is read from the other of the FIFO memories.

The digital video data D1–Dn read from the buffer memories 206-1–206-$n$ are supplied to the gate circuit 207. The gate circuit 207 is supplied by the control circuit 208 with a gate control signal. Data for a desired image area is output by passing the digital video data D1–Dn read from the buffer memories 206-1–206-$n$ through the gate circuit 207.

The FIFO memories 206$a$ and 206$b$ may be embodied by a dual-port memory or the like.

Figure 11:
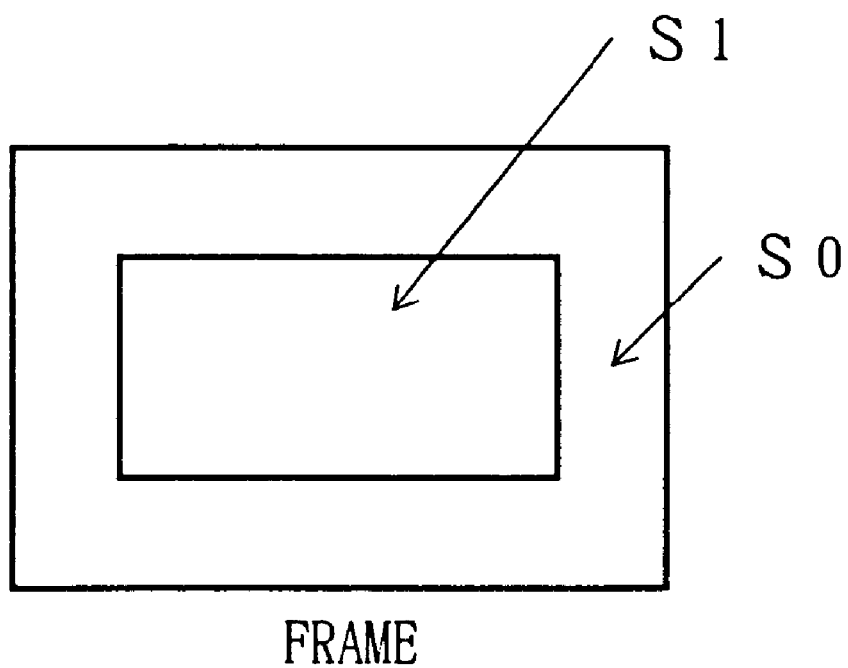
FIG. 11 shows how a portion of an image is extracted.

FIG. 11 shows how a portion of an image is extracted.

Referring to FIG. 11, it is assumed that a set of the digital video data D1–Dn stored in the buffer memories 206-1–206-$n$ relate to an image area S0 (sampling area). Selected data derived from the digital video data D1–Dn and relating to an image area S1 (display area) that needs to be displayed can be output by supplying a gate control signal to the gate circuit 207 so as to turn the gate circuit 207 on only during intervals that correspond to the display area S1.

The digital video data D1–Dn output via the gate circuit 207 is supplied to the compressing/decompressing part 203 when the data are to be recorded or transmitted. The compressing/decompressing part 203 compresses a total of n sets of image data (for example, image data for a frame) supplied in a unit time. The compressing/decompressing part 203 synthesizes the compressed data, attaches a header to the synthesized data and supplies the synthesized data to the recording/reproducing part 204. In case the recording or the transmission is not required, the digital video data is supplied directly to the multi-viewpoint output image buffer 202 and stored therein.

Figure 12:
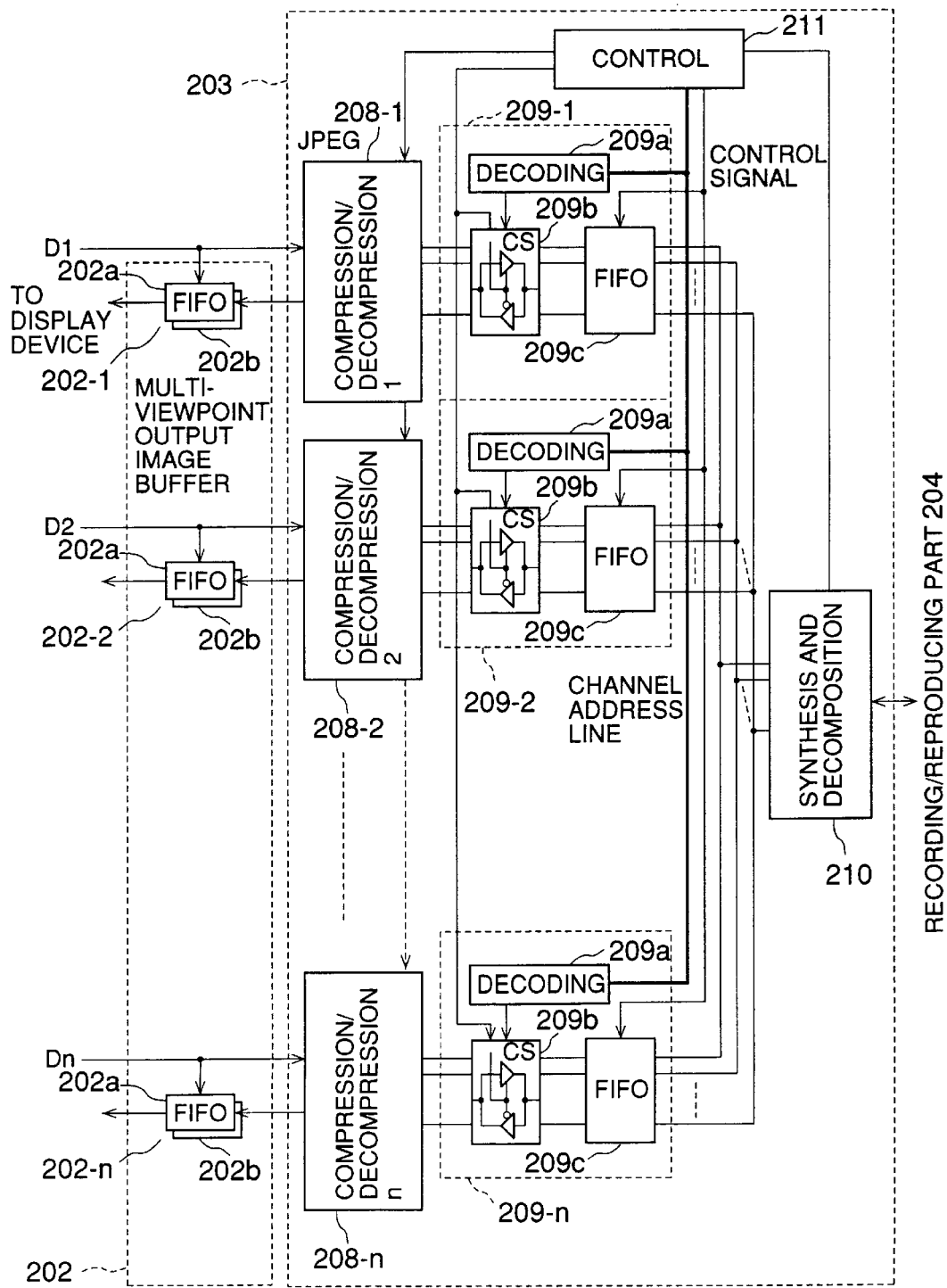
FIG. 12 is a block diagram showing a construction of a multi-viewpoint output buffer and a compressing/decompressing part according to the first embodiment.

FIG. 12 is a block diagram showing a construction of the multi-viewpoint output buffer 202 and the compressing/decompressing part 203.

The multi-viewpoint output buffer 202 comprises a total of n buffer memories 202-1–202-$n$ storing the digital video data D1–Dn, respectively. Each of the buffer memories 202-1–202-$n$ has two FIFO memories 202$a$ and 202$b$. Writing and reading are performed by alternately using the FIFO memories 202$a$ and 202$b$ so that the digital video data D1–Dn can be read out at a high speed.

The compressing/decompressing part 203 comprises compressing/decompressing units 208-1–208-$n$ for compressing the digital video data D1–Dn, respectively, supplied from the multi-viewpoint captured image buffer 201 and for decompressing the compressed data; timing control parts 209-1–209-$n$ for timing the output of data compressed by the compressing/decompressing units 208-1–208-$n$, respectively, and for timing the decompression of the compressed data reproduced in the recording/reproducing part 204; a synthesizing/decomposing part 210 for synthesizing the data output from the timing control parts 209-1–209-$n$ by attaching a header to the data and for decomposing the synthesized data reproduced in the recording/reproducing part 204 into the compressed data that corresponds to the digital video data D1–D$n$; and a control part 211 for timing the compressing and decompressing operations in the compressing/decompressing units 208-1–208-$n$, for timing the supply of the compressed data by the timing control parts 209-1–209-$n$ to the synthesizing/decomposing part 210 and the supply of the compressed data by the timing control circuits 209-1–209-$n$ to the compressing/decompressing units 208-1–208-$n$, and for timing the synthesizing and decomposing operations of the synthesizing/decomposing part 210.

The compressing/decompressing units 208-1–208-$n$ performs compression and decompression according to a compressing/decompressing method standardized by the Joint Photographic Experts Group (JPEG).

The compressed data produced by the compressing/decompressing units 208-1–208-$n$ are supplied to the timing control parts 209-1–209-$n$, respectively, in a parallel manner.

Each of the timing control parts 209-1–209-$n$ comprises a decoder 209$a$ for detecting a selection code supplied from the control part 211, a selection circuit 209$b$ for gating the compressed data produced in an associated one of the compressing/decompressing units 208-1–208-$n$ in accordance with a selection signal supplied by the decoder 209$a$, and a FIFO memory 209$c$ for temporarily storing the compressed data output from the selection circuit 209$b$.

The decoder 209$a$ of a given timing control circuit is supplied with the selection code from the control part 211. When it is determined the selection code denotes the timing control circuit to which the decoder 209$a$ is coupled, the selection circuit 209$b$ therein is turned active. The selection circuit 209$b$ is supplied by the control part 211 with a discrimination signal specifying compression or decompression. When the discrimination signal from the control part 211 specifies compression, the compressing/decompressing unit supplies the data to the FIFO memory 209$c$. When the discrimination specifies decompression, the FIFO memory 209$c$ supplies the data to the compressing/decompressing unit.

The data output from the selection circuit 209$b$ is stored in the FIFO memory 209$c$. The FIFO memory 209$c$ is supplied with a control signal from the control part 211. The control signal supplied by the control part 211 controls reading data from the FIFO memory 209$c$. Specifically, the compressed data stored in the FIFO memory 209$c$ is supplied to the synthesizing/decomposing part 210 or the associated one of the compressing/decompressing units 208-1–208-$n$ in accordance with the control signal from the control part 211.

The synthesizing/decomposing part 210 is supplied by the control part 211 with an operation control signal for controlling the synthesis and decomposition. The synthesizing/decomposing part 210 switches from synthesis to decomposition and vice versa in accordance with the control signal from the control part 211.

In the synthesis, the synthesizing/decomposing part 210 is sequentially supplied with the compressed data from the FIFO memories 209 of the timing control parts 209-1–209-$n$, in accordance with the selection code from the control part 211. The compressed data is arranged in the order that it is supplied. When the compressed data from all the compressing/decompressing units 208-1–208-$n$ has been arranged to form a group, the synthesizing/decomposing part 210 supplies the arranged data to the recording/reproducing part 204. The synthesizing/decomposing part 210 attaches a header to the group of compressed data before supplying the same to the recording/reproducing part 204 so that individual data is identified as part of the group when decomposed.

In the decomposition, the synthesizing/decomposing part 210 receives a group of compressed data having a header attached thereto and supplied from the recording/reproducing part 204 and decomposes the received data into a total of n sets of compressed data.

FIGS. 13A and 13B show how synthesis is performed by the synthesizing/decomposing part 210.

As shown in FIG. 13A, the multi-viewpoint captured image buffer 201 supplies, in a unit time T, a series of digital video data D1–Dn for one to several frames. The compressing/decompressing units 208-1–208-n compress the series of digital video data D1–Dn, respectively, supplied in the unit time T. As shown in FIG. 13B, the compressed data is synthesized by the synthesizing/decomposing part 210 in the order #1, #2, . . . , #n within the time T. A group of compressed data thus synthesized has a header attached at their head and recorded in the recording/reproducing part 204.

The order #1, #2, . . . , #n is determined according to a code supplied by the control part 211 to the decoder 209a. For example, the identification code #1 may be assigned to the decoder 209a of the timing control part 209-1, the identification code #2 to the decoder 209a of the timing control part 209-2, . . . , and the identification code #n to the decoder 209a of the timing control part 209-n. When the compressed data is to be synthesized in the order #1, #2, . . . , #n, the control part 211 outputs the codes in the order #1, #2, . . . , #n within the time T.

The digital video data D1–Dn are compressed, synthesized and recorded in the above-described manner.

In the reproduction, the synthesized compressed data are decomposed and supplied to the individual compressing/decompressing units 208-1–208-n before being decompressed. The decomposition of a group of compressed data is peformed such that the header is detected so as to determine the head of the group of compressed data. The compressed data #1–#n constituting the group is stored at an interval of t0 and within the total period of time T.

The control part 211 outputs the identification code #1 during the interval to after the synthesizing/decomposing part 210 detects the header so that the compressed data #1 associated with the code #1 is written in the FIFO memory 209c of the timing control part 209-1. Similarly, after the first interval to has elapsed since the detection of the header by the synthesizing/decomposing part 210, the control part 211 outputs the identification code #2 during the interval t0 so that the compressed data #2 associated with the code #2 is written in the FIFO memory 209c of the timing control part 209-2. Similarly, after the interval (n−1)×t0 has elapsed since the detection of the header by the synthesizing/decomposing part 210, the control part 211 outputs the identification code #n during the interval t0 so that the compressed data #n associated with the code #n is written in the FIFO memory 209c of the timing control part 209-n.

When the compressed data is stored in the FIFO memories 209c of the timing control parts 209-1–209-n, the control part 211 supplies the compressed data in the FIFO memories 209c of the timing control parts 209-1–209-n subsequently to the compressing/decompressing units 208-1–208-n, respectively, by providing the discrimination signal indicating decompression.

The compressing/decompressing units 208-1–208-n obtain the original digital video data D1–Dn by decompressing the compressed data supplied by the FIFO memories 209c of the timing control parts 209-1–209-n.

The digital video data D1–Dn thus restored by the compressing/decompressing units 208-1–208-n are supplied to the multi-viewpoint output image buffers 202-1–202 -n, respectively, and stored therein. The digital video data D1–Dn stored in the multi-viewpoint output image buffers 202-1–202-n are alternately read out from the FIFO memories 202a and 202b constituting each of the multi-viewpoint output image buffers 202-1–202-n before being supplied to the image distributing part 203.

Figure 14:
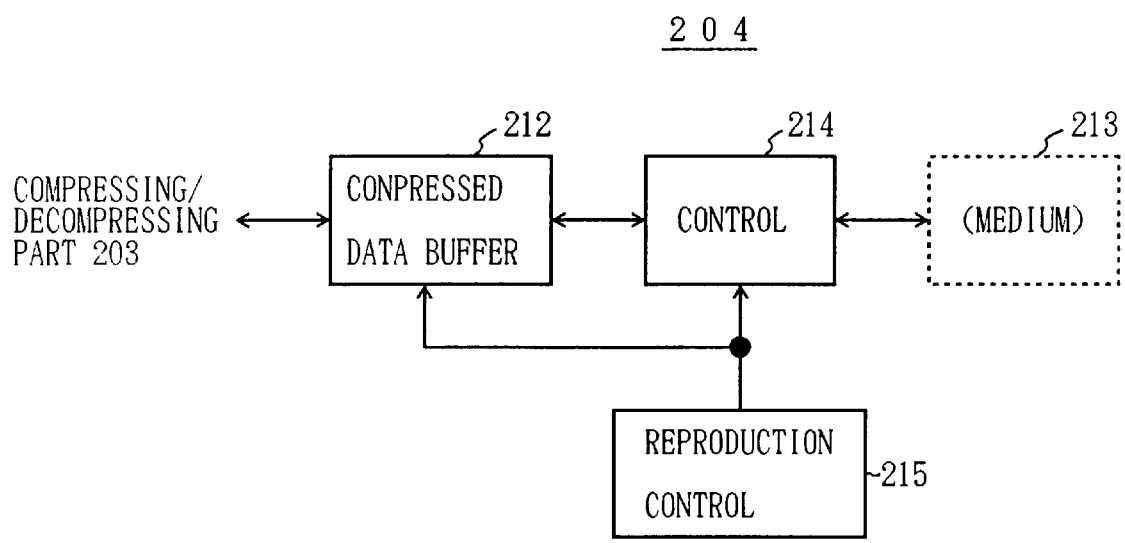
FIG. 14 is a block diagram showing a construction of a recording/reproducing part according to the first embodiment.

FIG. 14 is a block diagram showing a construction of the recording/reproducing part 204.

The recording/reproducing part 204 according to the first embodiment comprises a compressed data buffer 212 for storing a group of compressed data; a control part 214 for recording in a medium 213 the group of compressed data stored in the compressed data buffer 212 and for reproducing the group of compressed data stored in the medium 213; and a reproduction control part 215 for controlling the control part 214 such that the group of compressed data is read from the medium 213 in a reverse order and then stored in the compressed data buffer 212.

The group of compressed data is read from the medium 213 in an order #n, #(n−1), . . . , #2 and #1. In this way, it is possible to control the timing control parts 209-1–209-n in the decomposition in the same order as the order observed in the synthesis. The control part 211 is required to supply the identification codes #1, #2, . . . , #n in the stated order to the timing control parts 209-1–209-n, that is, in the same order observed in the synthesis. Accordingly, the construction of the control part 211 can be simplified.

While it is assumed that the frames are subject to compression using a compression technology provided by the JPEG, compression may also be performed using the moving picture information compression method provided by the Moving Picture Coding Experts Group (MPEG).

Figure 15:
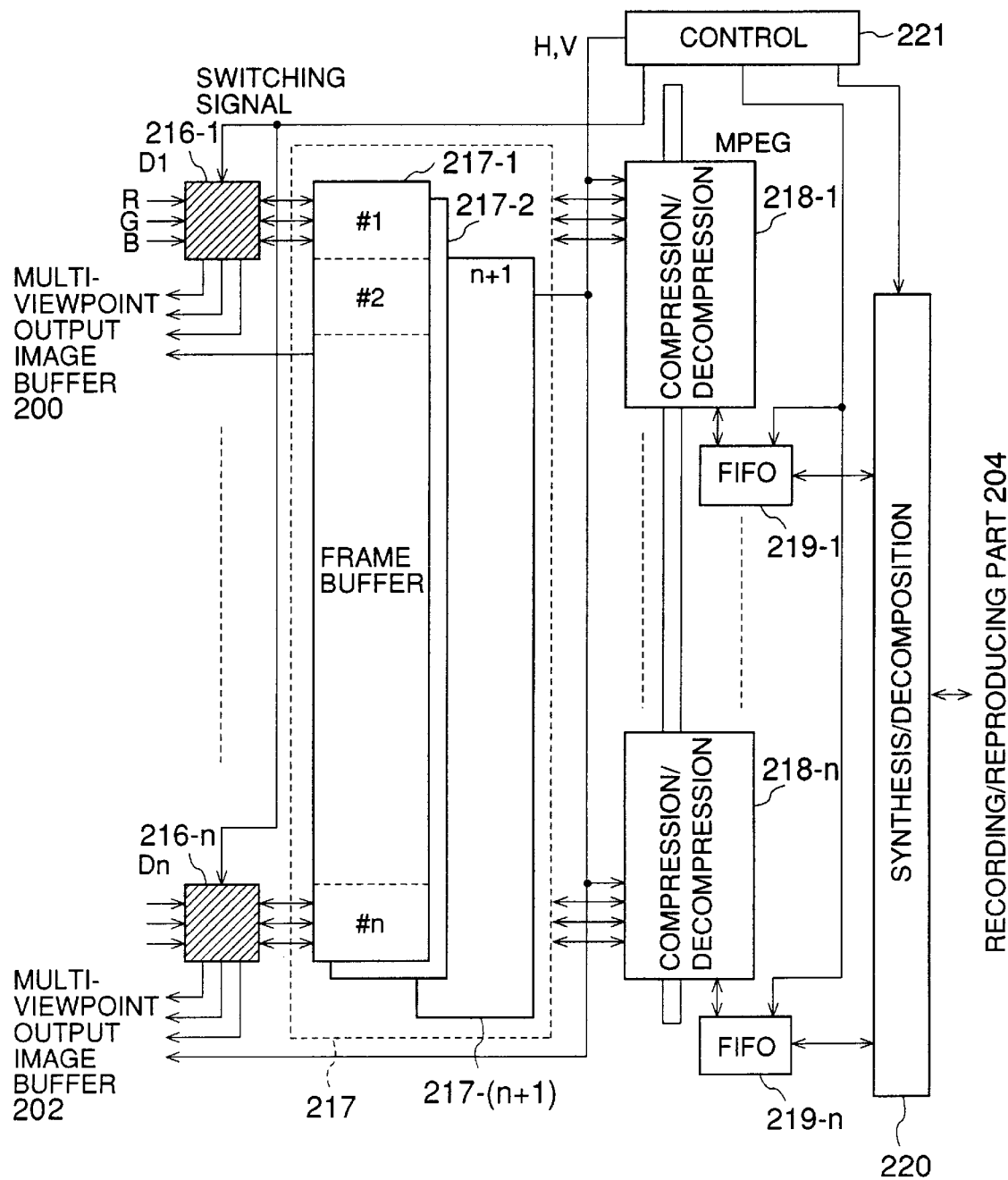
FIG. 15 is a block diagram showing a construction of a variation of the compressing/decompressing part according to the first embodiment.

FIG. 15 is a block diagram showing a construction of a variation of the compressing/decompressing part according to the first embodiment. In FIG. 15, those components that are the same as the components of FIG. 12 are designated by the same reference numerals and the description thereof is omitted.

In the variation shown in FIG. 15, the digital video data D1–Dn supplied by the multi-viewpoint captured image buffer 201 is compressed, recorded, reproduced and restored to the original digital video data D1–Dn, using the image compression/decompression method provided by the MPEG.

The variation of the compressing/decompressing part comprises switching parts 216-1–216-n for selecting the digital video data to be supplied to the multi-viewpoint output image buffer 202; a frame buffer part 217 capable of storing the digital video data D1–Dn for a total of n+1 frames; compressing/decompressing units 218-1–218-n for performing compression based on relations between adjacent image elements in the digital video data D1–Dn for the n+1 frames stored in the frame buffer part 217; FIFO memories 219-1–219-n for timing the output of the compressed data from the compressing/decompressing units 218-1–218-n and timing the supply of the compressed data to the compressing/decompressing units 218-1–218-n; a synthesizing/decomposing part 220 for synthesizing the compressed data and supplying the same to the recording/reproducing part 204 and for decomposing the synthesized data reproduced in the recording/reproducing part 204 into the individual compressed data to be respectively supplied to the compressing/decompressing units 218-1–218-n; and a control part 221 for timing the switching performed by the switching parts 216-1–216-n, timing the operation of the compressing/decompressing units 218-1–218-n, timing writing data to the FIFO memories 219-1–219-n and reading data therefrom, and controlling the synthesizing and decomposing operations of the synthesizing/decomposing part 220.

The switching parts 216-1–216-n are coupled to the multi-viewpoint captured image buffer 201, the frame buffer part 217 and the multi-viewpoint output image buffer 202. In accordance with a switching signal from the control part 221, the switching parts 216-1–216-n select a connection between the multi-viewpoint captured image buffer 201 and the frame buffer part 217 or a connection between the frame buffer part 217 and the multi-viewpoint output image buffer 202.

When the compressed data is to be recorded in the recording/reproducing part 204, the switching parts 216-1–216-n establish a connection between the multi-viewpoint captured image buffer 201 and the frame buffer part 217 in accordance with the switching signal from the control part 221. The n digital video data D1–Dn output from the multi-viewpoint captured image buffer 201 is stored in the frame buffer part 217.

The frame buffer part 217 consists of a total of n+1 frame buffers 217-1–217-(n+1). The n digital video data D1–Dn is stored in each of the n+1 frame buffers 217-1–217-(n+1). The compressing/decompressing units 218-1–218-n subject the n digital video data D1–Dn for the n+1 frames stored in the frame buffer part 217 to image compression using the MPEG method based on relations between image elements. The compressed data is stored in the FIFO memories 219-1–219-n. In accordance with the control signal from the control unit 221, the compressed data stored in the FIFO memories 219-1–219-n is read out from the FIFO memory 219-1, the FIFO memory 219-2, . . . , the FIFO memory 219-n in the stated order and supplied to the synthesizing/decomposing part 220.

The synthesizing/decomposing part 220 provides a header and then arranges the compressed data stored in the FIFO memory 219-1, the compressed data stored in the FIFO memory 219-2, . . . , the compressed data stored in the FIFO memory 219-n, in the stated order, subsequent to the header. The arranged data is supplied to the recording/reproducing part 204.

FIGS. 16A–16C show how a synthesizing operation of the synthesizing/decomposing part is executed.

The compressing/decompressing units 218-1–218-n of the variation of FIG. 15 subject the n digital video data D1–Dn to image compression using the MPEG method based on relations between image elements. In the image compression according to the MPEG method, the n digital video data D1–Dn as shown in FIG. 16A is processed as shown in FIG. 16B such that difference images derived from the digital video data D2–Dn with reference to the reference digital video data D1 are obtained. The reference image and the difference images are then compressed and stored in the FIFO memories 219-1–219-n. As shown in FIG. 16C, the synthesizing/decomposing part 220 attaches a header to the compressed data stored in the FIFO memories 219-1–219-n and arranges the compressed data stored in the FIFO memory 219-1, the compressed data stored in the FIFO memory 219-2, . . . , the compressed data stored in the FIFO memory 219-n in the stated order within the unit time T. The arranged data are recorded in the recording/reproducing part 204.

According to this variation, it is possible to improve the compression rate by using relations between image elements. The recording/reproducing part 204 is capable of storing compressed data in the medium 213 for a larger number of frames than in the case where the MPEG is not employed.

Figure 17:
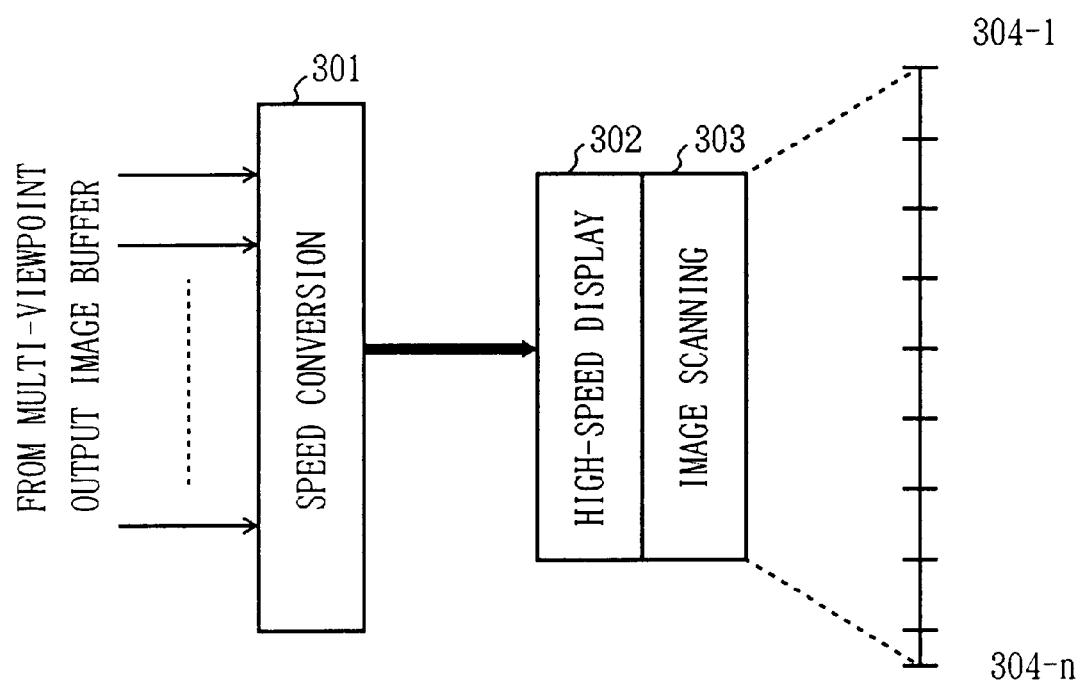
FIG. 17 shows a construction of an image distributing part according to the first embodiment.

FIG. 17 shows a construction of the image distributing part 300.

The image distributing part 300 comprises a speed converting part 301 for increasing a speed of the digital video data D1–Dn supplied from the multi-viewpoint image processing part 200, a high-speed display device 302 for displaying the data whose speed is increased in the speed converting part 301, and an image scanning part 303 for supplying the image displayed in the high-speed display device 302 to virtual apertures 304-1–304-n.

The multi-viewpoint image processing part 200, the speed converting part 301 and the high-speed display device 302 constitute the "multi-viewpoint image forming means" as described in claims 18 through 23. The image scanning part 303 constitutes the image distributing means as described in claims 18 through 38.

The speed converting part 301 divides each of the n digital video data D1–Dn stored in the multi-viewpoint output image buffer 202 into a total of m individual data, and imports selected data from each of the digital video data D1–Dn and supplies the same to the high-speed display device 302.

Figure 18:
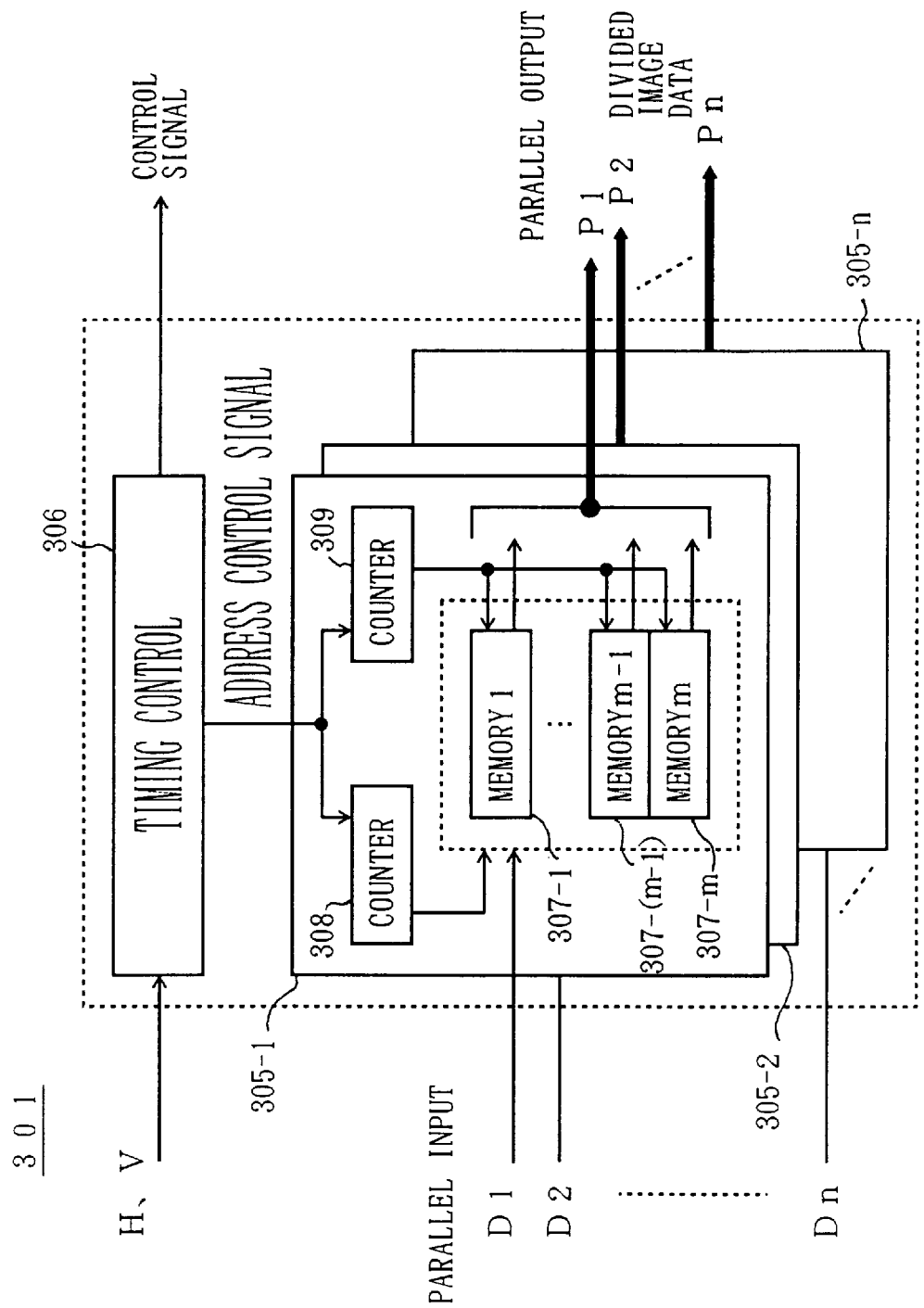
FIG. 18 shows a construction of a speed converting part according to the first embodiment.

FIG. 18 shows a construction of the speed converting part 301.

The speed converting part 301 comprises a total of n buffer memory parts 305-1–305-n provided to store the digital video data D1–Dn, respectively, and a timing control part 306 for timing the storage of the data in the buffer memory parts 305-1–305-n.

Each of the buffer memory parts 305-1–305-n comprises a total of m memories 307-1–307-m for dividing each of the digital video data into m individual data in a horizontal direction and storing the same in a sequential manner, a first counter 308 for counting image elements and setting a write address for the memories 307-1–307-m, and a second counter 309 for counting image elements and setting a read address for the memories 307-1–307-m.

The timing control part 306 is supplied with a horizontal synchronizing signal and a vertical synchronizing signal. In accordance with the horizontal synchronizing signal and the vertical synchronizing signal, positions of the image elements in the digital video data D1–Dn are determined. The timing control part 306 supplies an address control signal to the buffer memory parts 305-1–305-n so as to cause a pulse to be generated for each image element.

The address control signal is supplied to the first counter 308 and the second counter 309 of the buffer memory parts 305-1–305-n. The first counter 308 counts the address control signals and sets the write addresses in the memories 307-1–307-m in which the digital video data is stored. When a count is provided by the first counter 308, the address of one of the memories 307-1–307-m is set. The digital video data is thus sequentially stored in the memories 307-1–307-m.

The memories 307-1–307-m store the m individual data obtained by horizontally dividing the digital video.

The second counter 309 counts the address control signals, generates the read addresses for outputting the data stored in the memories 307-1–307-m in the order that it is stored, and supplies the read addresses to the memories 307-1–307-m. As a result, the digital video data D1–Dn is output from the respective lines coupled to the memories 307-1–307-m as parallel data P1–Pn. The address control signals are sequentially supplied to the buffer memory parts 305-1–305-n so that the parallel data P1–Pn is sequentially output from the buffer memories 305-1–305-n.

FIGS. 19A–19C show how the speed converting part operates.

As shown in FIG. 19A, the speed converting part 301 is supplied with the digital video data D1–Dn from the multi-viewpoint output buffer 202 in a parallel manner.

As shown in FIG. 19B, each of the digital video data D1–Dn constituting the respective frames and supplied to the speed converting part 301 is horizontally divided into the m individual data and stored in the memories 307-1–307-m. One of the digital video data D1–Dn stored as shown in FIG. 19B is output simultaneously as m sets of divided data as shown in FIG. 19C. The digital video data Dn, the digital video data Dn-1, . . . , the digital video data D2, and the digital video data D1 are supplied to the high-speed display device 302, in the stated order.

Figure 20:
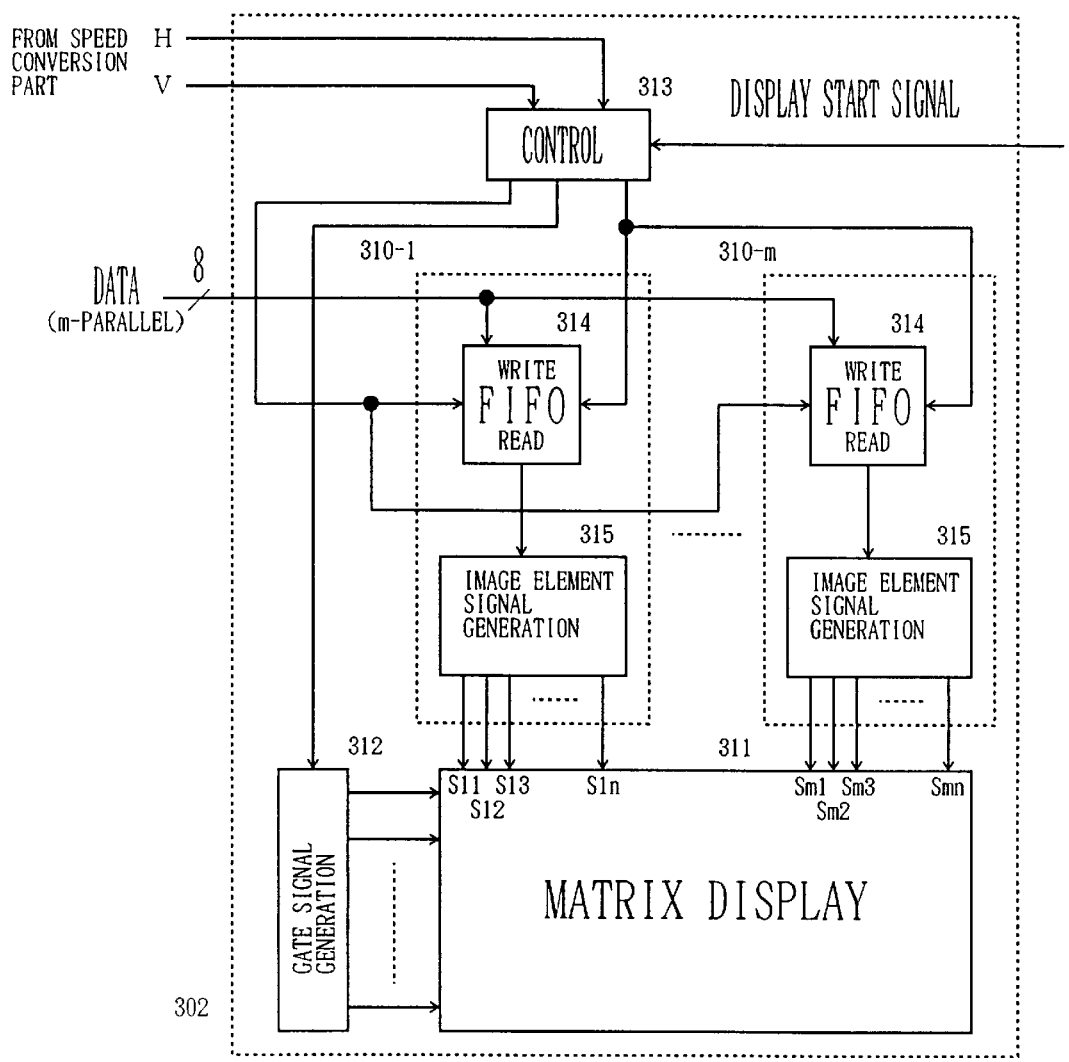
FIG. 20 shows a construction of a high-speed display device.

FIG. 20 shows a construction of the high-speed display device 302.

The high-speed display device 302 comprises multi-viewpoint image signal generating parts 310-1–310-m for storing the m sets of data constituting each of the parallel data P1–Pn supplied from the speed converting part 301 and generating multi-viewpoint image display signals, a matrix display device 311 for displaying the multi-viewpoint image in accordance with the multi-viewpoint image display signal generated in the multi-viewpoint image signal generating parts 310-1–310-m, a gate signal generating part 312 for generating a gate signal to the matrix display device 311, and a control circuit 313 for timing the operation of the multi-viewpoint image signal generating parts 310-1–310-m and the matrix display device 311.

Each of the multi-viewpoint image signal generating parts 310-1–310-m is sequentially supplied with the parallel data P1–Pn generated in the speed converting part 301 and each composed of the m sets of data. Each of the multi-viewpoint image signal generating parts 310-1–310-m comprises a FIFO memory 314 for storing one of the m sets of digital video data constituting the parallel data P1–Pn, and an image element signal generating circuit 315 for generating a total of n image element signals out of the n digital video data sequentially stored in the FIFO memory 314.

Each of the multi-viewpoint image signal generating parts 310-1–310-m is supplied with the m parallel data P1–Pn generated in the speed converting part 301. A first set of data #1, from the m sets of digital video data constituting each of the parallel data P1–Pn, is supplied to the multi-viewpoint image signal generating part 310-1, a second set of data #2, from the m sets of digital video data constituting each of the parallel data P1–Pn, is supplied to the multi-viewpoint image signal generating part 310-2, . . . , and an mth set of data #m, from the m sets of digital video data constituting each of the parallel data P1–Pn, is supplied to the multi-viewpoint image signal generating part 310-m.

The digital video data supplied to the multi-viewpoint image signal generating parts 310-1–310-m are stored in the FIFO memory 314 in accordance with a write control signal from the control circuit 313. When the digital video data for one frame is supplied to the FIFO memory 314, the control circuit 313 supplies a read control signal to the FIFO memory 314 so that the digital video data stored in the FIFO memory is read out and supplied to the image element signal generating circuit 315.

The image element signal generating circuits 315 in the multi-viewpoint image signal generating parts 310-1–310-m import the digital video data from the respective FIFO memories 314 so as to generate the image element signals S11–S1n, S21–S2n, . . . , Sm1–Smn. The image element signals S11–S1n, S21–S2n, . . . , Sm1–Smn are supplied to the matrix display device 311 in the order S11–S1n, S21–S2n, . . . , Sm1–Smn, in a horizontal direction.

The matrix display device 311 is constructed such that electrodes that extend horizontally are connected to the gate signal generating part 312. The gate signal generating part 312 selects the horizontal electrode in accordance with a vertical synchronizing signal supplied from the control circuit 313. The matrix display device 311 uses the selected electrode to display images derived from the image element signals S11–S1n, S21–S2n, . . . , Sm1–Smn generated in the multi-viewpoint image signal generating parts 310-1–310-m.

Images displayed by the matrix display device 311 using the image element signals S11–S1n, S21–S2n, . . . , Sm1–Smn are in the form of horizontal stripes. That is, the digital video data D1–Dn are mixed with each other to produce a multi-view image.

While it is assumed in the above description that the m sets of parallel data forming the digital video data Dn, the m sets of parallel data forming the digital video data Dn-1, . . . , the m sets of parallel data forming the digital video data D2 and the m sets of parallel data forming the digital video data D1 are output in the stated order as shown in FIG. 19C, it is also possible to employ parallel-serial conversion so that the digital video data Dn, the digital video data Dn-1, . . . , the digital video data D2 and the digital video data D1 are output serially.

Figure 21:
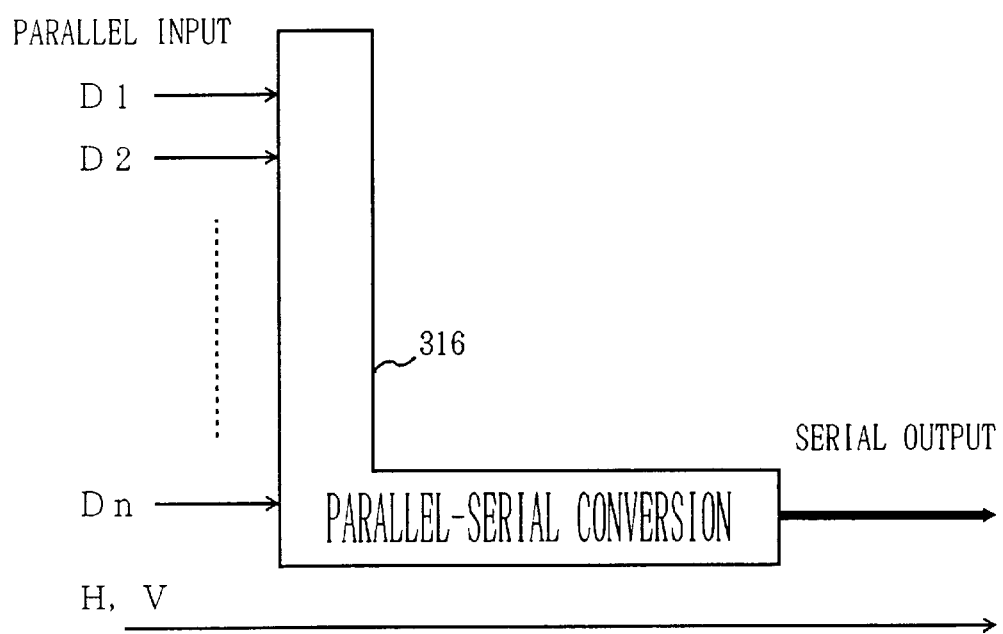
FIG. 21 is a schematic diagram showing a variation of the speed converting part.
Figure 22:
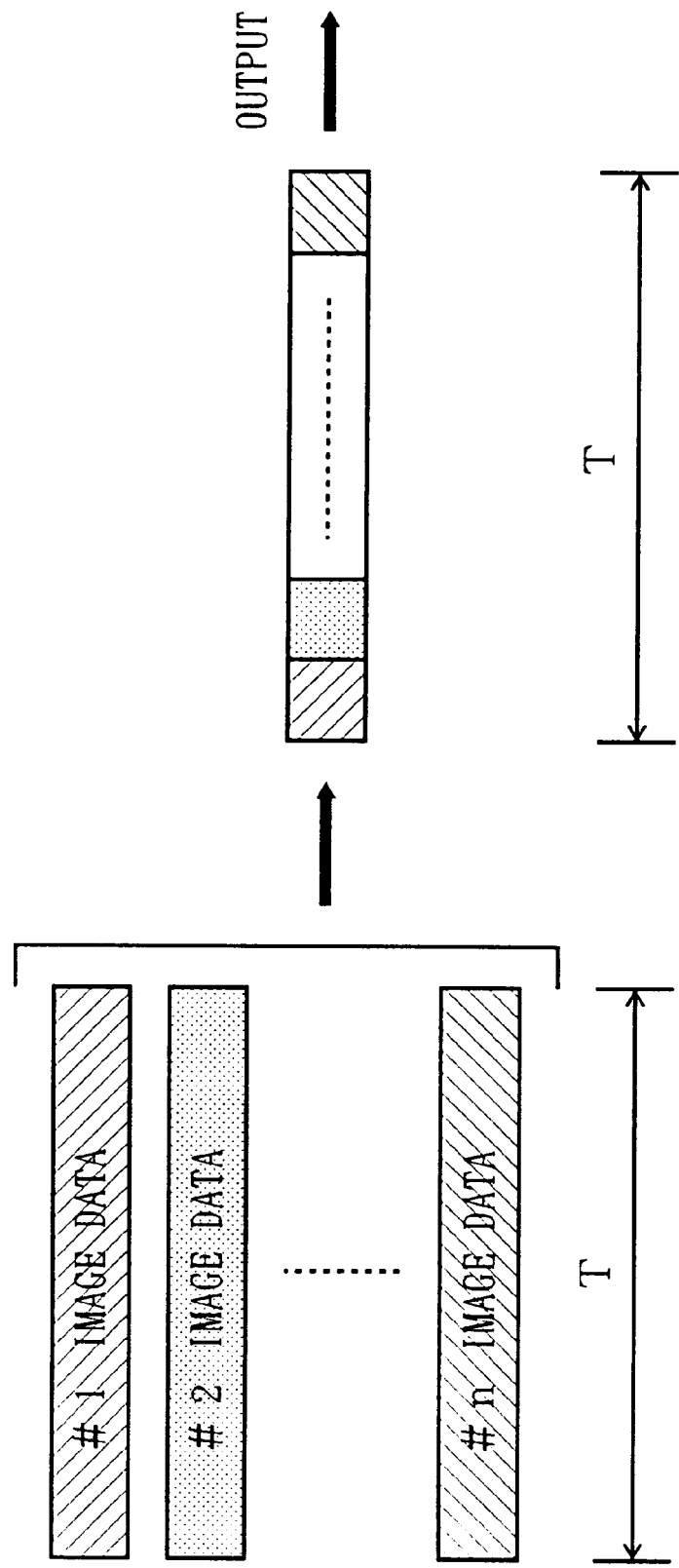
FIG. 22A shows digital video data supplied to a parallel-serial converting part of the variation of the speed converting part.
FIG. 22B shows how the digital video data supplied to the parallel-serial converting part are serially output.

FIG. 21 is a schematic diagram showing a variation of the speed converting part. FIGS. 22A and 22B show how the variation of the speed converting part operates.

The speed converting part comprises a parallel-serial converting part 316. As shown in FIG. 22A, the parallel-serial converting part 316 is supplied with the digital video data D1–Dn in a parallel manner from the multi-viewpoint output image buffer 202. As shown in FIG. 22B, the supplied digital video data D1–Dn is serially output as the digital video data D1, the digital video data D2, . . . , the digital video data Dn-1 and the digital video data Dn, in the stated order.

When the speed converting part is implemented by the parallel-serial converting part 316, the display device also needs to be implemented by a serial input device.

Figure 23:
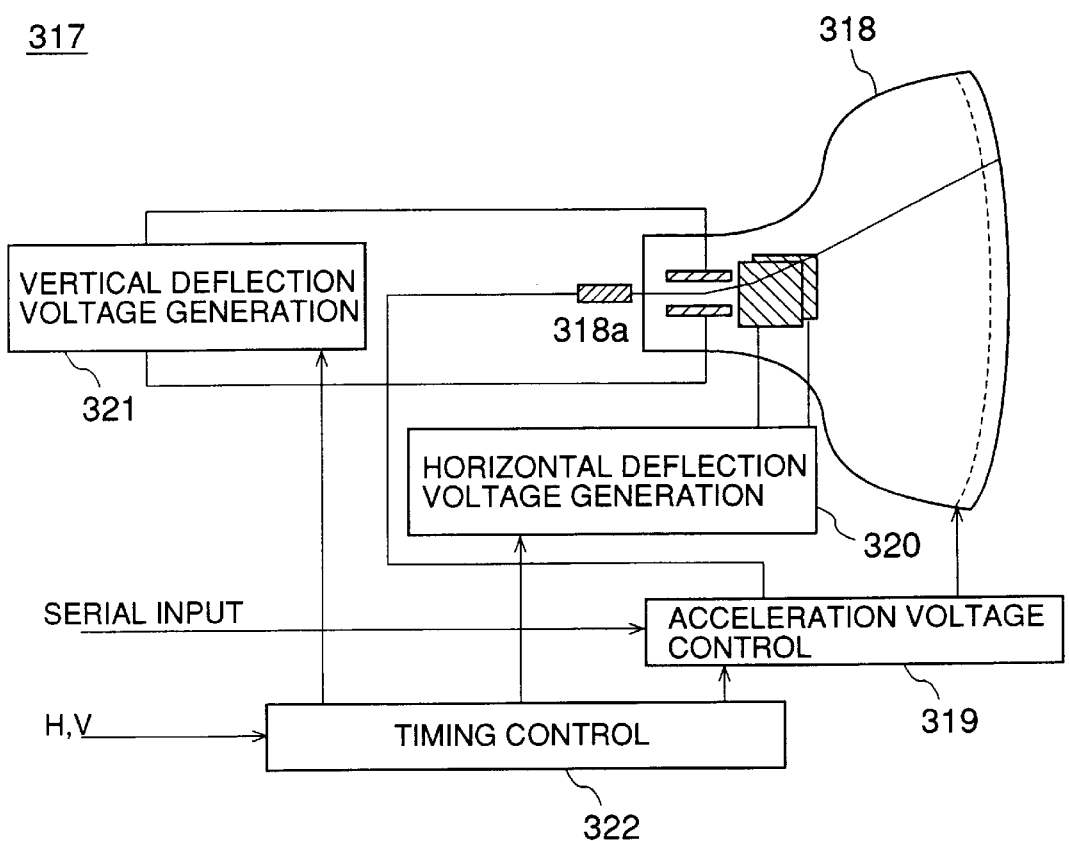
FIG. 23 shows a construction of a variation of a high-speed display device.

FIG. 23 shows a construction of a display device 317 operating in cooperation with the variation of the speed converting part.

The display device 317 comprises a CRT 318 for displaying images, an acceleration voltage control circuit 319 supplied with serial data from the parallel-serial converting part 316 so as to control an acceleration voltage applied between an electron gun 318a and a screen surface of the CRT 318 in accordance with the supplied serial data, thus controlling luminance, a horizontal deflection voltage generating circuit 320 for controlling the direction of the electron beam produced by the electron gun 318a of the CRT 318, in accordance with a horizontal synchronizing signal generated in the multi-viewpoint image processing part 200, a vertical deflection voltage generating circuit 321 for controlling the direction of the electron beam produced by the electron gun 318a of the CRT 318, in accordance with a vertical synchronizing signal generated in the multi-viewpoint image processing part 200, and a timing control circuit 322 for controlling the horizontal deflection voltage generating circuit 320, the vertical deflection voltage generating circuit 321, and the acceleration voltage control circuit 319, in accordance with the horizontal synchronizing signal and the vertical synchronizing signal generated in the multi-viewpoint image processing part 200.

As shown in FIG. 22B, the digital video data D1–Dn are converted into the serial data. By scanning the sequentially output serial data derived from the digital video data D1–Dn shown in FIG. 22B, the digital video data D1–Dn is displayed on the screen of the CRT 318 in the form of horizontal stripes.

Figure 24:
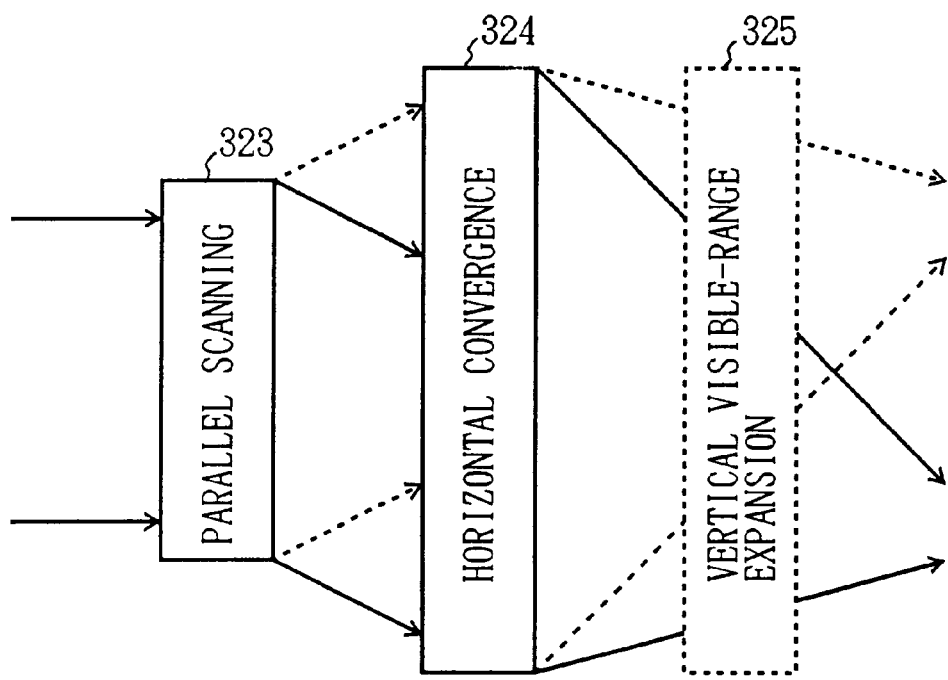
FIG. 24 shows a construction of an image scanning part according to the first embodiment.

FIG. 24 shows a construction of the image scanning part 303.

The image scanning part 303 comprises a parallel scanning part 323 which, provided in front of the high-speed display device 302, scans and deflects images derived from the digital video data D1–Dn in a parallel manner, a horizontal converging part 324 for converging the image subject to the parallel scanning by the parallel scanning part 323, in a horizontal direction, and a vertical visible-range expanding part 325 for vertically expanding the image converged by the horizontal converging part 324 so as to expand the vertical visible range.

Figure 25:
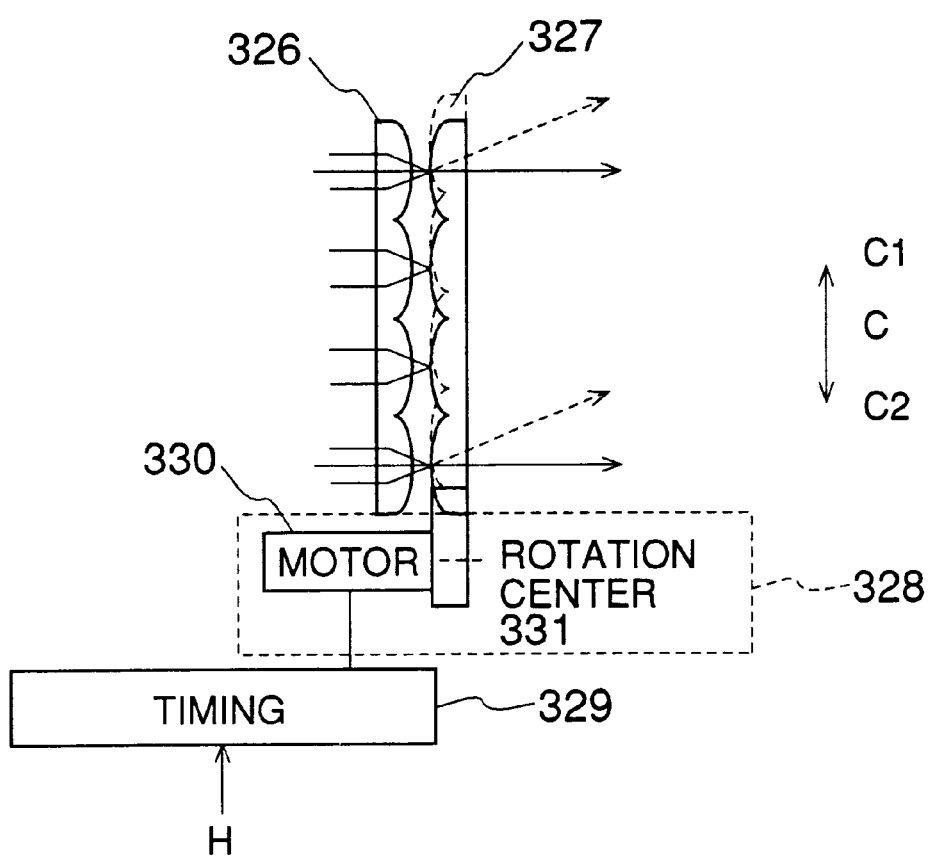
FIG. 25 shows a construction of a parallel scanning part according to the first embodiment.

FIG. 25 shows a construction of the parallel scanning part 323.

The parallel scanning part 323 comprises a fixed lenticular lens 326, a swingable lenticular lens 327 provided to face the fixed lenticular lens 326, a driving mechanism 328 for swinging the swingable lenticular lens 327 in the C directions indicated by the arrows so that the swingable lenticular lens 327 is maintained parallel with the fixed lenticular lens 326, and a timing control circuit 329 for timing the swinging motion provided by the driving mechanism 328.

Each of the fixed lenticular lens 326 and the swingable lenticular lens 327 is provided with a plurality of cylindrical lenses in the vertical scanning direction of the high-speed display device 302, at a pitch commensurate with a pitch of image elements in the high-speed display device 302.

The driving mechanism 326 comprises a motor 330 driven at a constant speed in accordance with a horizontal synchronizing signal supplied from the timing control circuit 329, and a substantially disk-shaped cam 331 eccentrically secured to a rotating shaft of the motor 330 and having its end surface in contact with an end surface of the swingable lenticular lens 327. The swingable lenticular lens 327 is urged toward the cam 331 by a spring or the like and is swingable in the C directions indicated by the arrows in response to the rotation of the cam 331.

The multi-viewpoint image output from the display device 302 is converged by the fixed lenticular lens 326 and supplied to the swingable lenticular lens 327. Since the swingable lenticular lens 327 is swingable in the C directions by the driving mechanism 328, the multi-viewpoint image supplied to the swingable lenticular lens 327 has its outgoing angle controlled according to the position of the swingable lenticular lens 327.

The principle of image deflection using the above described mechanism is disclosed in Japanese Laid-Open Patent Application No. 4-242394.

When the swingable lenticular lens 327 is at a position indicated by the solid line in FIG. 25, the centers of the lenses are aligned with each other so that the multi-viewpoint image outgoes straight. When the swingable lenticular lens 327 slightly swings in the C1 direction indicated by the arrow, the outgoing angle of the multi-viewpoint image is controlled to shift in the C2 direction indicated by the arrow, as indicated by the broken line in FIG. 25.

The multi-viewpoint image deflected by the parallel scanning part 323 is supplied to the horizontal converging part 324 for horizontal converging so that the multi-viewpoint image outgoing from the swingable lenticular lens 327 is prevented from being diffused.

The multi-viewpoint image converged by the horizontal converging part 324 is supplied to the vertical visible-range expanding part 325 implemented by a lenticular lens having a predetermined period in a deflection perpendicular to the arrangement of the cylindrical lenses of the fixed lenticular lens 326 and the swingable lenticular lens 327 of the parallel scanning part 323. The multi-viewpoint image supplied to the vertical visible-range expanding part 325 has its visible range expanded by being magnified vertically. The multi-viewpoint image outgoing from the vertical visible-range expanding part 325 is projected onto the plane of virtual apertures.

The two-dimensional images leaving the image scanning part reach the plane of virtual apertures so as to be arranged side by side.

As described above, images with parallax are sequentially displayed in the high-speed display device 302 and projected onto the swinging optical element as described above. The swingable lenticular lens is swung such that the image #1 is directed to the virtual aperture 304-1, the image #2 with parallax with respect to the image #1 is directed to the virtual aperture 304-2, and the image #n is directed to the virtual aperture 304-n.

The swingable lenticular lens and the high-speed display device 302 are synchronized with a timing circuit 334 and a voltage generating circuit 335 to be described later. The stereoscopic image display according to the above arrangement is achieved by causing images with parallax to enter the right and left eyes from different virtual apertures.

A description will now be given of the setting in different parts of the image distributing part.

First, a description will be given of the relation between the plane of projection and the plane of virtual apertures marking the bounds in which the stereoscopic image can be visually perceived.

Figure 26:
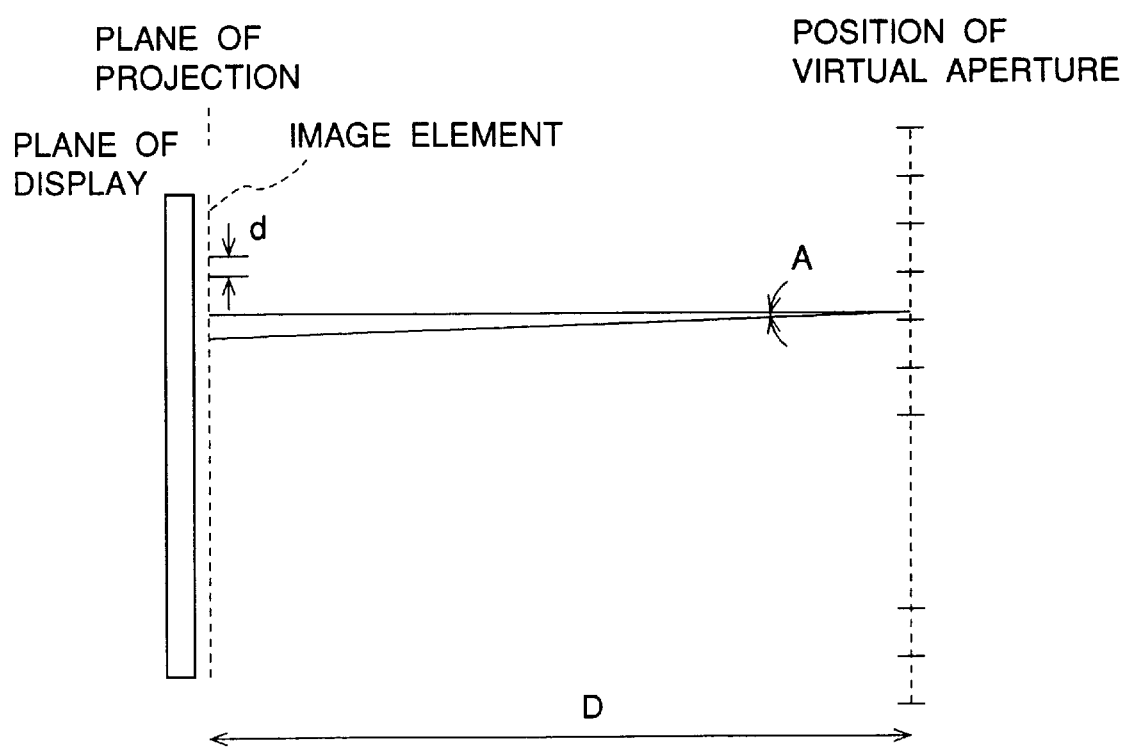
FIG. 26 shows an arrangement of a plane of display, a plane of projection and a plane of virtual apertures.

FIG. 26 shows an arrangement of the plane of display, the plane of projection and the plane of virtual apertures.

In FIG. 26, the plane of display of the high-speed display device 302 matches the plane of projection on which a viewer perceives an image.

In order to allow the right and left eyes of the viewer to perceive different two-dimensional images, the distance between image elements found on the plane of projection should be controlled to be smaller than the resolution of the human eye.

Referring to FIG. 26, given that the resolution of the human eye is A, the image element pitch on the plane of projection is d, and the distance between the plane of projection and the plane of virtual apertures is D, the following equation must be satisfied.

$$d/D < \tan A \qquad (1\text{-}1)$$

Accordingly, the image element pitch d on the plane of projection, and the distance D between the plane of projection and the plane of virtual apertures are set to satisfy the above inequality.

While FIG. 26 shows a case where the plane of display of the high-speed display device 302 matches the plane of projection on which the viewer perceives the image, the image element pitch d, and the distance between the plane of projection and the plane of virtual apertures D may be set according to the above equation even in a construction in which the plane of display of the high-speed display device 302 and the plane of projection on which the image is perceived do not match.

Figure 27:
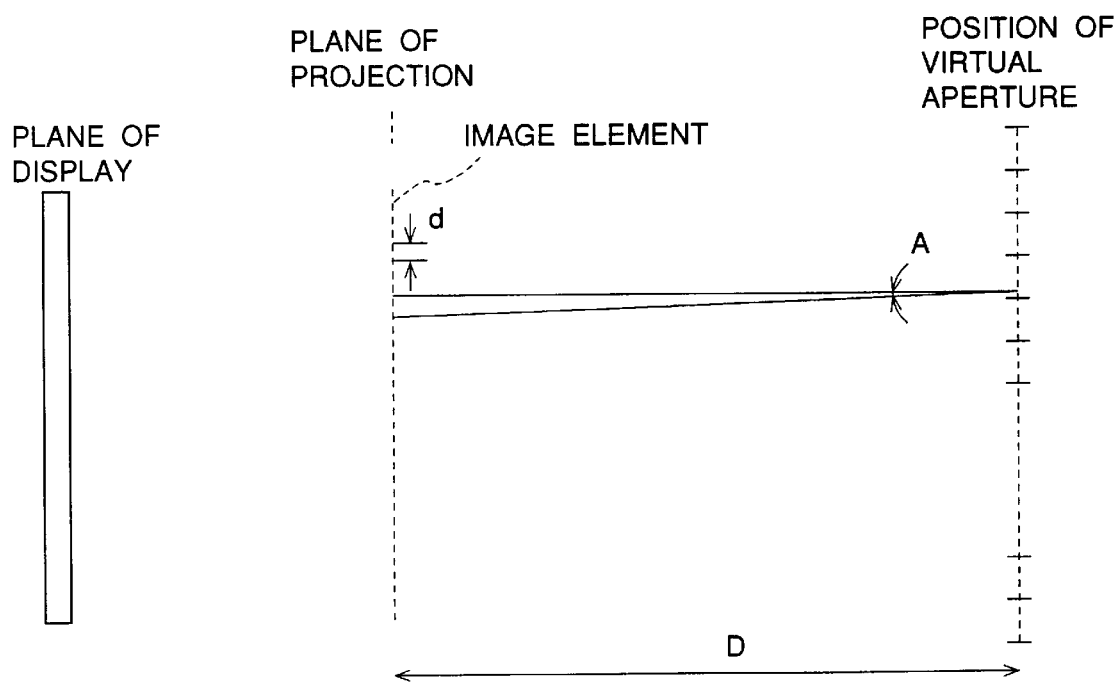
FIG. 27 shows another arrangement of a plane of display, a plane of projection and a plane of virtual apertures.

FIG. 27 shows another arrangement of the plane of display, the plane of projection and the plane of virtual apertures, wherein the plane of display of the high-speed display device 302 and the plane of projection do not match.

It will be found that the above inequality is derived from an arrangement of the plane of projection and the plane of virtual apertures, and not from an arrangement of the plane of display.

Figure 28:
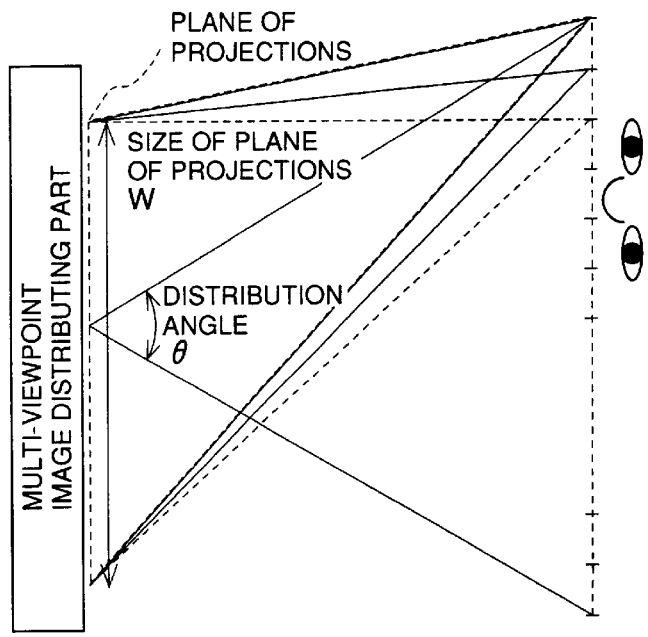
FIG. 28 shows a relation between a distribution angle and a size of the plane of projection.

FIG. 28 shows a relation between a distribution angle (an angle formed by edges of the plane of virtual apertures and a center of the plane of projection) and a size of the plane of projection.

In order to provide a wide visible range, the plane of virtual apertures is set to be wider than the plane of projection.

Given that the width of the plane of projection is W and the distribution angle provided by the image distributing part is Θ, the following inequality should be satisfied.

$$2D\tan(\Theta/2) > W \quad (1\text{-}2)$$

Figure 29:
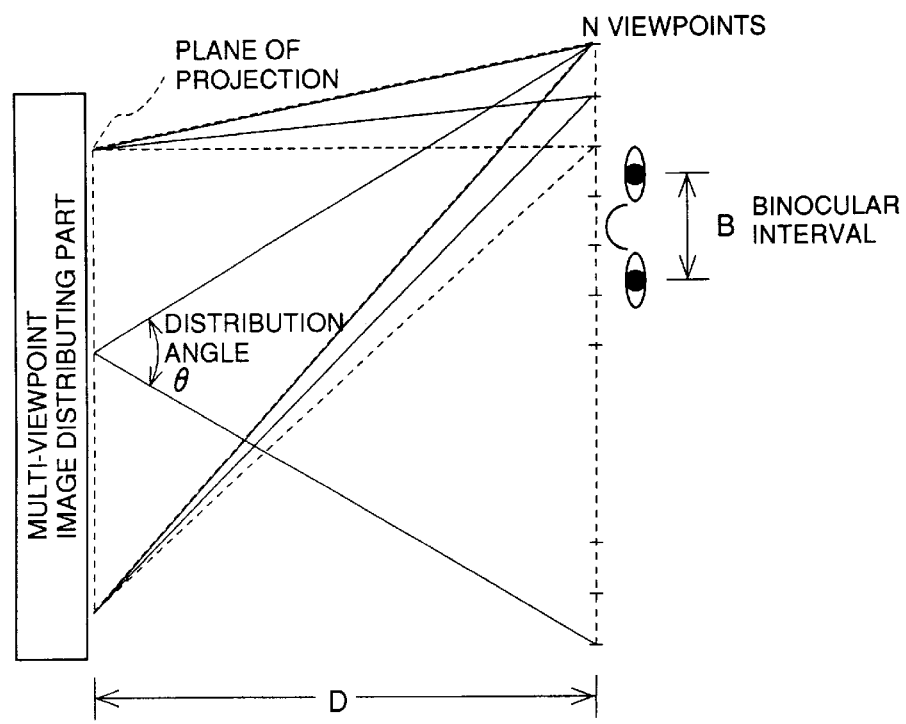
FIG. 29 shows a relation between the distribution angle and a binocular interval.

FIG. 29 shows a relation between the distribution angle and a binocular interval (a distance between the right and left eyes).

In order for smoothly blended synthesized images to be obtained when a viewer views the images at a distance, the virtual apertures should be fine. The interval of the virtual apertures should be set such that three intervals are observed simultaneously. If the interval is shorter than half the binocular interval, the images provide a viewing experience with smooth shifts between viewpoints in response to the movement of the eyes.

Accordingly, given that the binocular interval is B, the number of viewpoints provided by the two-dimensional images taken is n, and the distribution angle is Θ, the number n and the angle Θ are set so as to satisfy the following inequality.

$$(2D\tan(\Theta/2))/n < B/2 \quad (1\text{-}3)$$

An average value is usually used for the binocular interval B.

A description will now be given of the relation between the display device, the parallel scanning part and the plane of projection.

Figure 30:
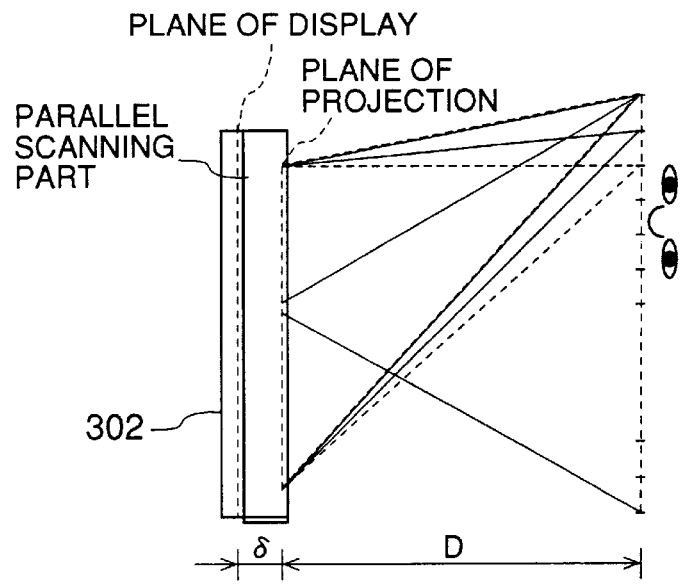
FIG. 30 shows a relation between the high-speed display device and the parallel scanning part according to the first embodiment, and the plane of projection.

FIG. 30 shows a relation between the high-speed display device and the parallel scanning part according to the first embodiment, and the plane of projection.

The image displayed in the high-speed display device 302 and the image created by the parallel scanning part (image perceived by a viewer) are displaced from each other. In order to obtain proper images, this displacement should be controlled to be negligible from the viewpoint of the viewer. This displacement is observed as astigmatism.

Therefore, in order to obtain proper images characterized by little astigmatism, the distance δ between the plane of display and the plane of projection, the distance D between the plane of projection and the plane of virtual apertures are set as per $$1/(\delta + D) > 1/D - (0.5/1000) \quad (1\text{-}4)$$

wherein it is assumed that an astigmatism as large as 0.5 diopter is permitted.

While it is assumed in FIG. 30 that the plane of projection and the plane of display of the display device match each other, proper images with little astigmatism can be obtained even if the planes do not match, as long as the above inequality is satisfied.

Figure 31:
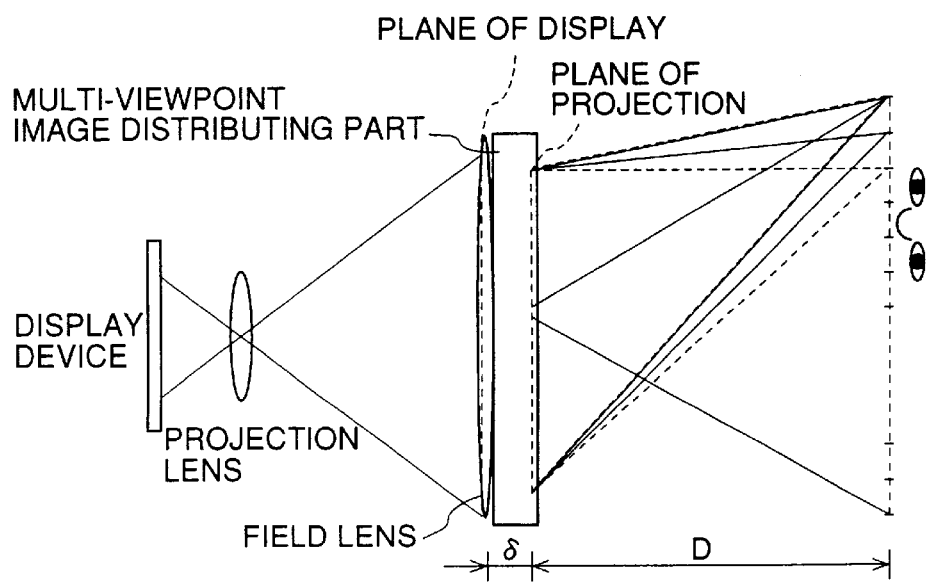
FIG. 31 shows an arrangement in which the plane of projection and the plane of display do not match.

FIG. 31 shows an arrangement in which the plane of projection and the plane of display do not match.

As shown in FIG. 31, when the image from the display device is supplied to the parallel scanning part through a projection lens and a field lens, the field lens is designated as the plane of display.

A description will now be given of the image distributing part according to the first embodiment.

FIGS. 32A–32C show how the image distributing part according to the first embodiment operates.

The image displayed in the high-speed display device 302 and shown in FIG. 32A is composed of a plurality of images shown in FIG. 32B.

More specifically, as shown in FIG. 32B, a group of images #1–#n are repeated with a horizontal period in the high-speed display device 302. Each of the groups of images #1–#n constituting the image displayed in the high-speed display device 302 are subject to parallel scanning and deflection by the parallel scanning part. The groups of images #1–#n are supplied to the virtual apertures 301-1–301-n shown in FIG. 32C.

The group of images are supplied to the corresponding one of the virtual apertures 301-1–301-n depending on its displayed position in the high-speed display device 302. The groups of images viewed on the virtual apertures 301-1–301-n differ from each other from one viewing angle to another. Accordingly, the viewer perceives different images with the right and left eyes on the plane of virtual apertures. Also, as the viewer changes the viewing angle, images taken from different angles can be viewed, resulting in stereoscopic vision.

In this embodiment, a group of images #1–#n repeated with a horizontal period are displayed in the high-speed display device 302. However, a different approach for displaying stereoscopic images may be employed.

Figures 33A, 33B:
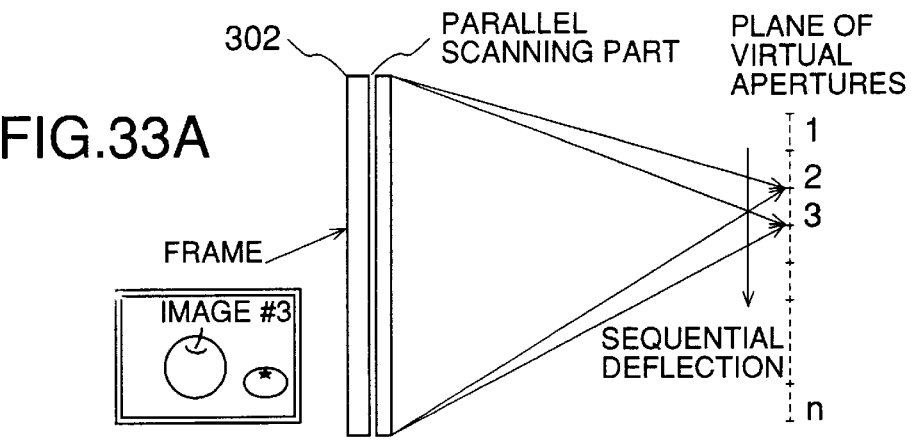
FIGS. 33A and 33B show an operating principle of a first variation of the image distributing part.

FIGS. 33A and 33B show a first variation of the image distributing method.

In this variation, as shown in FIG. 33A, a group of two-dimensional images #1–#n are displayed one after another in the high-speed display device 302. As shown in FIG. 33B, the parallel scanning part scans the virtual aperture 304-1 when the image #1 is displayed in the high-speed display device 302, scans the virtual aperture 304-2 when the image #2 is displayed in the high-speed display device 302, . . . , and scans the virtual aperture 304-n when the image #n is displayed in the high-speed display device 302.

By performing the deflective scanning as described above, different images taken from different angles are displayed in the virtual apertures 304-1–304-n. Parallax is therefore created so that the stereoscopic vision is achieved.

Figures 34A, 34B:
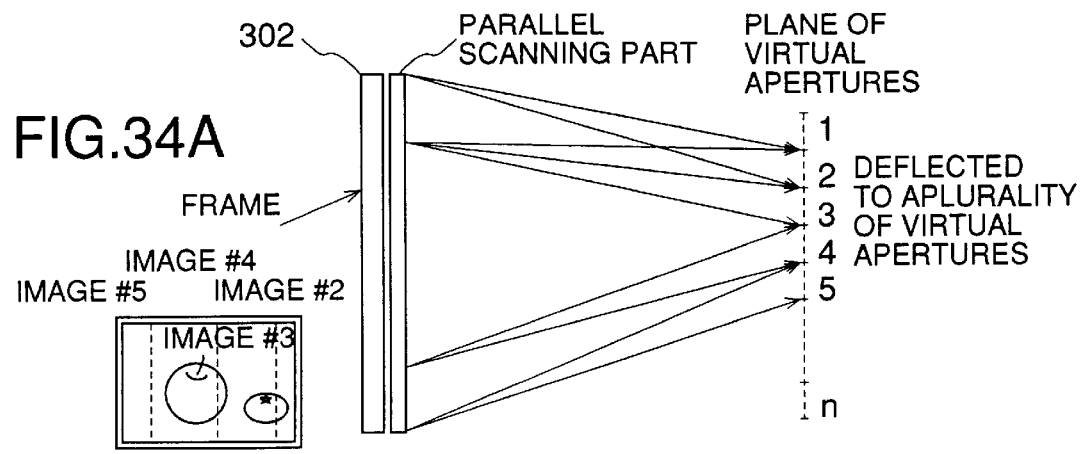
FIGS. 34A and 34B show an operating principle of a second variation of the image distributing part.

FIGS. 34A and 34B show a second variation of the image distributing method.

As shown in FIG. 34A, the second variation is constructed such that a predetermined number of images are synthesized on a screen of the high-speed display device 302. Stereoscopic vision is achieved by scanning the plurality of virtual apertures so that each synthesized image is selectively directed to the corresponding virtual apertures.

For example, it is assumed that, as shown in FIG. 34A, images #1, #2, #3, #4 and #5 are arranged in the stated order from right to left so that the synthesized image is displayed in the display device 302.

As shown in FIG. 34B, the displayed synthesized image is directed by the parallel scanning part to the corresponding ones of the virtual apertures 304-1–304-5 by deflective scanning.

By performing deflective scanning as described above, different images taken from different angles are displayed in the virtual apertures 304-1–304-5. Parallax is therefore created so that stereoscopic vision is achieved.

Figure 35:
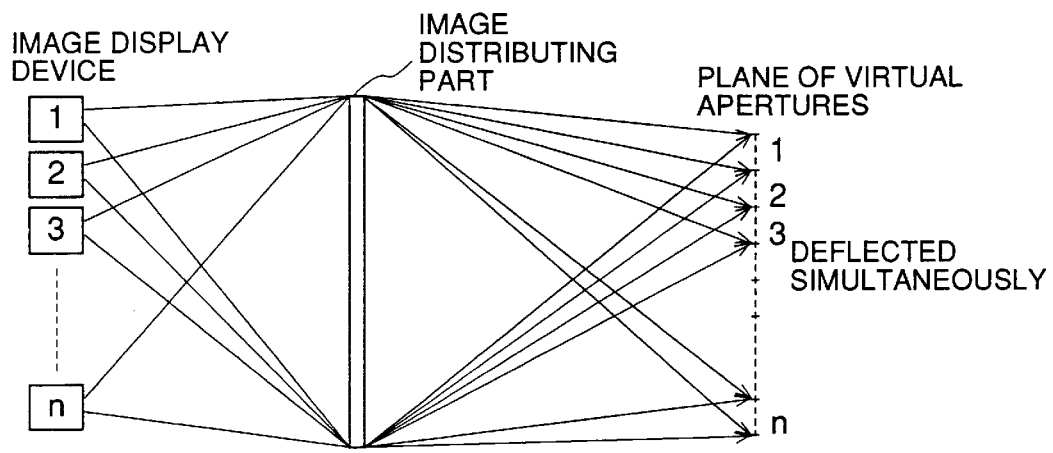
FIG. 35 shows an operating principle of a third variation of the image distributing part.

FIG. 35 shows a third variation of the image distributing part.

In the third variation, the high-speed display device 302 is embodied by a plurality of display devices 302-1–302-n each displaying a plurality of two-dimensional images. A plurality of two-dimensional images #1–#n displayed by each of the plurality of display devices 302-1–302-n are supplied to the parallel scanning part. The parallel scanning part simultaneously subjects the plurality of two-dimensional images #1–#n to deflective scanning so as to supply the same to the corresponding virtual aperture.

By performing deflective scanning as described above, different images taken from different angles are displayed in the virtual apertures 304-1–304-n. Parallax is therefore created so that stereoscopic vision is achieved.

A description will now be given of the visible range of the stereoscopic image.

Figure 36:
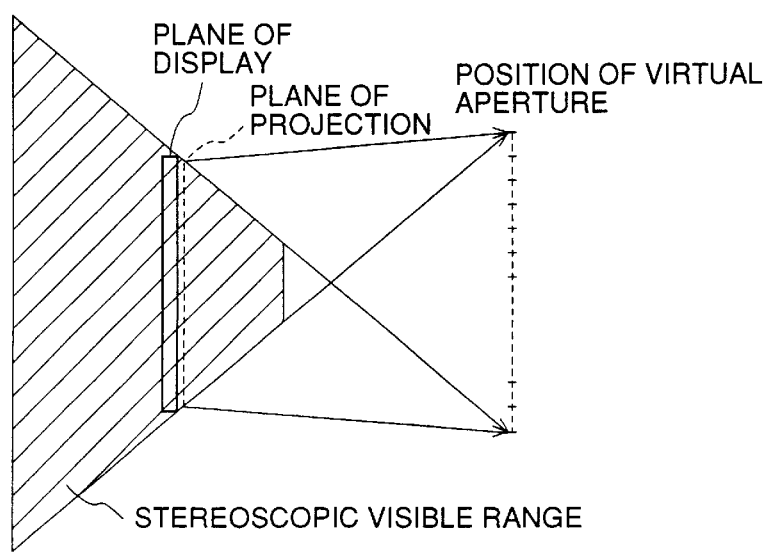
FIG. 36 shows a visible range of stereoscopic images.
Figure 37:
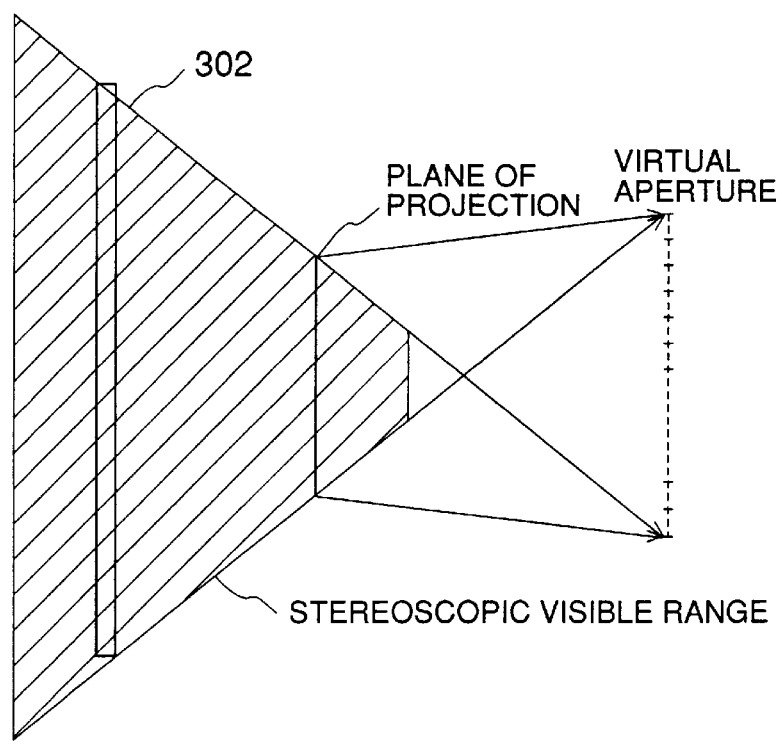
FIG. 37 shows another visible range of stereoscopic images.

FIGS. 36 and 37 depict a visible range of the stereoscopic image.

In the first embodiment, the plane of display and the plane of projection match each other, as shown in FIG. 36. When the plane of display and the plane of projection match, it is impossible to cause an object to appear to be apart from the plane of projection. For example, the object appears to exist in the field indicated by the diagonal lines in FIG. 36.

It is known that an approach to expand a stereoscopic visible range is to provide the plane of projection between the plane of display and the plane of virtual apertures so that the stereoscopic visible range is extended toward the viewer as indicated by the diagonal lines (Chihiro Masuda "Three-dimensional plasma display", Sangyo Tosho Publishing).

In order to provide the plane of projection between the plane of display and the plane of virtual apertures, a reflective optical element may be used, for example.

Figure 38:
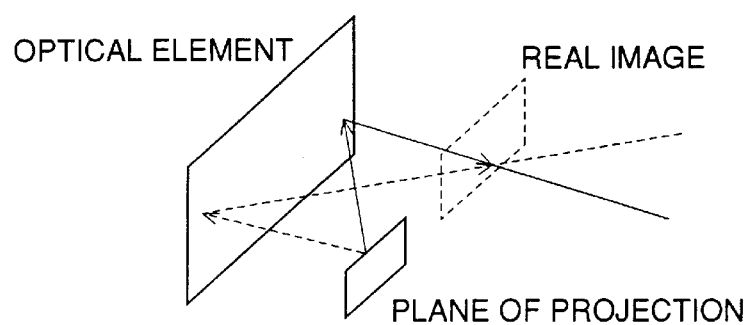
FIG. 38 shows an approach to expand the visible range of stereoscopic images.

FIG. 38 shows an approach to expand the stereoscopic visible range.

Figure 39:
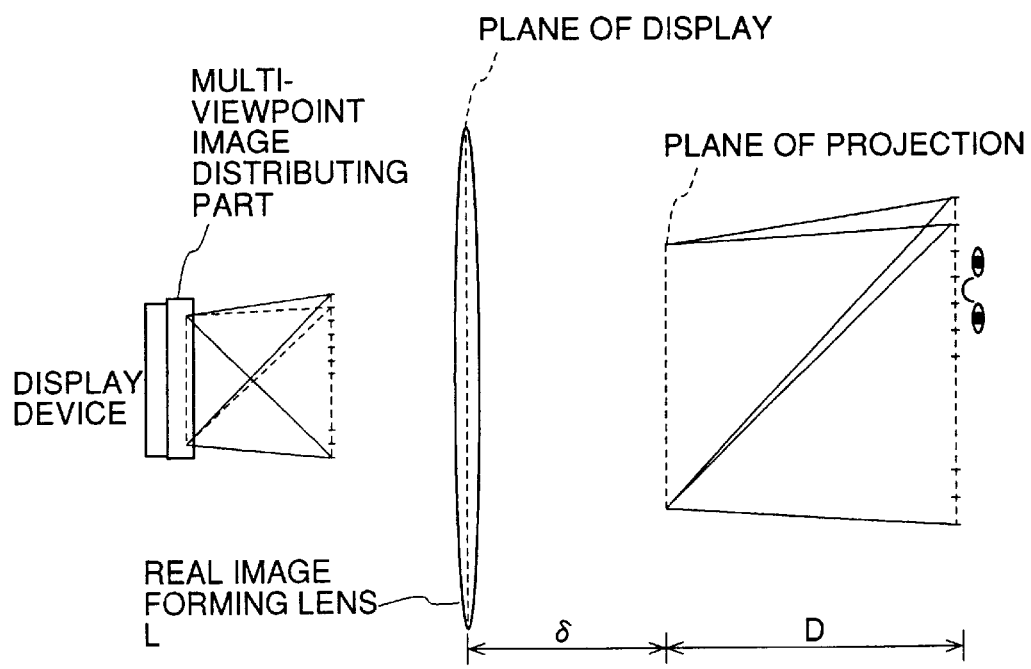
FIG. 39 shows how the plane of projection of FIG. 38 is implemented.

In this approach, the optical element displays a real image to implement the plane of projection. FIG. 39 shows how the plane of projection of FIG. 38 is implemented. As shown in FIG. 39, a lens L is provided between the high-speed display device 302 and the parallel scanning part so that the real image forming the plane of projection is projected at a distance of δ from the plane of display formed by the lens L. It is not necessary to satisfy the inequality (1-4) because the plane of projection is formed apart from the plane of display.

The parallel scanning part is not limited to mechanical implementation. Various methods for scanning and deflection are conceivable. A description will be given of a variation of the parallel scanning part.

Figure 40:
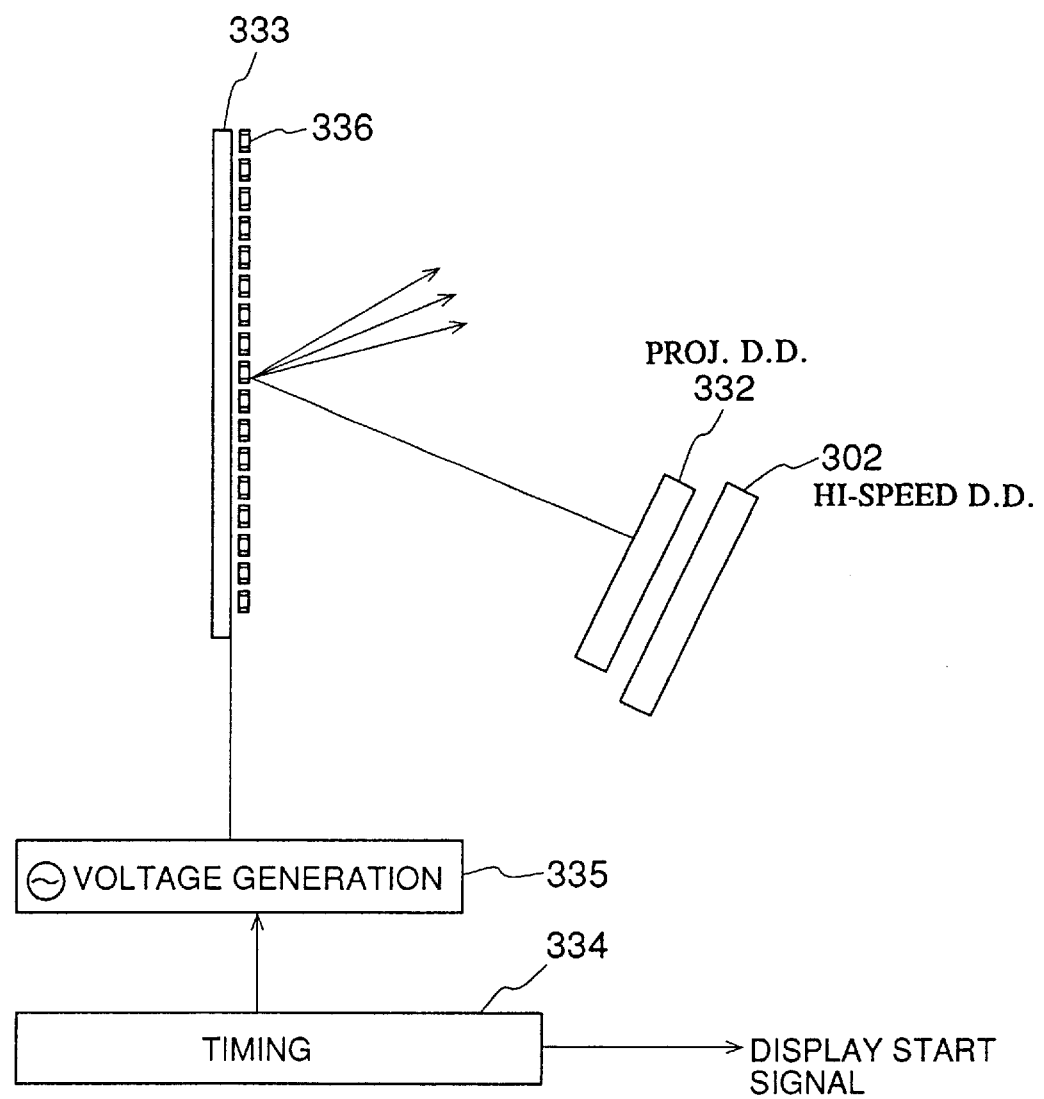
FIG. 40 shows a construction of a first variation of the parallel scanning part.
Figure 41A:
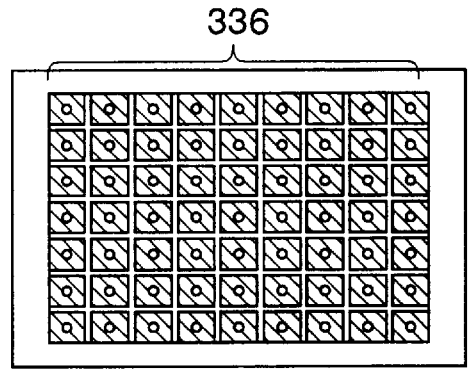
FIG. 41A shows a construction of a deformable mirror device.
Figure 41B:
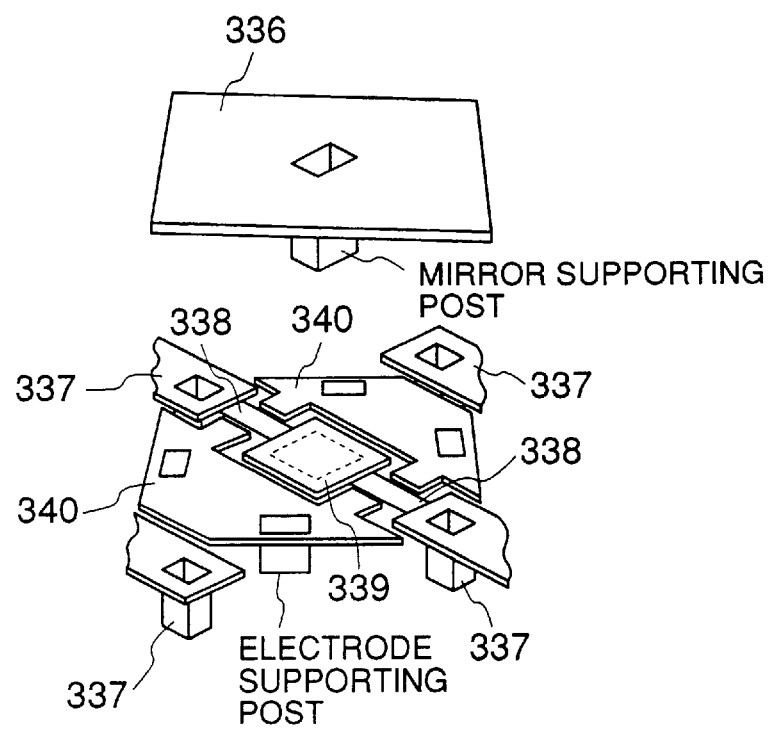
FIG. 41B shows a detailed construction of the deformable mirror device.

FIGS. 40, 41A and 41B show a construction of a first variation of the parallel scanning part.

In this variation, the scanning function is implemented by the DMD (deformable mirror device) method. For the operating principle of the DMD, see Nobuo Nishida "Digital micromirror device and its application to a display", O plus E, PP90–94, 10, 1994.

In this variation, the image displayed in the high-speed display device ("HI-SPEDD D.D.") 302 is projected to a DMD 333 via a projecting device 332 ("PROJ. DEVICE") constructed of a lens, an aperture and the like. The angle of a mirror of the DMD 333 is controlled by driving the voltage generating circuit 335 in accordance with a timing signal generated in the timing circuit 334 so that the multi-viewpoint image can be deflected.

As shown in FIG. 41A, the DMD 333 is constructed such that micromirrors 336 are arrayed on its surface. As shown in FIG. 41B, the micromirror 336 is secured to a yoke 339 coupled to a hinge supporting post 337 via a torsional hinge 338. By applying a voltage to an electrode 340 provided adjacent to the yoke 339, the yoke 339 is electromagnetically driven so that the angle of the micromirror 336 is controlled.

The multi-viewpoint images with parallax are displayed one after another in the high-speed display device 302. The multi-viewpoint images displayed in the high-speed display device 302 are projected to the DMD by the projecting device 332 (lens, aperture and the like). The angle of the individual mirrors in the mirror array of the DMD is controlled in correspondence with the individual images displayed in the high-speed display device 302.

The angle of the individual mirrors in the DMD mirror array is controlled so that the image #1 is directed to the virtual aperture 304-1. The angle of the individual mirrors in the DMD mirror array is controlled so that the image #2 with parallax with respect to the image #1 is directed to the virtual aperture 304-2. Similarly, the angle of the individual mirrors in the DMD mirror array is controlled so that the image #n is directed to the virtual aperture 304-n.

This variation is constructed such that the angle of the mirror can be controlled for each image element. By means of vertical control of the angle of the mirror, it is possible to produce images producing vertical parallax as well as images producing horizontal parallax. Therefore, stereoscopic images can be directed in a variety of directions for display.

Figure 42:
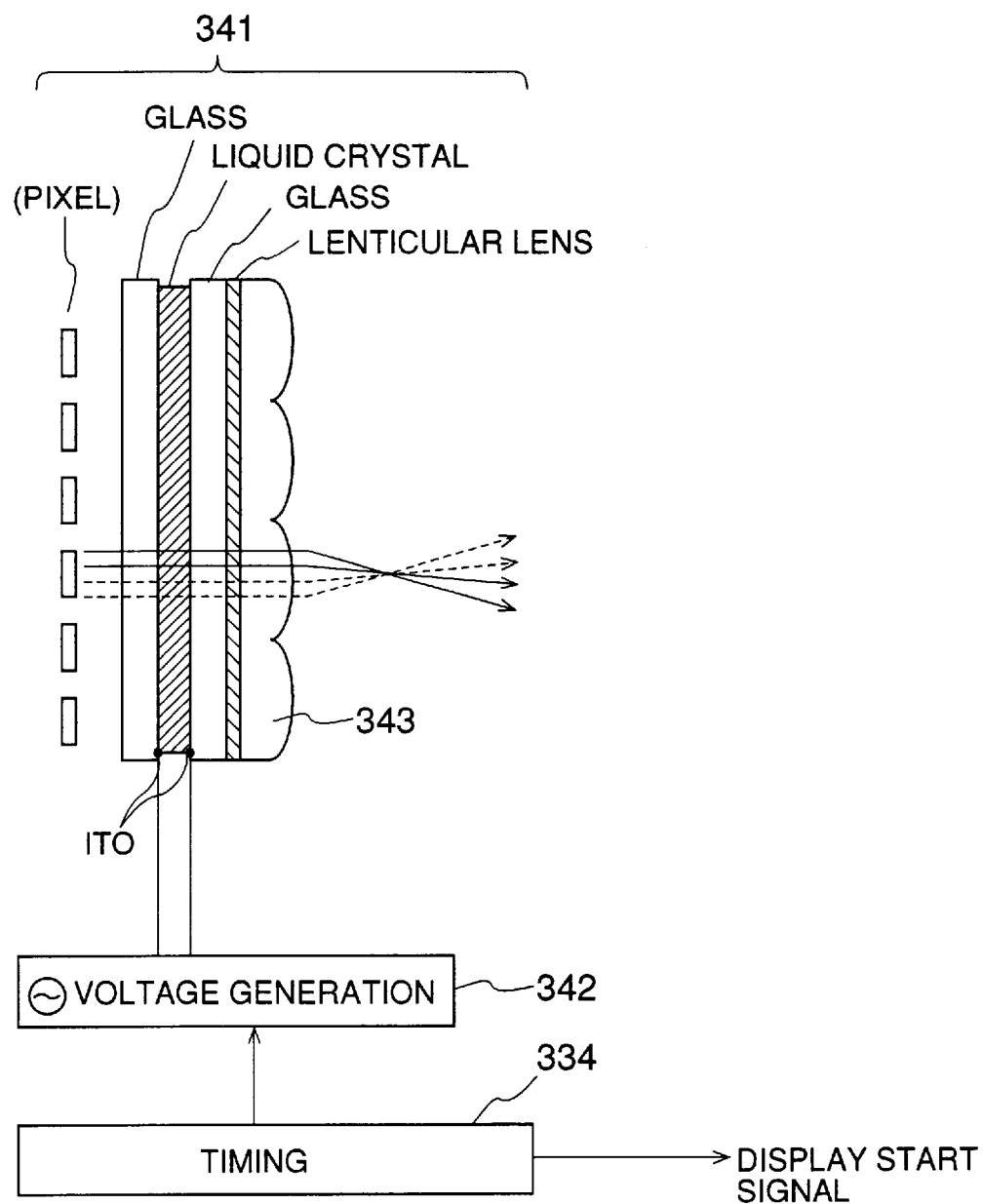
FIG. 42 shows a second variation of the parallel scanning part.
Figure 43A:
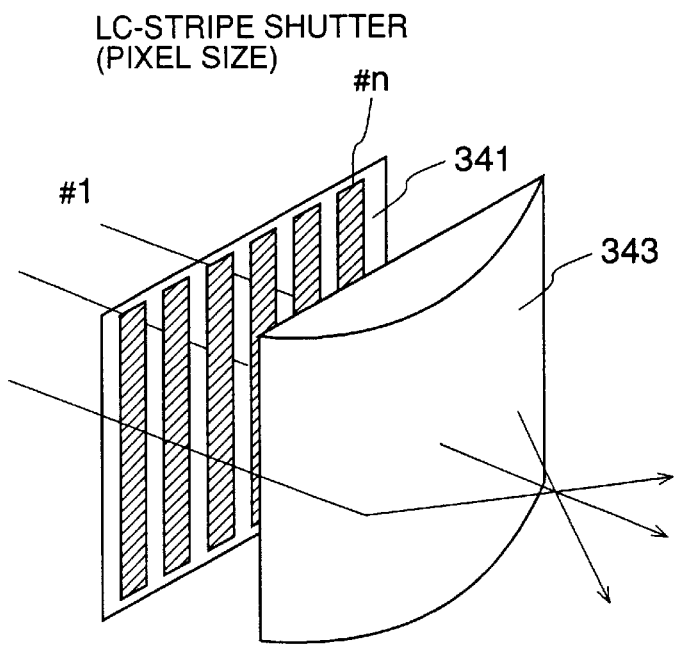
FIG. 43A shows electrodes for a liquid crystal shutter having a stripe formation.
Figure 43B:
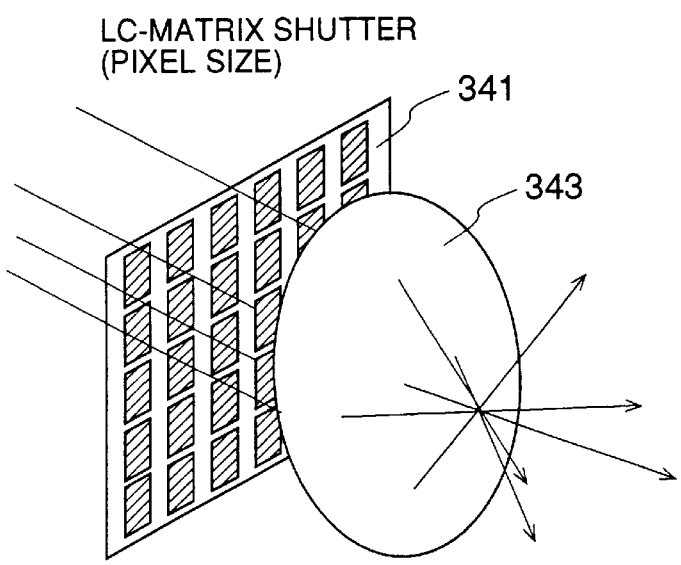
FIG. 43B shows electrodes for a liquid crystal shutter having a matrix formation.

FIGS. 42, 43A and 43B show a construction of a second variation of the horizontal scanning part. In FIGS. 42, 43A and 43B, those components that are the same as the components of FIG. 40 are designated by the same reference numerals and the description thereof is omitted.

In the second variation, scanning is effected by a liquid crystal shutter mechanism. A detailed description of scanning using a liquid crystal shutter mechanism is found in Japanese Laid-Open Patent Application No. 1-283546, for example.

In a liquid crystal shutter 341, slips of liquid crystals are arranged with a horizontal pitch commensurate with the pitch of the image elements on the high-speed display device 302 so as to alternately block and transmit light. The liquid crystal shutter 341 is coupled to a voltage generating circuit 342 and the position at which the image is transmitted is controlled according to a driving signal supplied from the voltage generating circuit 342. The image transmitted through the liquid crystal shutter 341 is converged on the corresponding virtual aperture.

A lenticular lens 343 is constructed such that individual lenses are arranged in a direction of the surface of the high-speed display device 302, with a pitch ensuring that the image elements displayed in the high-speed display device are projected onto the respective virtual apertures. With this arrangement, the image transmitted by the liquid crystal shutter 341 is converged and directed to the respective virtual aperture.

A shutter that corresponds to the image #1 is opened so that the image #1 is projected onto the virtual aperture 304-1. Then, a shutter that corresponds to the image #2 is opened so that the image #2 is projected onto the virtual aperture 304-2. Similarly, a shutter that corresponds to the image #n is opened so that the image #n is projected onto the virtual aperture 304-n.

As shown in FIG. 43B, electrodes for the liquid crystal shutter 341 may have a matrix formation, and the individual lenses that constitute the lenticular lens may have a circular form large enough to cover a plurality of electrodes in the matrix. In this way, the multi-viewpoint images can be supplied in various directions in accordance with opening and closing of the shutter. Therefore, the images can be scanned both vertically and horizontally so that images producing vertical as well as horizontal parallax can be supplied. Thus, stereoscopic images can be directed in a variety of directions for display.

While the liquid crystal shutter is used in this variation, shutters with a higher speed can be obtained by using an electro-optic crystal (EO) instead of the liquid crystal. An electro-optic crystal (for example, a Pockels crystal KDP or LiNbO$_3$) is known for its Kerr effects whereby the refractive index changes according to an electric field applied thereto. The shutters can be produced by rotating the polarization plane using the Kerr effects and using a polarizing element in combination with the electro-optic element.

Figure 44:
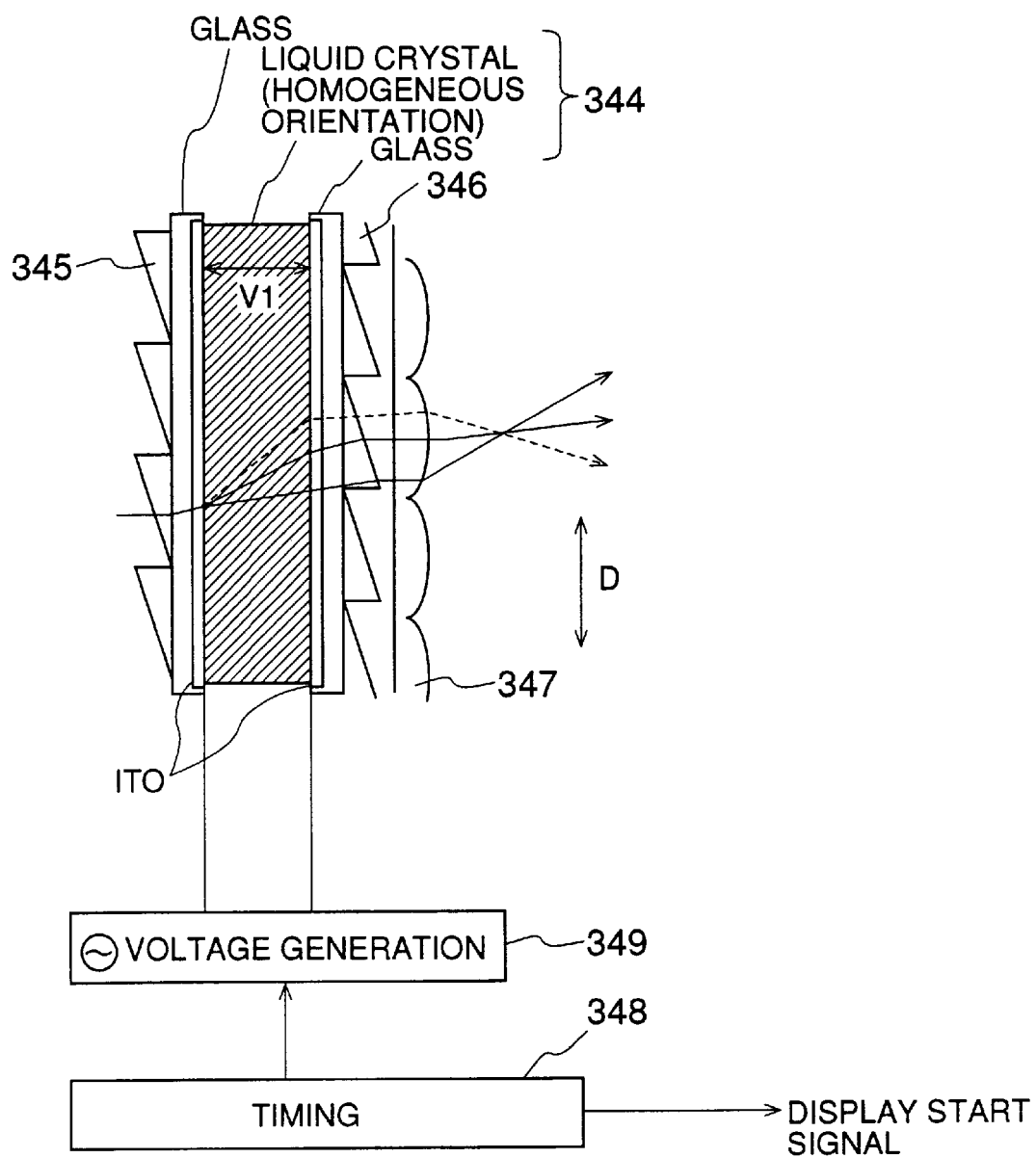
FIG. 44 shows a construction of a third variation of the parallel scanning part.

FIG. 44 shows a construction of a third variation of the parallel scanning part.

In this embodiment, scanning is effected by using a liquid crystal panel 344 with a homogeneous crystal orientation having mutually parallel transparent electrodes and having a positive dielectric anisotropy.

The liquid crystal of the liquid crystal panel 344 has a homogeneous crystal orientation. By applying a voltage to the transparent electrodes, the refractive index of the liquid crystal panel 344 is modulated so that a refractive index in the range of n0–ne (uniaxial liquid crystal) is applied to incident light having a polarization plane matching the crystal orientation.

The multi-viewpoint image from the high-speed display device 302 is tilted by a cylindrical Fresnel lens 345 and then supplied to the liquid crystal panel 344. Due to the refractive index provided by liquid crystal, the multi-viewpoint image supplied to the liquid crystal panel 344 is refracted by an angle determined by Snell's law.

The liquid crystal layer of the liquid crystal panel 344 is formed to be parallel with the electrodes so that the multi-viewpoint image transmitted through the liquid crystal layer outgoes therefrom at the same angle as the angle of incidence. The multi-viewpoint image outgoing from the liquid crystal is supplied to a cylindrical Fresnel lens 346 having the same shape as that of the cylindrical Fresnel lens 345 and output at the same angle as an angle by which the multi-viewpoint image is supplied from the high-speed display device 302.

The multi-viewpoint image supplied to the cylindrical Fresnel lens 346 and outgoing therefrom is supplied to a lenticular lens 347. The lenticular lens 347 refracts the multi-viewpoint image in a direction determined by the position of incidence. The multi-viewpoint image is then supplied to the corresponding virtual aperture.

The incident multi-viewpoint image and the outgoing multi-viewpoint image are parallel with each other. However, the optical axis of the outgoing multi-viewpoint image is shifted in the D directions indicated by the arrows. By modulating the refractive index of the liquid crystal appropriately, the refractive index of the liquid crystal changes so that the degree of the shift of the optical axis of the incident multi-viewpoint image changes.

By varying the degree of shift of the optical axis of the incident multi-viewpoint image, the incidence position of the multi-viewpoint image in the lenticular lens 347 changes so that the multi-viewpoint image can be deflected. Deflective scanning is achieved by parallel shifting of the incidence position in the lenticular lens 347 by modulating the refractive index of the liquid crystal.

The high-speed display device 302 displays images with parallax one after another and subjects the displayed images to the optical axis shifting process. The images are then projected onto the lenticular lens. An appropriate voltage is applied to the liquid crystal so that the resultant refractive index causes the image #1 to be directed to the virtual aperture 304-1. An appropriate voltage is applied to the liquid crystal so that the resultant refractive index causes the image #2 with parallax to be directed to the virtual aperture 304-2. Similarly, an appropriate voltage is applied to the liquid crystal so that the resultant refractive index causes the image #n with parallax to be directed to the virtual aperture 304-$n$.

The high-speed display device 302 is synchronized with the refractive index modulation in the liquid crystal by a the timing circuit 348 and a voltage generating circuit 349. By presenting the right and left eyes with images with parallax from mutually different virtual apertures, stereoscopic display vision is achieved.

While the liquid crystal panel 344 with a homogeneous crystal orientation having a positive dielectric anisotropy is used to shift the optical axis of the multi-viewpoint image in the above-described variation, an electro-optic material may also be used to shift the optical axis. In this case, a Pockels crystal (KDP or LiNbO$_3$) may be employed for its Kerr effects whereby the refractive index changes according to an electric field applied thereto.

Figure 45A:
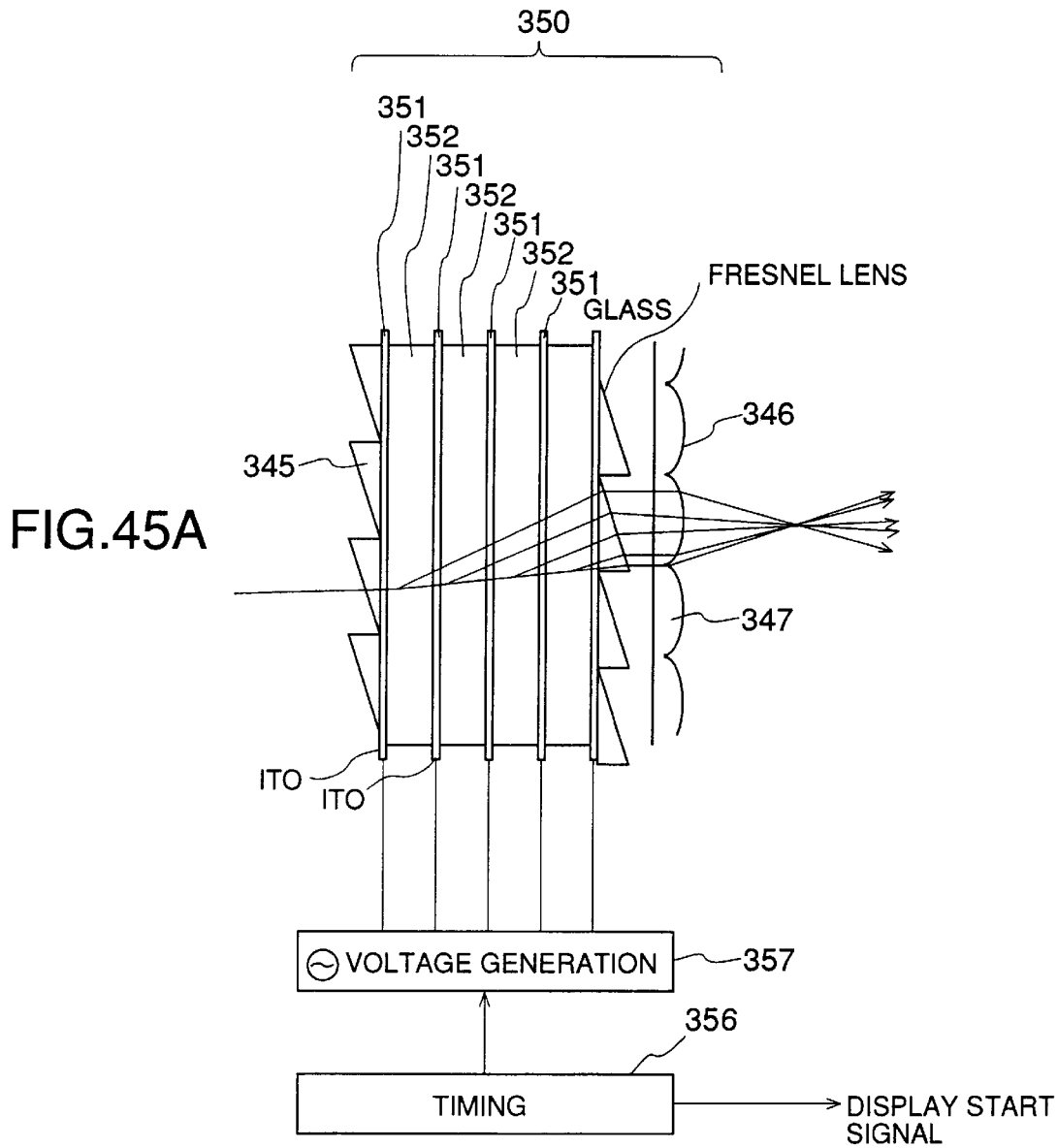
FIG. 45A shows a construction of a fourth variation of the parallel scanning part.
Figure 45B:
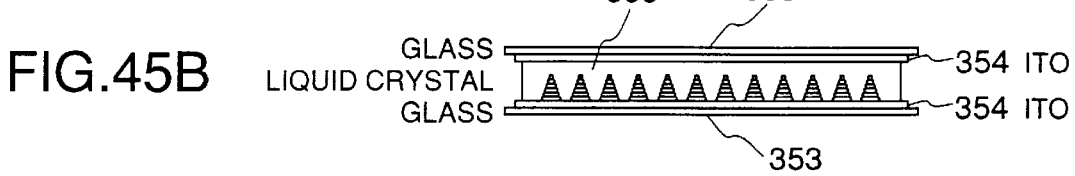
FIG. 45B shows a construction of a $\pi$ cell in the fourth variation of the parallel scanning part.

FIGS. 45A and 45B show a construction of a fourth variation of the parallel scanning part. In FIGS. 45A and 45B, those components that are the same as the components of FIG. 44 are designated by the same reference numerals and the description thereof is omitted.

The fourth variation is constructed such that a polarization plane rotating element for rotating a polarization plane of incident light is coupled to a liquid crystal layer to form one of a plurality of layers. By controlling the polarization characteristic of the polarization plane rotating element, the polarization plane differs from layer to layer, causing the liquid crystal layer to change its refractive index from layer to layer. The incident light is shifted according to the above-described mechanism and is made to enter the cylindrical Fresnel lens.

More specifically, the multi-viewpoint image from the high-speed display device 302 is tilted by the cylindrical Fresnel lens 345 and then supplied to a birefringent panel 350. As shown in FIG. 45A, the birefringent panel 350 is constructed such that a π cell 351 and a liquid crystal layer 352 are alternately disposed to form a layer.

FIG. 45B shows a construction of a π cell 351.

The π cell 351 is constructed such that a transparent electrode 354 is formed on a glass substrate 353. A TN orientation is formed on the transparent electrode 354. Another set of the glass substrate 353 and the transparent electrode 354 is produced to sandwich a nematic liquid crystal 355 having a positive dielectric anisotropy. When no voltage is applied to the transparent electrode 354, the π cell 351 causes the polarization plane of incident light to be rotated by 90 degrees. When a saturation voltage is applied to the transparent electrode 354, the π cell 351 loses its capability of rotating the polarization plane.

The degree by which the optical axis of the incident light is shifted is controlled by providing different combinations of the thickness and the refractive index of the π cell 351 coupled to the liquid crystal layer 352.

When the incident light is required to be shifted by a large degree, a saturation voltage is applied to the transparent electrode 354 of the π cell 351 receiving the light and adjacent to the liquid crystal layer 352 having a relatively great thickness or refractive index, so that the rotating capability is lost. The angle of refraction of the incident light is thus controlled so that the angle of polarization is controlled.

The high-speed display device 302 displays images with parallax one after another and subjects the displayed images to the optical axis shifting process. The images are then projected onto the lenticular lens. The plurality of π cells 351 are selectively operated so that the image #1 is directed to the virtual aperture 304-1, the image #2 is directed to the virtual aperture 304-2, . . . , and the image #n is directed to the virtual aperture 304-n.

The π cell 351 and the display device 302 are synchronized with each other by a timing circuit 356 and a voltage generating circuit 357. Images with parallax are supplied from different virtual apertures to the right eye and to the left eye of the viewer. Accordingly, the viewer is able to perceive stereoscopic images.

While the liquid crystal layer 352 is sandwiched between the π cells 351 in the fourth variation, a polymer layer having birefringence may be sandwiched between the π cells 351 instead of the liquid crystal. The polymer layer having birefringence may be a polyethyleneterephthalate (PET) film extended in one direction.

Due to birefringence, such a film exhibits different refractive indexes with different polarization planes, like the liquid crystal and therefore can be used in place of the liquid crystal.

It is also possible to use a crystal having birefringence instead of the liquid crystal layer 352 or the PET film. Calcites and rock crystals are known to have birefringence. Since such crystals exhibit different refractive indexes with different polarization planes due to birefringence, they can be used in place of the liquid crystal layer 352.

Figure 46:
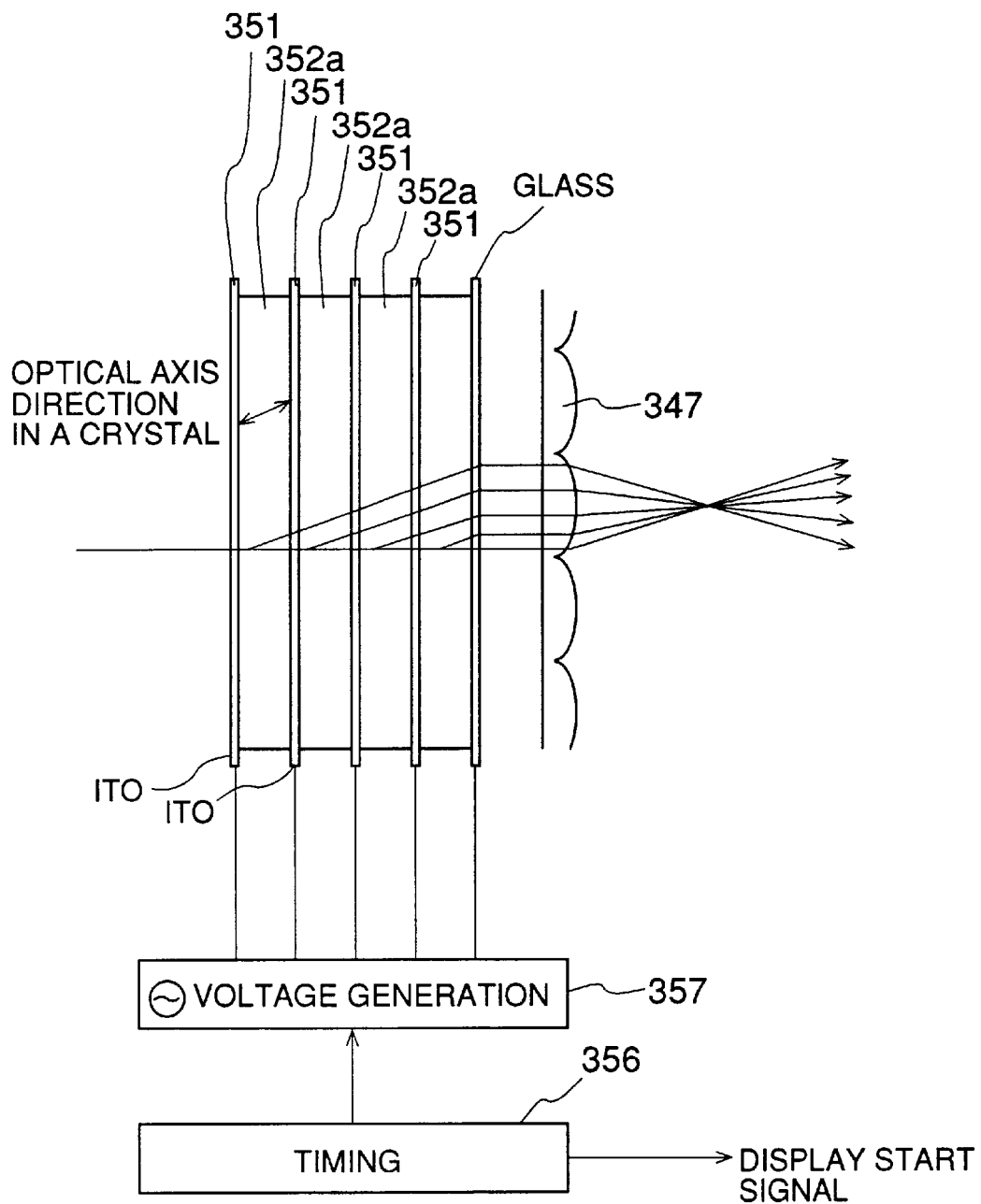
FIG. 46 shows a construction of a fifth variation of the parallel scanning part.

FIG. 46 shows a construction of a fifth variation of the parallel scanning part. Those components that are the same as the component of FIG. 46 are designated by the same reference numerals and the description thereof is omitted.

The parallel scanning part of the fifth variation is constructed such that the liquid crystal layer 352 of the fourth variation sandwiched by the π cells 351 is replaced by an optical crystal layer 352a so that the Fresnel lenses 345 and 346 are omitted.

The optical crystal layer 352a is composed of a birefringent crystal such as a calcite or a rock crystal. An optical crystal such as a calcite or a rock crystal is known to be capable of separating two polarization planes (of an ordinary ray and an extraordinary ray), the separation being achieved by tilting an optical axis of the crystal layer. Therefore, it is not necessary to cause incident light and outgoing light to be tilted. Thus, it is not necessary to provide the Fresnel lenses 345 and 346.

Figure 47A:
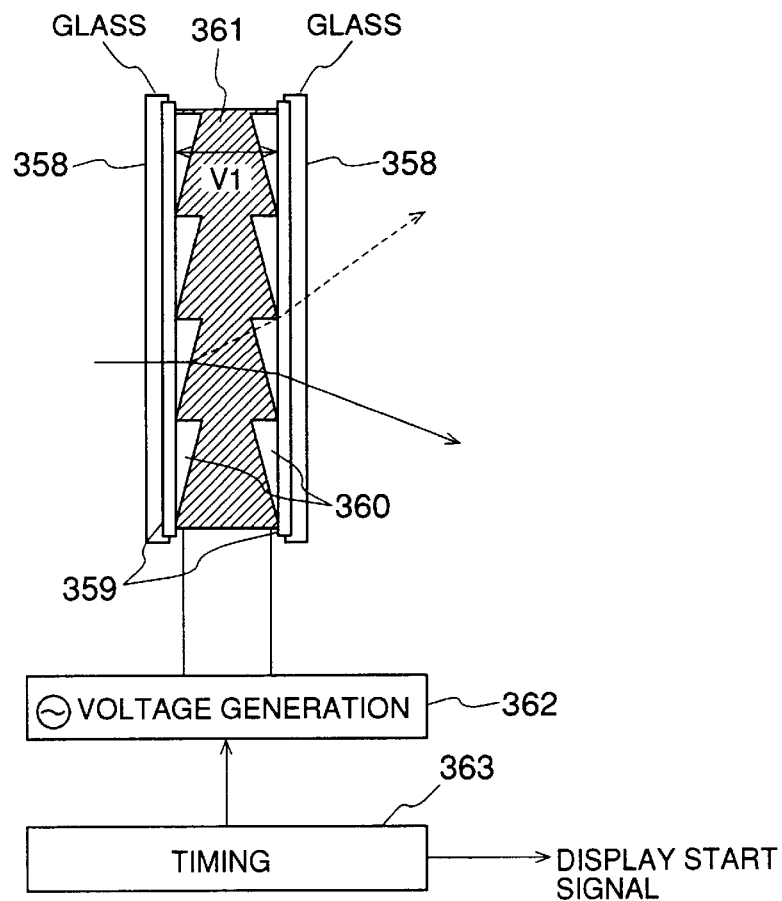
FIG. 47A shows a construction of a sixth variation of the parallel scanning part.
Figure 47B:
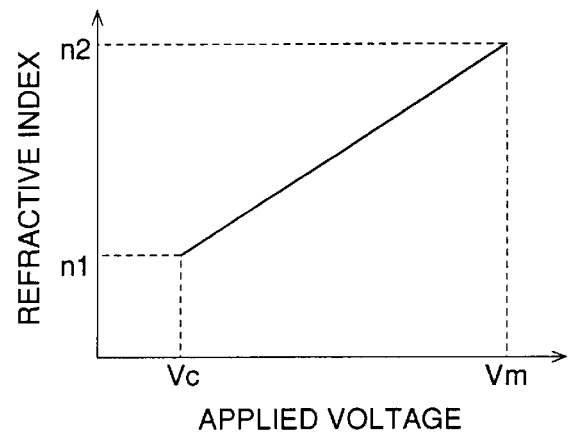
FIG. 47B shows a relation between an applied voltage and a refractive index in the sixth variation of the parallel scanning part.

FIGS. 47A and 47B show a construction of a sixth variation of the parallel scanning part.

In the sixth variation, a liquid crystal lens is used. Japanese Laid-Open Patent Application No. 58-50339 and No. 3-6518 and the like disclose a principle of providing refraction using a liquid crystal lens.

As shown in FIG. 47A, the parallel scanning part of the sixth variation is constructed such that a transparent electrode 359 is formed on a glass substrate 358. A Fresnel lens 360 provided with individual annular lenses at a period of images #1, #2, . . . , #n is formed on the transparent electrode 359. Another set of the glass substrate 358, the transparent electrode 359 and the Fresnel lens 360 is coupled face-to-face with the first set such that the peaks of the individual annular lenses of the two sets face each other. A liquid crystal 361 is sandwiched between the two Fresnel lenses. Therefore, the liquid crystal 361 has a prism-like appearance. The Fresnel lens 360 is manufactured by a so called 2P method in which an ultraviolet hardening resin is injected into a die used for producing an optical disk. The liquid crystal 361 is a nematic crystal having a positive dielectric anisotropy and has a homogeneous orientation parallel with the lens pattern.

As shown in FIG. 47B, when a voltage $V_c-V_m$ V is applied to the transparent electrode 359, the apparent refractive index of the liquid crystal 361 with respect to incident light changes between n1 and n2. Thus, the deflection angle provided by the parallel scanning part is determined by Snell's law defining the relationship between the refractive index n1–n2 of the liquid crystal 361 and the angle of incidence.

The images with parallax are displayed in the high-speed display device 302 and projected onto the liquid crystal 361. The voltage is applied from a voltage generating circuit 362 to the transparent electrode 359 so that the image #1 is directed to the virtual aperture 304-1, the image #2 is directed to the virtual aperture 304-2, . . . , and the image #n is directed to the virtual aperture 304-n. The voltage applied to the liquid crystal 361 is synchronized with the high-speed display device 302 by a timing circuit 363. Images with parallax are supplied from different virtual apertures to the right eye and to the left eye of the viewer. Accordingly, the viewer is able to perceive stereoscopic images.

The variation of the refractive index in the sixth variation of the parallel scanning part described above occurs in a range 0–5V. The refractive index is not increased beyond the saturation voltage 5V.

One conceivable approach to obtain a large amount of shift is by building the liquid crystal prism of the sixth variation into layers.

Figure 48:
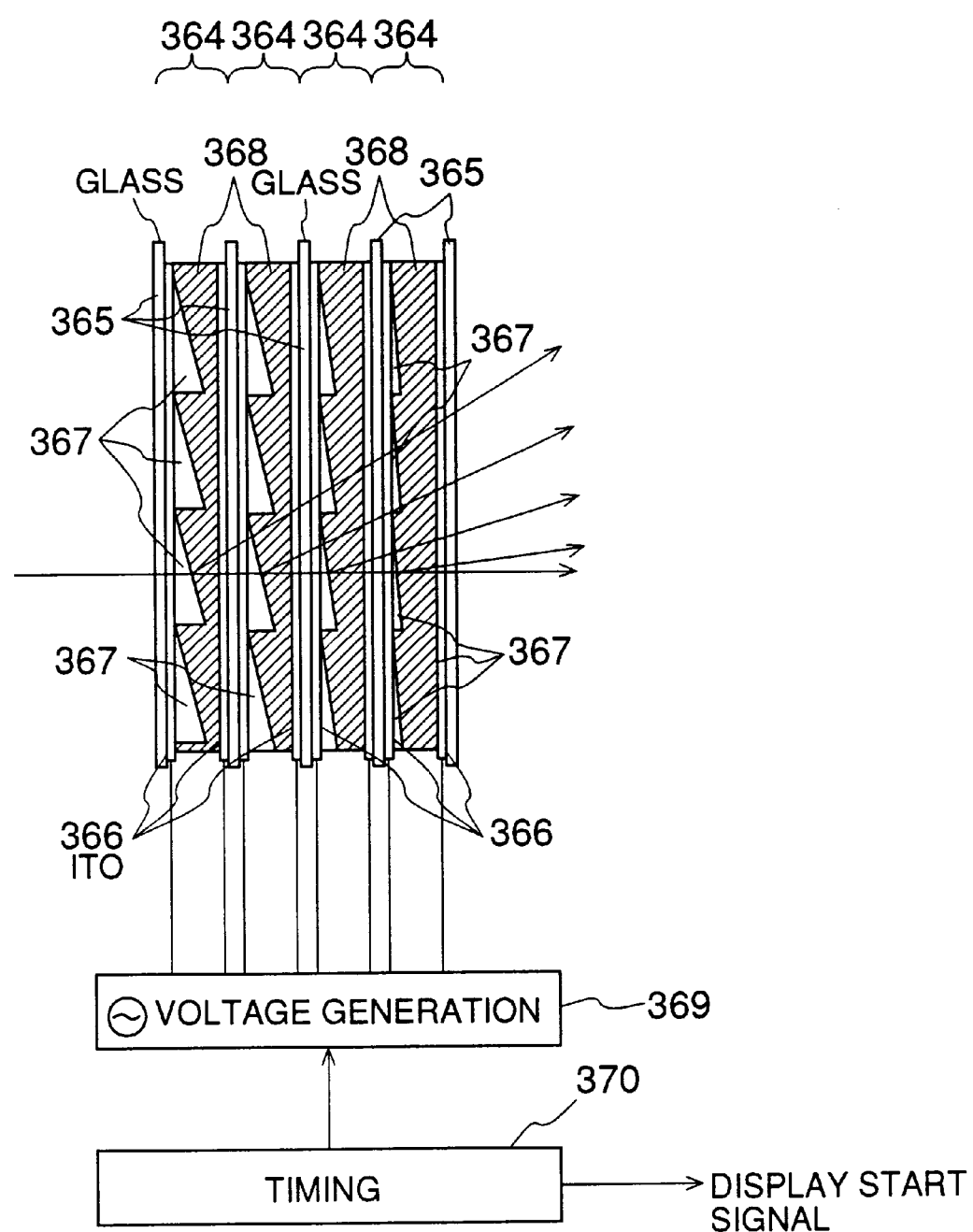
FIG. 48 shows a construction of a seventh variation of the parallel scanning part.

FIG. 48 shows a construction of a seventh variation of the parallel scanning part.

The parallel scanning part of the seventh variation is constructed such that a plurality of liquid crystal prisms 364 are built as layers. The liquid prism 364 forming each of the layers is constructed such that a transparent electrode 366 is formed on a glass substrate 365. Two transparent electrodes 366 each formed on the glass substrate 365 sandwich a Fresnel lens 367 provided with individual annular lenses at a period of images #1, #2, . . . , #n and a liquid crystal 368. The Fresnel lenses 367 have different thicknesses from layer to layer so as to provide a relatively large refractive index on the incidence side and a relatively small refractive index on the outgoing side.

Like the fifth variation, when a voltage $V_c-V_m$ V is applied to the transparent electrode 366, the apparent refractive index of the liquid crystal 368 with respect to incident light changes between n1 and n2. Thus, the deflection angle provided by the parallel scanning part is determined by Snell's law defining the relationship between the refractive index n0–ne of the liquid crystal 368 and the angle of incidence.

The images with parallax are displayed in the high-speed display device 302 and projected onto the liquid crystal prism 364. The saturation voltage is selectively applied from a voltage generating circuit 369 to the plurality of liquid crystal prisms 364 so as to control the refractive index. Thus, the image #1 is directed to the virtual aperture 304-1, the image #2 is directed to the virtual aperture 304-2, . . . , and the image #n is directed to the virtual aperture 304-n. The voltage applied from the voltage generating circuit 369 to the transparent electrode 366 is either a non-saturation voltage or a saturation voltage. By selectively driving the plurality of liquid crystal prisms 364, the refractive index is controlled.

The voltage applied from the voltage generating circuit 369 to the liquid crystal 368 is synchronized with the high-speed display device 302 by a timing circuit 370. Images with parallax are supplied from different virtual apertures to the right eye and to the left eye of the viewer. Accordingly, the viewer is able to perceive stereoscopic images.

Figure 49:
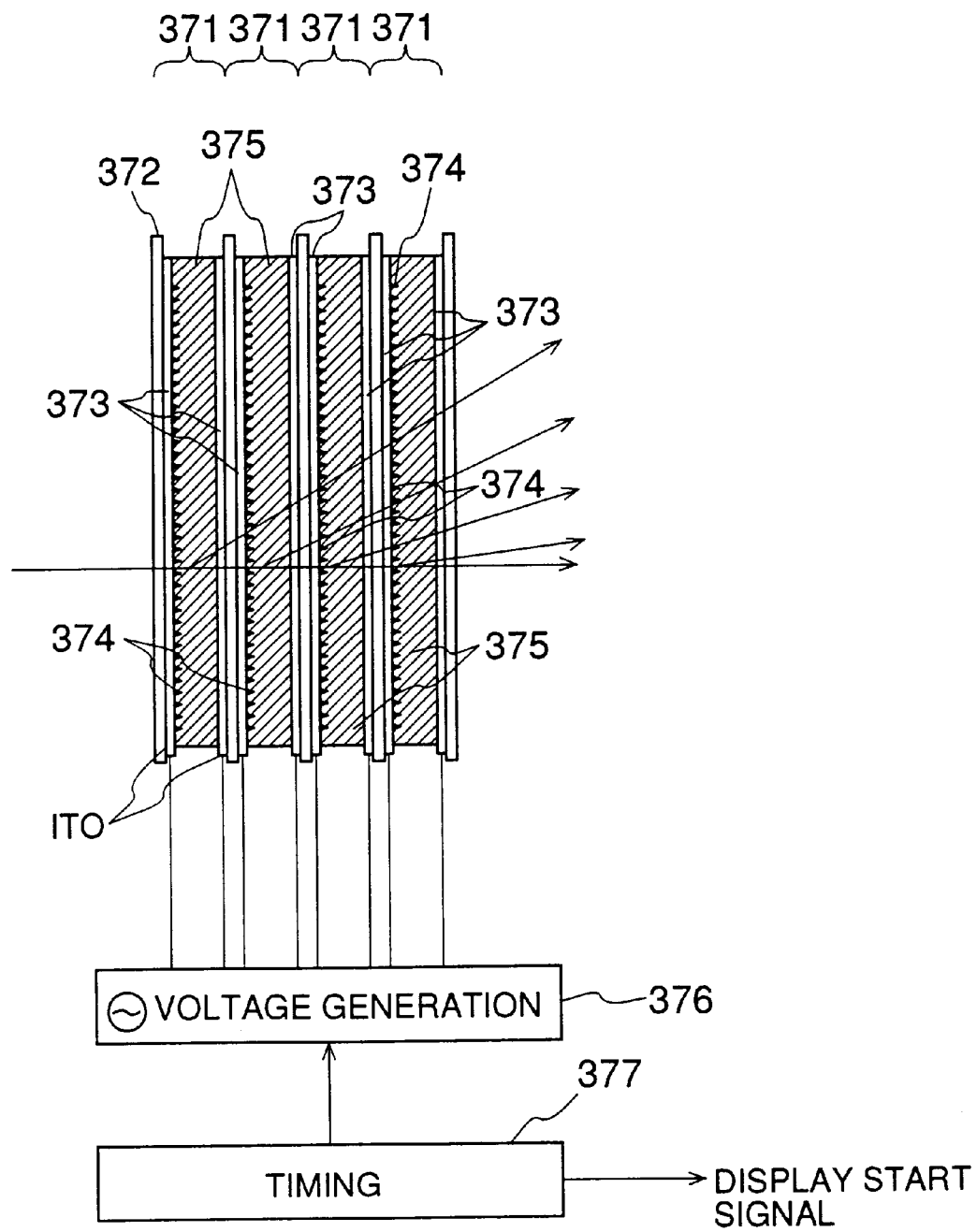
FIG. 49 shows a construction of an eighth variation of the parallel scanning part.

FIG. 49 shows a construction of an eighth variation of the parallel scanning part.

The parallel scanning part of the eighth variation effects parallel scanning by a liquid crystal panel using a relief diffraction grating (hologram).

The parallel scanning part of the eighth variation is composed of a plurality of liquid crystal panels 371. The liquid crystal panel 371 is constructed such that a transparent electrode 373 is vapor deposited on a glass substrate 372 and a hologram 374 is formed on the transparent electrode 373. The hologram 374 is produced by injecting an ultraviolet resin into a die according to the 2P method used to produce optical disks. A liquid crystal 375 is sandwiched between the adjacent glass substrates 372.

The liquid crystal 375 is characterized by a homogeneous orientation and its refractive index can be modulated in a range n0–ne. The pitch of the grating of the hologram 374 is set such that the refractive index ranges between n0 and ne, the same range over which the refractive index of the liquid crystal 375 varies.

When the refractive index of the liquid crystal 375 is modulated so as to match the refractive index of the hologram 374, the hologram 374 is deactivated. That is, by modulating the refractive index of the liquid crystal 375 in accordance with a variation in the voltage, the effect of the hologram 374 can be activated or canceled. The principle producing such an effect is described in Japanese Laid-Open Patent Application No. 61-86727.

The hologram 374 provided toward the incident side has a relatively large spatial frequency. The spatial frequency of the hologram 374 formed on a given glass substrate 372 is regular over its extent so that a regular angle of diffraction is available on a given glass substrate 372.

The refractive index of the liquid crystal 375 of the plurality of liquid crystal panels 371 is selectively made to match the refractive index of the hologram 374 by a voltage generating circuit 376 so that a desired deflection angle can be selected.

The images with parallax are displayed in the high-speed display device 302 and projected onto the liquid crystal panel 371. The refractive index of the plurality of liquid crystal panels 371 is selectively controlled by a voltage generating circuit 376 to match the refractive index of the hologram 374 such that the image #1 is directed to the virtual aperture 304-1, the image #2 is directed to the virtual aperture 304-2, . . . , and the image #n is directed to the virtual aperture 304-n.

The voltage applied from the voltage generating circuit 376 to the liquid crystal 375 is synchronized with the high-speed display device 302 by a timing circuit 377. Images with parallax are supplied from different virtual apertures to the right eye and to the left eye of the viewer. Accordingly, the viewer is able to perceive stereoscopic images.

Figure 50A:
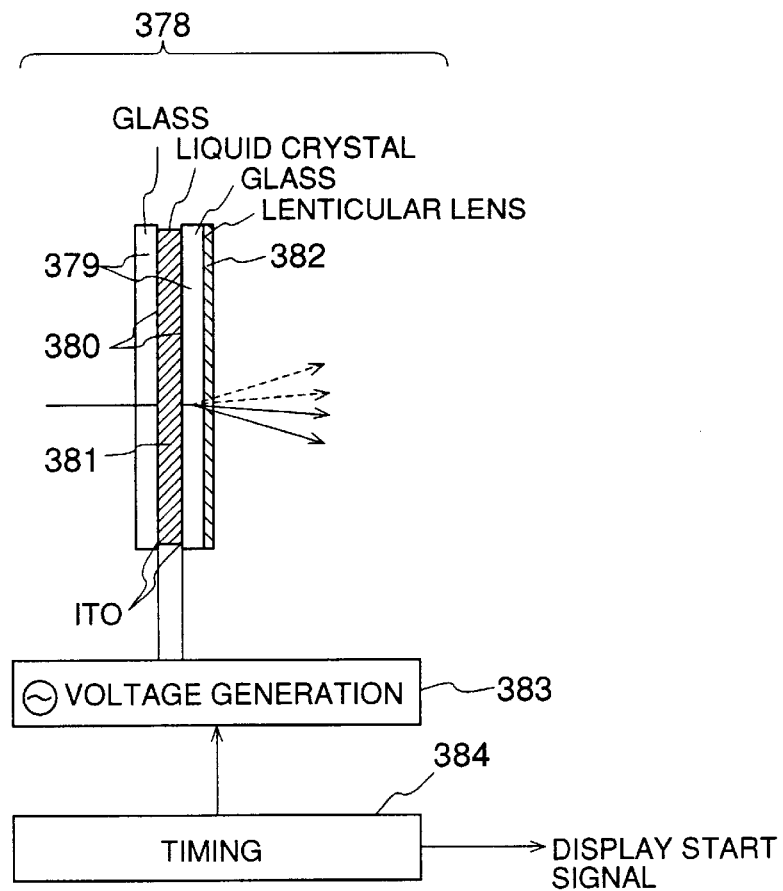
FIG. 50A shows a construction of a ninth variation of the parallel scanning part.
Figure 50B:
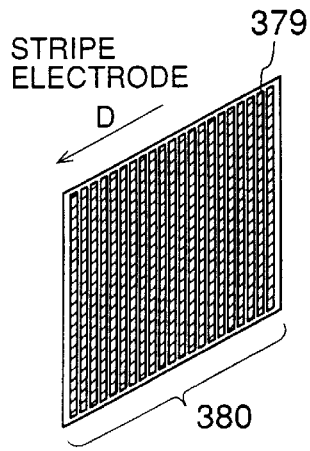
FIG. 50B shows a construction of a liquid crystal panel in the ninth variation of the parallel scanning part.
Figure 51A:
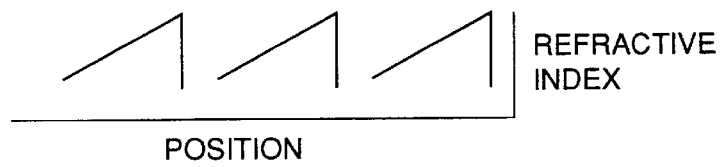
FIGS. 51A and 51B show an operating principle of the parallel scanning part of the ninth variation.
Figure 51B:
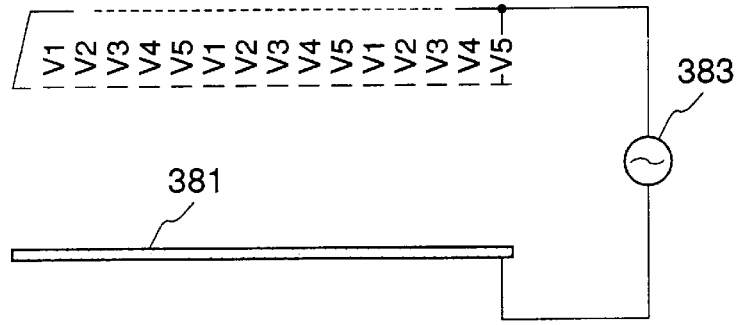

FIGS. 50A and 50B show a construction of a ninth variation of the parallel scanning part. FIGS. 51A and 51B show the operating principle of the parallel scanning part of the ninth variation.

The parallel scanning part of the ninth variation is designed to deflect incident light using a liquid crystal having a variable grating mode (VGM). A detailed description of how light is deflected using the VGM is found in Japanese Laid-Open Patent Application No. 5-66427.

Referring to FIGS. 50A and 50B, a liquid crystal panel 378 having the VGM is constructed such that glass substrates 379, on each of which a stripe-shaped transparent electrode 380 is formed, sandwich a liquid crystal 381. A lenticular lens 382 having a period in the same direction as the period of the stripe-shaped transparent electrode 380 is provided at the outgoing side.

The transparent electrode 380 is formed as stripes having a period in the horizontal direction (the D direction indicated by the arrow D). The period of the transparent electrode 380 is configured to have a period of images #1–#n.

The VGM is a mode in which the refractive index of the liquid crystal changes when a voltage applied to the liquid crystal is raised beyond a predetermined level. By varying the applied voltage, the deflection angle of the incident light can be controlled as desired.

The images with parallax are displayed in the high-speed display device 302 and projected onto the liquid crystal panel 378. The voltage supplied from a voltage generating circuit 383 to the transparent electrode 380 is controlled such that such that the image #1 is directed to the virtual aperture 304-1, the image #2 is directed to the virtual aperture 304-2, . . . , and the image #n is directed to the virtual aperture 304-n.

Referring to FIGS. 51A and 51B, voltages at a number of levels (V1–V5, for example) corresponding to the number of image elements may be set in the transparent electrode 380 formed of stripes so that the refractive index exhibits a saw-tooth variation with a period commensurate with the period of the multi-viewpoint image. In this way, the multi-viewpoint images #1–#n are deflected at different angles. The viewer is thus able to view images with parallax, i.e., different images at different viewing angles.

The voltage applied by the voltage generating circuit 383 to the liquid crystal 381 is synchronized with the high-speed display device 302 by a timing circuit 384. Images with parallax are supplied from different virtual apertures to the right eye and to the left eye of the viewer. Accordingly, the viewer is able to perceive stereoscopic images.

The transparent electrode 380 of the ninth variation is formed as stripes so as to distribute multi-viewpoint images horizontally and supply images with parallax to respective virtual apertures, in order to obtain stereoscopic vision. Alternatively, by forming the transparent electrodes as a matrix and controlling the deflection angle using individual electrodes, the multi-viewpoint images can be distributed both horizontally and vertically so that stereoscopic vision can be directed in a variety of directions.

While the liquid crystal is used in a VGM mode in the ninth variation, an electro-optic material can be operated in the same way as the liquid crystal having the VGM mode. In order to use an electro-optic material to perform the operation described above, the liquid crystal 381 of FIG. 50A may be replaced by an electro-optic material.

Since the electro-optic material changes its refractive index in accordance with a voltage applied thereto, by changing the voltage applied to the transparent electrode 380 as shown in FIG. 51A, the multi-viewpoint images #1–#n can be supplied to the virtual apertures 304-1–304-n, respectively. Accordingly, images with parallax are supplied from different virtual apertures to the right eye and to the left eye of the viewer. Accordingly, the viewer is able to perceive stereoscopic images.

A detailed description of how light can be deflected using an electro-optic material is found in Heihachi Sato "EO (electro-optic) lens", O plus E, pp 106–111, 3, 1991.

By forming the transparent electrode of the electro-optic material as a matrix, stereoscopic vision can be directed in a variety of directions.

FIG. 52 shows a schematic construction of a stereoscopic image display device according to a second embodiment of the present invention.

The second embodiment is designed to reduce the amount of transmitted data by detecting the position of the viewer, selecting only multi-viewpoint image data that is necessary and sufficient for stereoscopic vision at the detected position, and supplying the selected data to an image distributing part (MV IMAGE PROCESSOR) 600.

A multi-viewpoint image processing part 500 comprises a viewer position detecting part 501 for detecting the position of the viewer and a image selecting/processing part 502 for selecting multi-viewpoint images necessary and sufficient for stereoscopic vision at the position detected by the viewer position detecting part 501, and supplying the selected images to the image distributing part 600.

The viewer position detecting part 501 detects the position of the viewer using a sensor.

The image selecting/processing part 502 selects multi-viewpoint images that are necessary for stereoscopic vision at the detected position of the viewer and supplies the same to the image distributing part 600.

Figure 53:
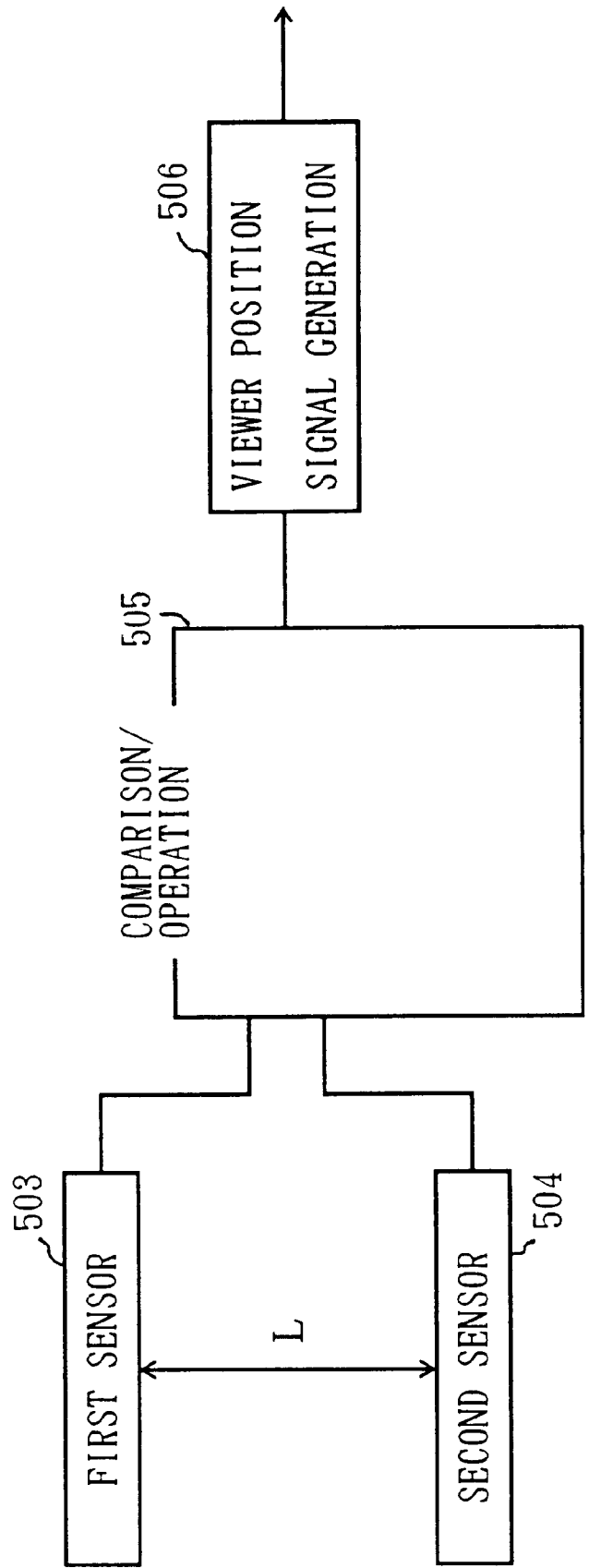
FIG. 53 is a block diagram showing a viewer position detecting part according to a second embodiment.

FIG. 53 is a block diagram showing the viewer position detecting part 501.

The viewer position detecting part 501 comprises a first sensor 503 for making a two-dimensional determination of the position of the viewer, a second sensor 504 spaced apart from the first sensor 503 by a predetermined distance L so as to make a two-dimensional determination of the position of the viewer, a comparing/calculating circuit 505 for comparing the outputs of the first and second sensors 503 and 504 so as to determine the position of the viewer based on a difference between the two outputs, and a viewer position signal generating circuit 506 for generating a signal indicating the position of the viewer based on the output of the comparing/calculating circuit 505 and supplying the generated signal to the image selecting/processing part 502.

Each of the first and second sensors is implemented by a charge coupled device spaced apart from each other by the distance L. Each of the charge coupled devices takes an image of the viewer.

The image of the viewer taken by the first and second sensors 503 and 504 is subject to image processing so that an image of the head of the viewer is extracted and supplied to the comparing/calculating circuit 505. The comparing/calculating circuit 505 calculates the distance between the sensors and the viewer based on a difference between the extracted images.

Figure 54:
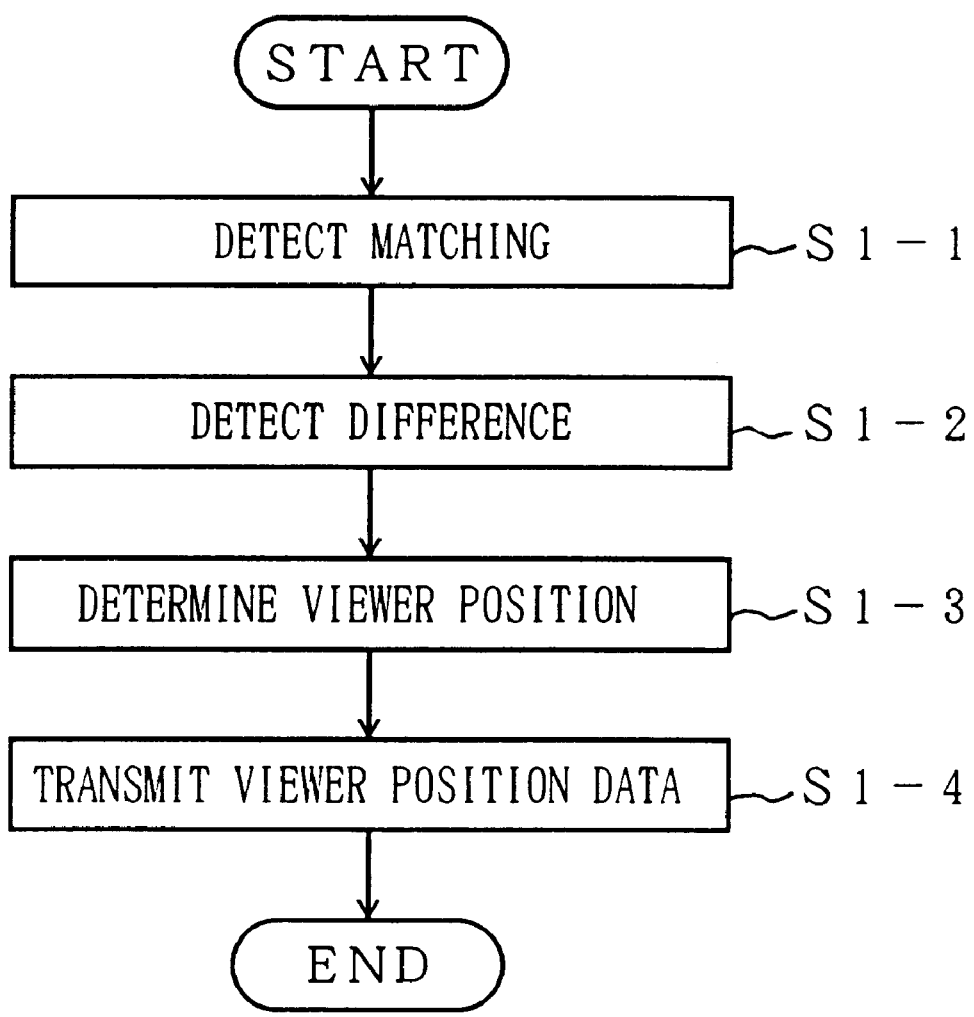
FIG. 54 is a flowchart showing an operation of a comparing/calculating circuit according to the second embodiment.

FIG. 54 is a flowchart showing the operation of the comparing/calculating circuit 505, and FIGS. 55A, 55B and 55C depict the operation of the comparing/calculating circuit 505.

It is now assumed that the image of the viewer detected by the first sensor 503 is found at the position indicated in FIG. 55A, and the image of the viewer detected by the second sensor 504 is found at the position indicated in FIG. 55B.

The comparing/calculating circuit 505 first seeks a match between the image of the viewer supplied from the first sensor 503 and the image of the viewer supplied from the second sensor 504 (step S1-1).

Next, the comparing/calculating circuit 505 detects a difference between the position of the viewer detected by the first sensor 503 and the position detected by the second sensor 504 (step S1-2).

The comparing/calculating circuit 505 then determines the position of the viewer based on the difference detected in step S1-2 (step S1-3).

A description will now be given, with reference to FIGS. 55A, 55B and 55C, of how the comparing/calculating circuit 505 determines the position of the viewer based on the detected difference.

Referring to FIG. 55C, it is assumed that the viewer is at a position spaced by a distance $L_1$ from a line connecting the two sensors S1 and S2 spaced apart by a distance $L_0$. The following equations are obtained.

$$k1 = \frac{d1}{L_1 \tan\theta} \quad (1)$$

$$k2 = \frac{d2}{L_1 \tan\theta} \quad (2)$$

The following equation is derived from the equations (1) and (2).

$$d1+d2=(k1+k2)L_1 \tan\Theta \quad (3)$$

Since $$d1+d2=L_0 \quad (4),$$

the following equation is derived.

$$L_1 = \frac{L_0}{(k1+k2)L\tan\theta} \quad (5)$$

Since $$k1 = \frac{L_1 \tan\alpha}{L_1 \tan\theta}, \quad (6),$$

a deflection angle a is given by $$\alpha = \tan^{-1}(k1 \tan\Theta) \quad (7)$$

Thus, given a difference in positions of viewer images, a distance between the plane of projection and the viewer, and an angle between the center of the plane of projection and the viewer can be determined.

The comparing/calculating circuit 505 supplies the viewer position calculated as above to the viewer position signal generating circuit 506 (step S1-4).

The viewer position signal generating circuit 506 converts the viewer position calculated in the comparing/calculating circuit 505 into an appropriate data format and supplies the same to the image selecting/processing part 502.

The image selecting/processing part 502 selects image information necessary for stereoscopic vision from the multi-viewpoint images supplied from the multi-viewpoint image capturing part 100, in accordance with the viewer position signal supplied from the viewer position signal generating circuit 506.

Figure 56:
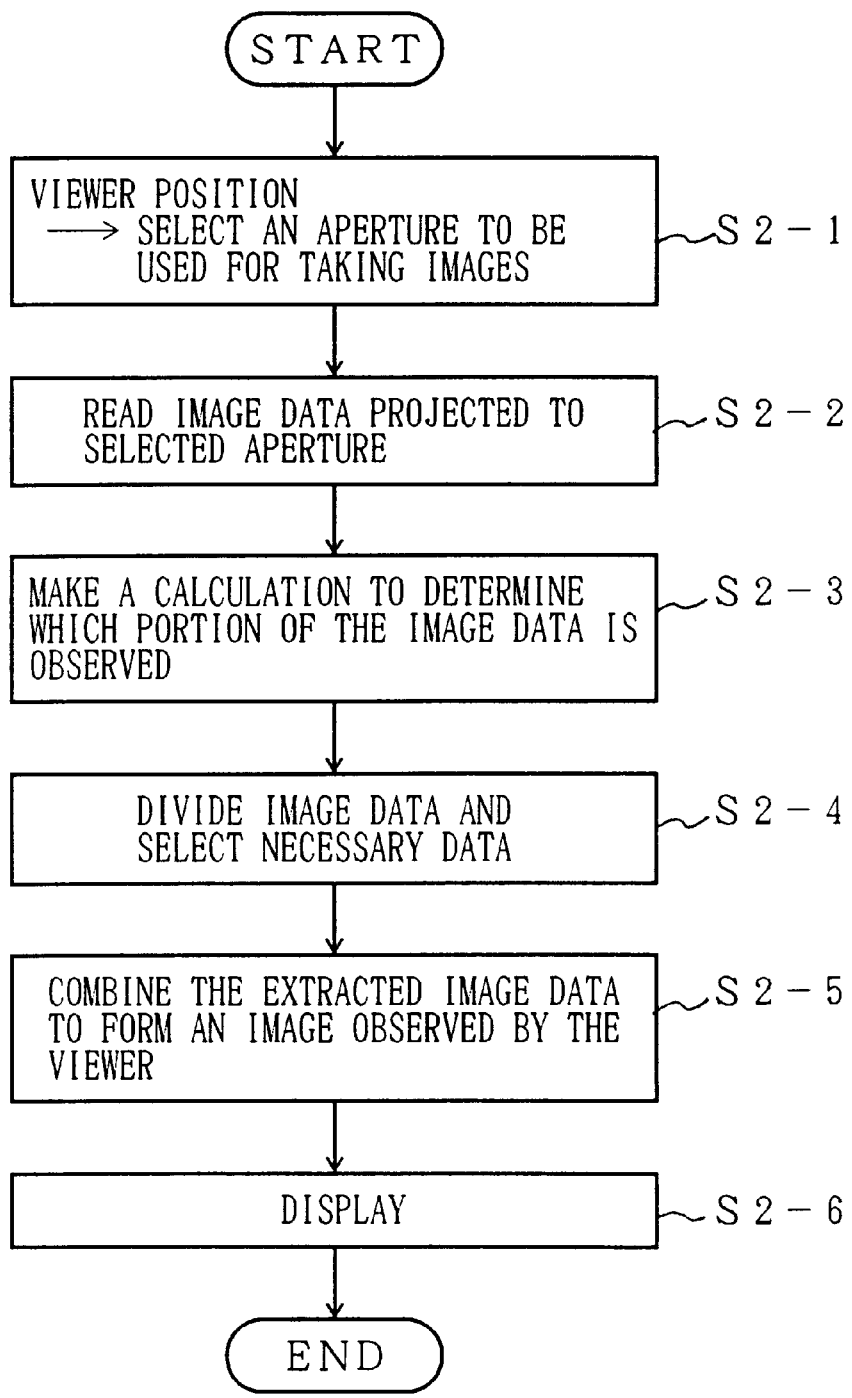
FIG. 56 is a flowchart showing an operation of an image selecting/processing part according to the second embodiment.

FIG. 56 is a flowchart showing the operation of the image selecting/processing part 502.

Upon being supplied with the viewer position signal from the viewer position signal generating circuit 506, the image selecting/processing part 502 selects an aperture to be used to take images of the viewer, in accordance with the viewer position signal (step S2-1). Next, the image data to be projected to the aperture selected in step S2-1 is read from the multi-viewpoint image supplied to the multi-viewpoint capturing part 100 (step S2-2).

A calculation is then made in order to determine which portion of the image data is perceived (step S2-3). The image data corresponding to the portion calculated in step S2-3 is extracted (step S2-4).

The image data extracted in step S2-4 is combined so as to form the image observed by the viewer (step S2-5). The image formed in step S2-5 is supplied to the image distributing part 300 for display (step S2-6).

Figure 57A:
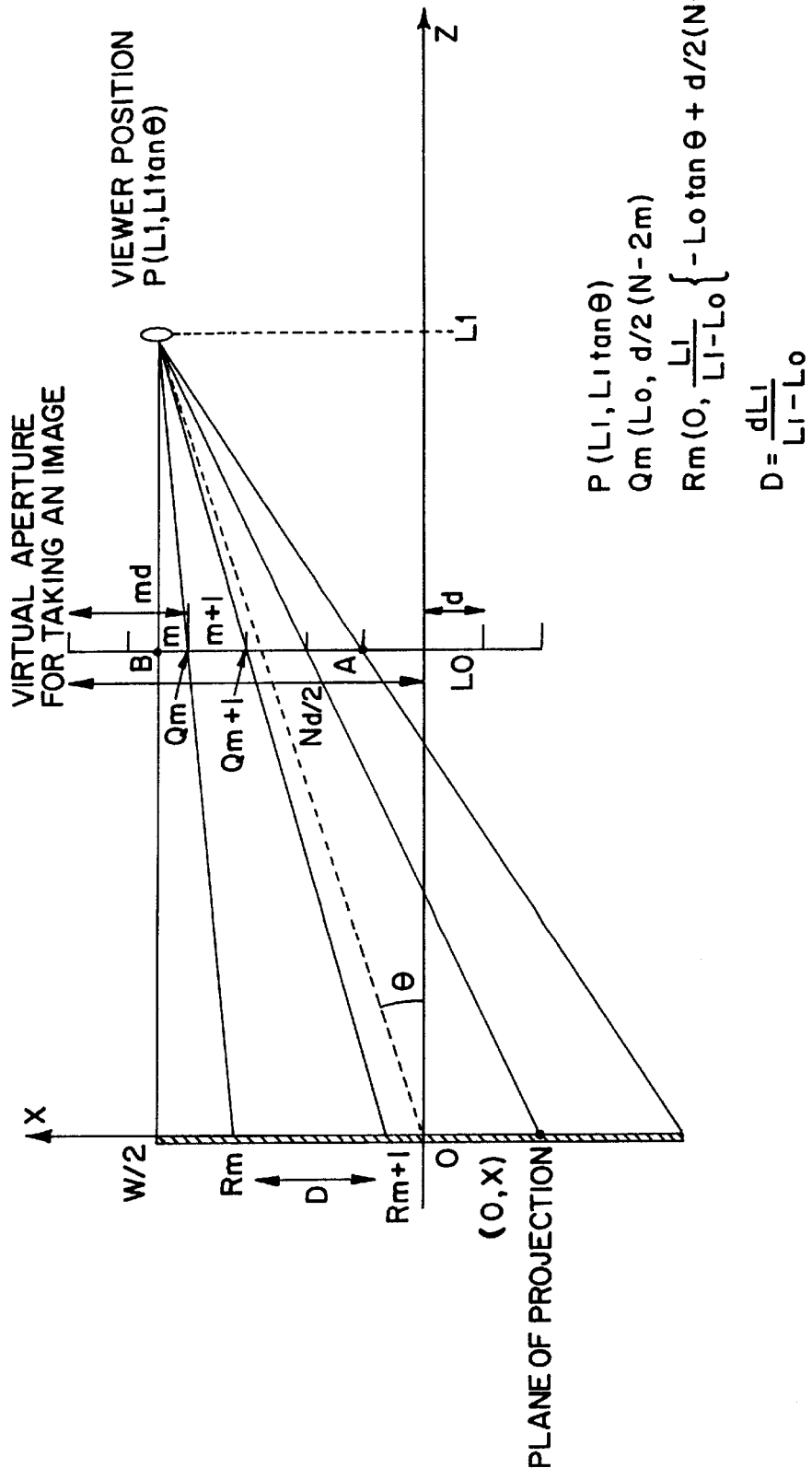
FIGS. 57A and 57B show an operation of image selection.

FIG. 57A shows an operation of the image selection.

It is assumed that a relative position of the camera with respect to a center of the object whose image is taken is similar to the relative position of the aperture for taking images of the viewer with respect to the plane of projection. It is assumed that the virtual aperture (or the viewer) has an angle of $\Theta$ with respect to a normal of the plane of projection and is removed from the plane of projection by a distance $L_1$, and lines connecting the viewer and edges of the plane of projection cross the plane of virtual apertures at the points A and B indicated in FIG. 57A. Since the location P of the virtual aperture (or the viewer) is given by $(L_1, L_1 \tan \Theta)$, the points A and B respectively have the following coordinates.

$$A: \left(L_0, \left(\tan\theta + \frac{W}{2L_1}\right)L_0 - \frac{W}{2}\right)$$

$$B: \left(L_0, \left(\tan\theta - \frac{W}{2L_1}\right)L_0 + \frac{W}{2}\right)$$

where W indicates a width of the plane of projection.

An aperture that resides between the two positions A and B is selected to take images of the viewer.

An area viewable from the mth aperture extends between the two points $R_m$ and $R_{m+1}$ indicated in FIG. 57A which respectively have the following coordinates.

$$R_m: \left(0, \frac{L_1}{L_1 - L_0}\left\{-L_0 \tan\theta + \frac{d}{2}(N - 2m)\right\}\right)$$

$$R_{m+1}: \left(0, \frac{L_1}{L_1 - L_0}\left\{-L_0 \tan\theta + \frac{d}{2}(N - 2m - 2)\right\}\right)$$

where d indicates a width of the mth aperture, and N indicates the number of apertures.

Hence, the width D of the area defined by the points $R_m$ and $R_{m+1}$ is given by
$D = dL_1/(L_1 - L_0)$ The above equation indicates that the width D is dependent on the relative position of the viewer, the plane of projection, the aperture for taking viewer images and the plane of virtual apertures.

Since the positions of the plane of projection, the aperture for taking viewer images and the plane of virtual apertures are predetermined, it is possible to determine the points $R_m$ and $R_{m+1}$ at which the selected image is extracted based on the viewer position information $P(L_1, L_1 \tan \Theta)$ supplied by the viewer position detecting part 501.

Extraction of the image necessary for stereoscopic vision for the viewer is performed in the above-described manner. The viewer position and the extracted image are supplied to the image distributing part 600.

The image distributing part 600 controls a deflection angle in accordance with the viewer position information supplied by the image selecting/processing part 502 so as to supply the multi-viewpoint image to the proper virtual aperture.

It is assumed that the image distributing part 600 includes a parallel scanning part which is implemented by a deflector using the VGM according to the first embodiment shown in FIG. 50B.

Figure 58:
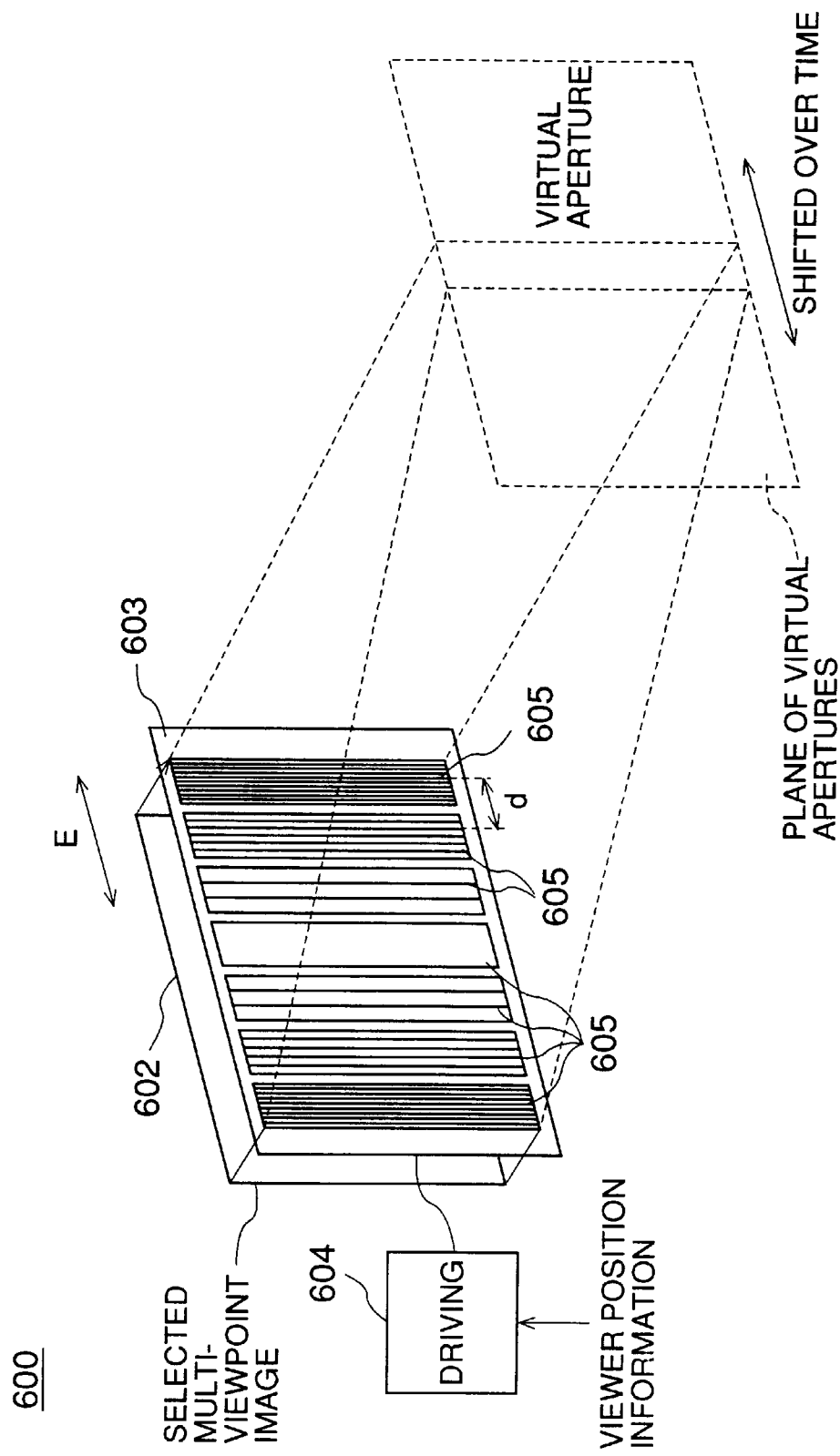
FIG. 58 shows a construction of the image distributing part according to the second embodiment using the VGM.

FIG. 58 shows a construction of the image distributing part using the VGM.

The image distributing part 600 comprises an image displaying part 602, a parallel scanning part 603 for scanning the image displayed in the image displaying part 602 in a horizontal direction (indicated by the arrow E), and a driving part 604 for driving the parallel scanning part 603.

A selected multi-view image is displayed in the image displaying part 602. The image displayed in the image displaying part 602 is supplied to the parallel scanning part 603 operated in the VGM. The parallel scanning part 603 is implemented by a liquid crystal panel operated in the VGM and has transparent electrodes 605 provided at a pitch d. The transparent electrodes 605 are supplied by the driving part 604 with a driving voltage calculated in accordance with the position of the viewer.

A description will now be given of how the driving voltage supplied to each of the transparent electrodes 605 is determined.

Given that light is incident on the liquid crystal at an incidence angle of $\Theta_1$, and outgoes therefrom at an angle $\Theta_2$, stripes are generated with a spatial frequency of $f_s$, and the incident light has a wavelength of $\lambda$, $$\sin \Theta_1 + \sin \Theta_2 = f_s \lambda \qquad (8)$$

Since the spatial frequency $f_s$ is proportional to a voltage V applied to the transparent electrode 605, $$f_s = kV$$

where k indicates a constant. Hence, the equation (8) is written as $$\sin \Theta_1 + \sin \Theta_2 = k'V \qquad (9)$$

where $k' = k\lambda$.

Figure 57B:
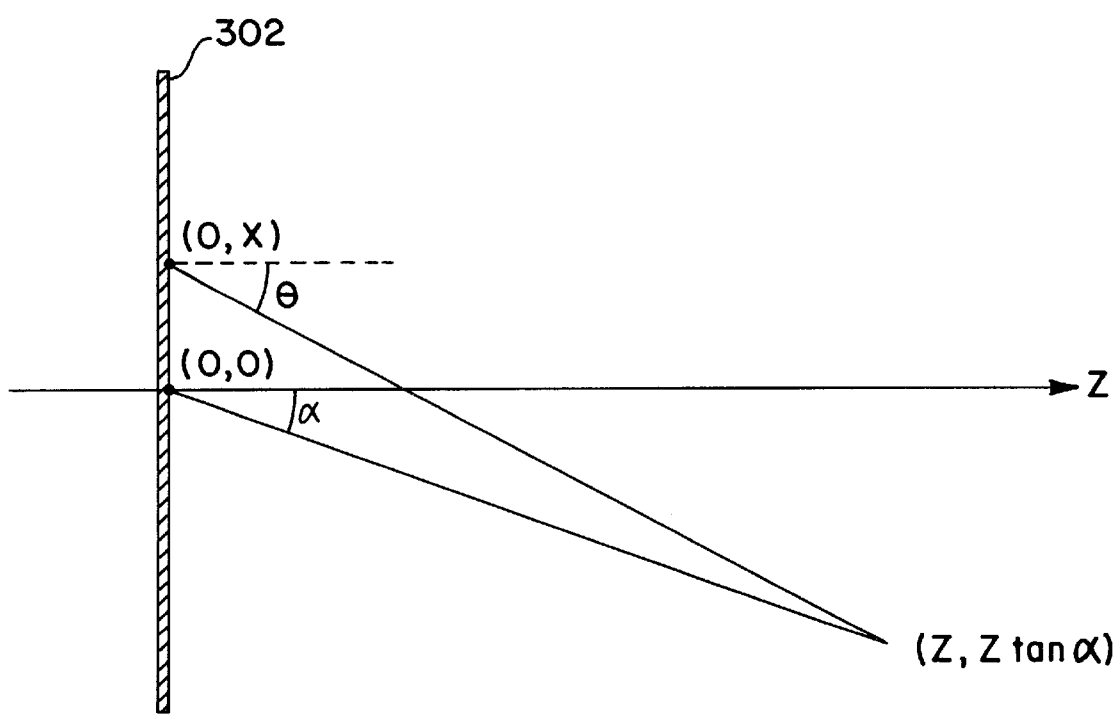

Referring to FIG. 57B, given that the origin is the center of the image displaying part 602, the angle $\Theta$ formed by the point (0, x) and the viewer position (Z, Z tan α) is given by $$\theta = \tan^{-1}\left(\frac{x - Z\tan\alpha}{Z}\right) \qquad (10)$$

Therefore, a voltage to be applied to the transparent electrode 605 of the parallel scanning part 603 in order to properly deflect the image element spaced from the center of the image displaying part 602 by a distance x is given by $$v = \frac{1}{k'}\left(\sin\theta_1 + \sin\left(\tan^{-1}\left(\frac{x - Z\tan\alpha}{Z}\right)\right)\right) \qquad (11)$$

$$= \frac{1}{k'}\left(\sin\theta_1 + \sqrt{\left(\frac{A^2}{A^2 + 1}\right)}\right)$$

where $$A = \frac{x - Z\tan\alpha}{Z}$$

Since only the information needed to produce stereoscopic vision at the viewer position should be transmitted, the volume or information to be processed is significantly reduced.

While the embodiment described above is configured such that the entirety of the selected image is displayed, the volume of information may further be reduced by further selecting the image depending on the viewer position.

Figure 59B:
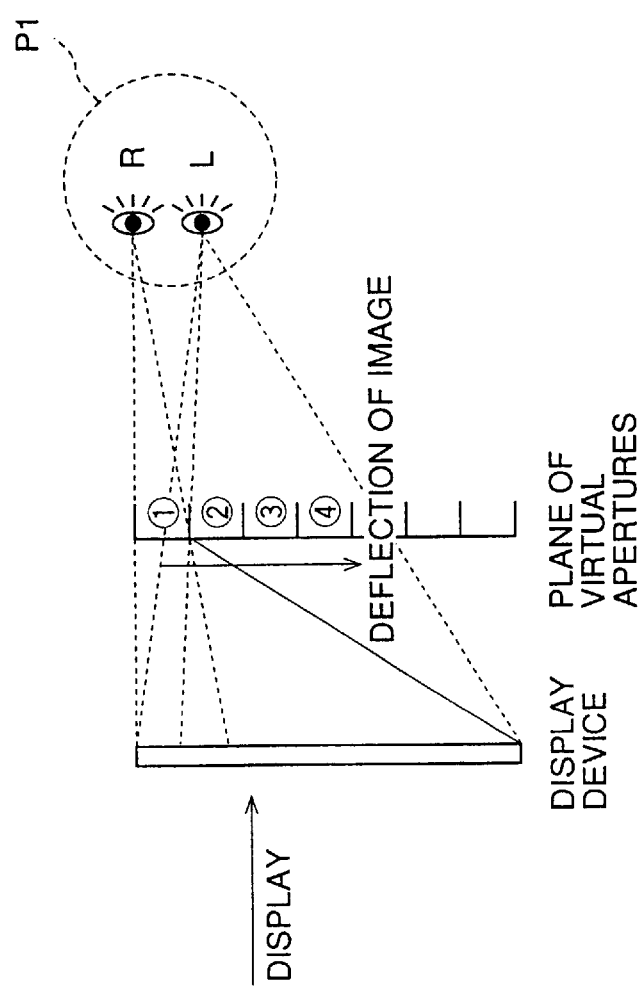
FIGS. 59A and 59B depict an operating principle of a first variation of the image distributing part according to the second embodiment.
Figure 59A:
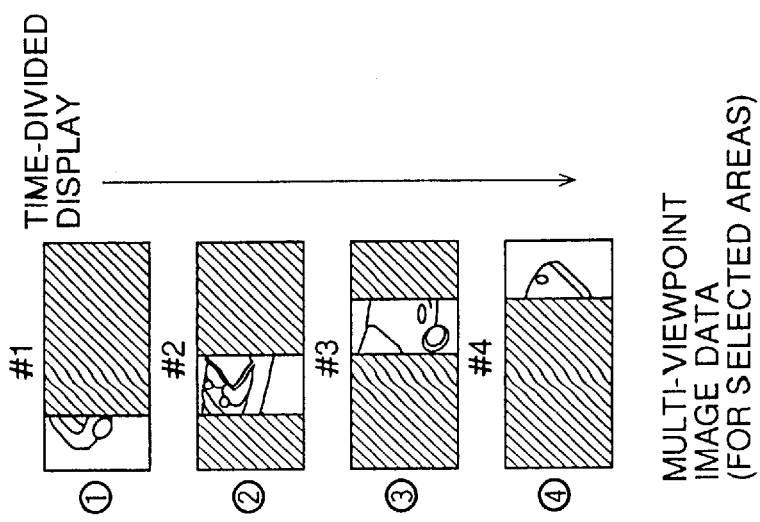

FIGS. 59A and 59B depict an operating principle of a first variation of the image distributing part according to the second embodiment.

As shown in FIG. 59B, four images #1–#4 are selected in correspondence with the position P1 of the viewer. Those portions of the images #1–#4 that are necessary in relation to the viewer position P1 are further selected and deflected to the respective virtual apertures.

The first variation provides a further reduction of the volume of information to be processed.

Figure 60C:
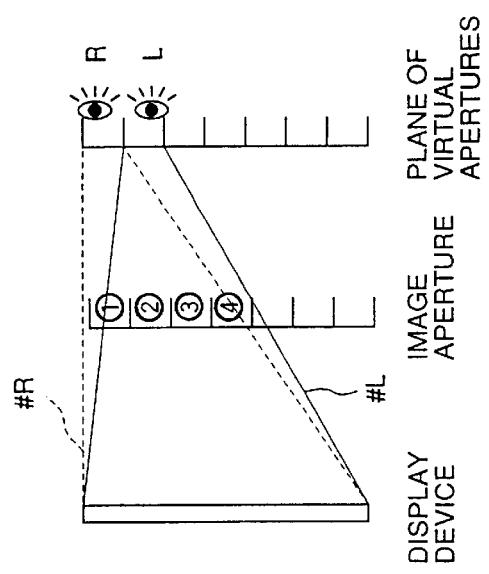
FIGS. 60A, 60B and 60C depict an operating principle of a second variation of the image distributing part according to the second embodiment.
Figure 60B:
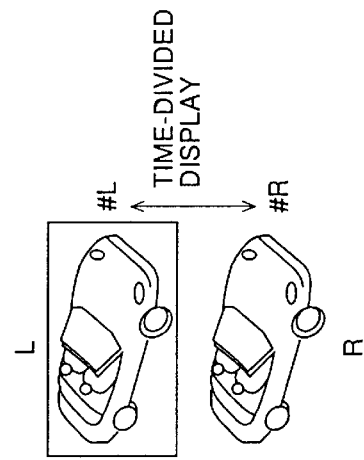
Figure 60A:
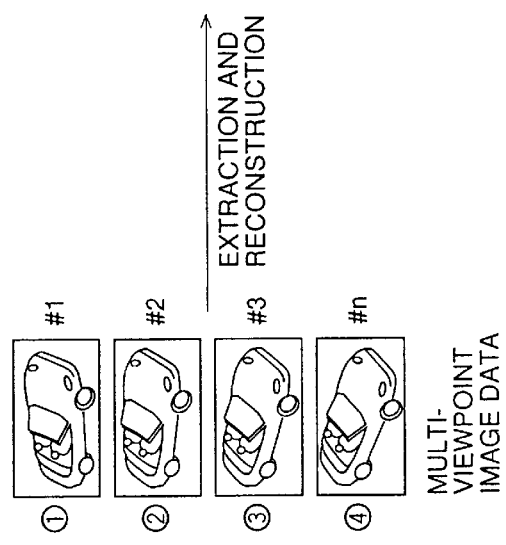

FIGS. 60A, 60B and 60C depict an operating principle of a second variation of the image distributing part according to the second embodiment.

In this variation, as shown in FIG. 60A, multi-viewpoint images #1–#4 that appear in the virtual aperture from the viewpoint of the viewer are selected. As shown in FIG. 60B, the two leftmost images of the images #1–#4 are synthesized to produce a left image #L and the two rightmost images of the images #1–#4 are synthesized to produce a right image #R. The image distributing part deflects the images #L and #R to the virtual apertures using a time-division scheme.

The image #R is supplied to the right virtual apertures in the viewer's field of vision and the image #L is supplied to the left virtual apertures in the viewer's field of vision.

When the viewer position changes, different images are selected. More specifically, those images that appear in the virtual apertures that are within the viewer's field of vision are selected and supplied to the respective virtual apertures.

FIGS. 61A, 61B, 61C, 61D, 61E and 61F depict an operating principle of a third variation of the image distributing part according to the second embodiment.

Figure 61F:
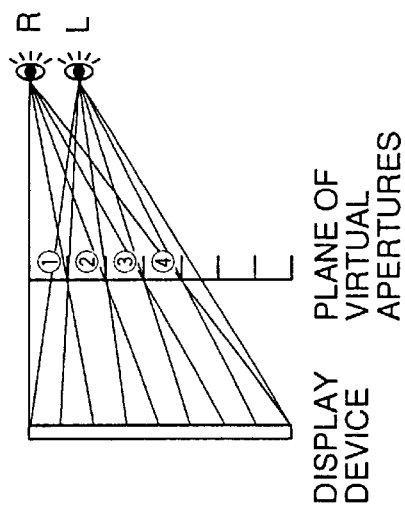
FIGS. 61A, 61B, 61C, 61D, 61E and 61F depict an operating principle of a third variation of the image distributing part according to the second embodiment.
Figure 61E:
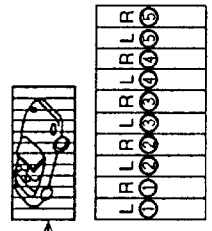
Figure 61C:
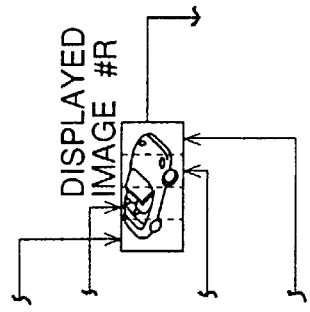
Figure 61D:
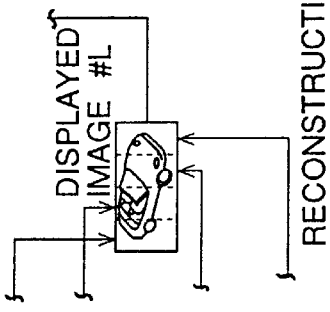
Figure 61A:
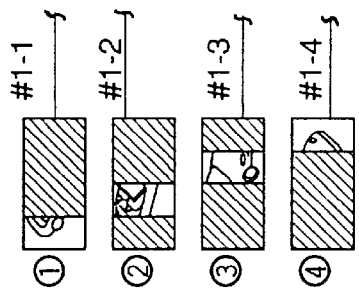
Figure 61B:
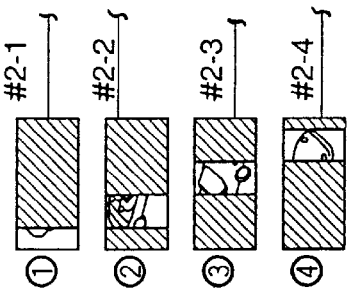

In this variation, eight images including the images #1-1–#1-4 as shown in FIG. 61A that appear in the field of vision for the right eye and the images #2-1–#2-4 as shown in FIG. 61B that appear in the field of vision for the left eye are selected. The selected images should appear in the virtual apertures from the viewpoint of the viewer. The eight images #1-1–#1-4 and #2-1–#2-4 are divided into the right images #1-1–#1-4 as shown in FIG. 61A and the left images #2-1–#2-4 as shown in FIG. 61B. Each of the right images and the left images is subject to the process as shown in FIGS. 60A–60C. As shown in FIGS. 61C and 61D, the right image #R and the left image #L are produced by synthesis.

The image #R as shown in FIG. 61C and the image #L as shown in FIG. 61D are alternately inserted as shown in FIG. 61E so as to produced a synthesized image. The synthesized image as shown in FIG. 61E is deflected to the virtual apertures.

Accordingly, the images that appear in the virtual apertures according to the third variation of the image distributing part are derived from more images than the stereoscopic image of the earlier variations, thus ensuring a more natural stereoscopic vision.

A description will now be given of how the position of the virtual apertures is set.

Figure 62A:
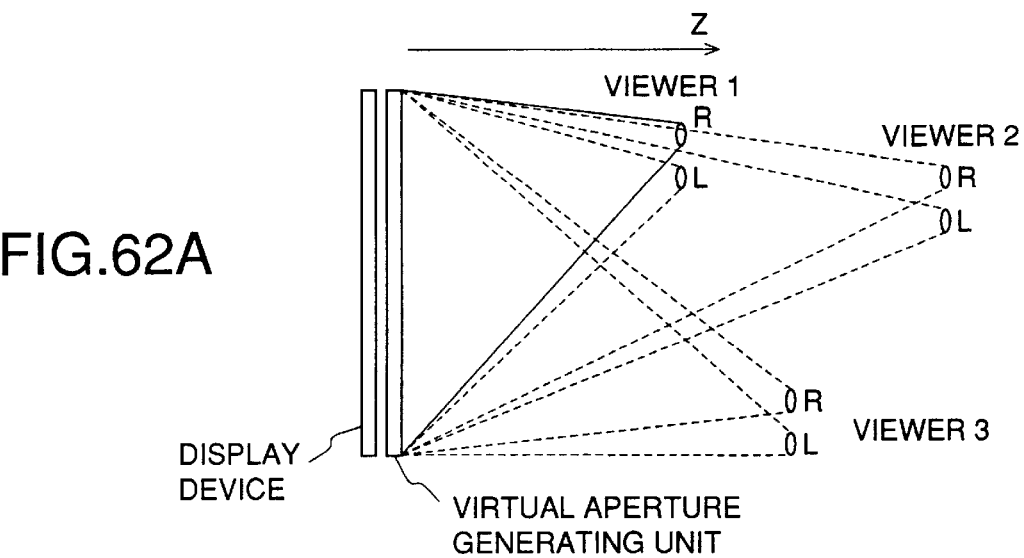
FIGS. 62A, 62B and 62C depict how a position of the virtual apertures is set according to the second embodiment.
Figure 62B:
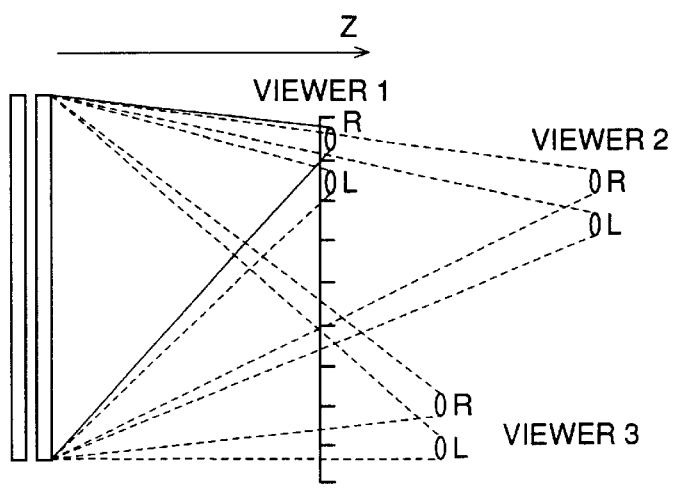
Figure 62C:
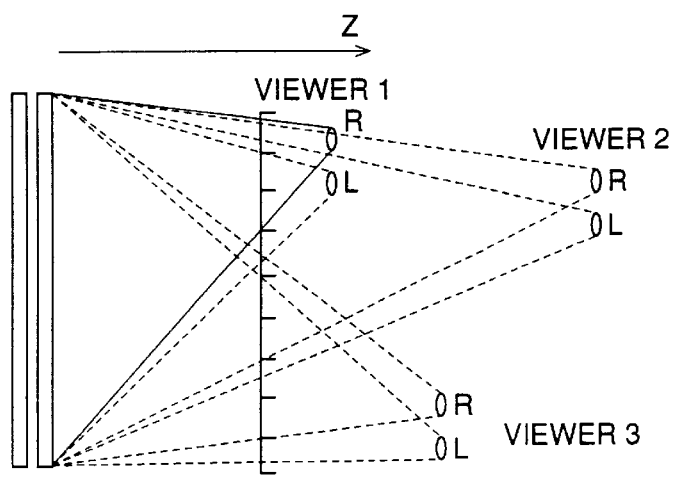

FIGS. 62A, 62B and 62C depict how the position of the virtual apertures is set according to the second embodiment.

As shown in FIG. 62A, the plane of virtual apertures may be set to match the surface of the parallel scanning part. By selecting the image depending on the position of the viewer relative to the Z direction, all the viewers are able to view the stereoscopic image.

As shown in FIG. 62B, the virtual apertures may be set at the position of the viewer nearest the screen. According to this approach, it is ensured that the stereoscopic image can be properly viewed.

Alternatively, as shown in FIG. 62C, the plane of virtual apertures may be located at a predetermined position. The viewers observe the stereoscopic image at a distance from the plane of the virtual apertures. According to this approach, since the plane of virtual apertures remains fixed, displaying and deflection of the images can be processed using a simple construction.

Deflection of the images may be implemented not only by the VGM but also by a simple construction using lenses.

FIGS. 63A and 63B depict alternative methods of deflection.

In the deflection method shown in FIG. 63A, a lenticular lens L2 is provided on the screen of the display device 302.

A plurality of images #1–#n arranged periodically are displayed in the display device 302. The lenticular lens L2 is formed to have a pitch that matches the pitch of the plurality of images #1–#n so that, as shown in FIG. 63A, the images #1–#n are deflected by respective angles so as to be supplied to the respective virtual aperture.

In this way, the image #1 can be supplied to the virtual aperture 304-1, the image #2 to the virtual aperture 304-2, . . . , and the image #n to the virtual aperture 304-n.

In the deflection method shown in FIG. 63B, a plurality of images #1–#n are arranged side by side across the screen of the display device 302. A large-diameter convex lens L3 is provided between the display device 302 and the plane of virtual apertures. The convex lens L3 causes the image #1 displayed in the display device 302 to be supplied to the virtual aperture 304-1, the image #2 to the virtual aperture 304-2, . . . , and the image #n to the virtual aperture 304-n.

According to the deflection methods described above, a plurality two-dimensional images are deflected so that the viewer is able to view different images from different viewpoints. Different viewing positions provide different stereoscopic images.

FIG. 64 is a block diagram showing a third embodiment of the present invention. In FIG. 64, those components that are the same as the components of FIGS. 2 and 52 are designated by the same reference numerals, and the description thereof is omitted.

Referring to FIG. 64, numeral 700 indicates a transmitting part, and 800 a receiving part.

The transmitting part 700 supplies the multi-viewpoint images generated in the multi-viewpoint image capturing unit 110 or the multi-viewpoint image capturing unit 130 to the receiving part 800 using a multi-viewpoint image transmitting unit 701. The receiving part 800 receives the multi-viewpoint images using a multi-viewpoint image receiving unit 801. The received signal is supplied to the image distributing part 300 so that stereoscopic images are produced.

The receiving part 800 is provided with the viewer position detecting part 501 for detecting the viewer who observes the stereoscopic image. The signal generated in the viewer position detecting part 501 is transmitted to the transmitting unit 700 by a viewer position information transmitting unit 802. The transmitted viewer position information is received by a viewer position information receiving unit 702 of the transmitting unit 700 so that the viewer position information is supplied to the multi-viewpoint image transmitting unit 701. Upon receipt of the viewer position information from the viewer position receiving unit 702, the multi-viewpoint transmitting unit 701 selects image data necessary for observation of the stereoscopic image at the viewing position and transmits the selected image data to the receiving part 800.

According to the arrangement described above, it is possible to reduce the volume of transmitted image data.

Figure 65:
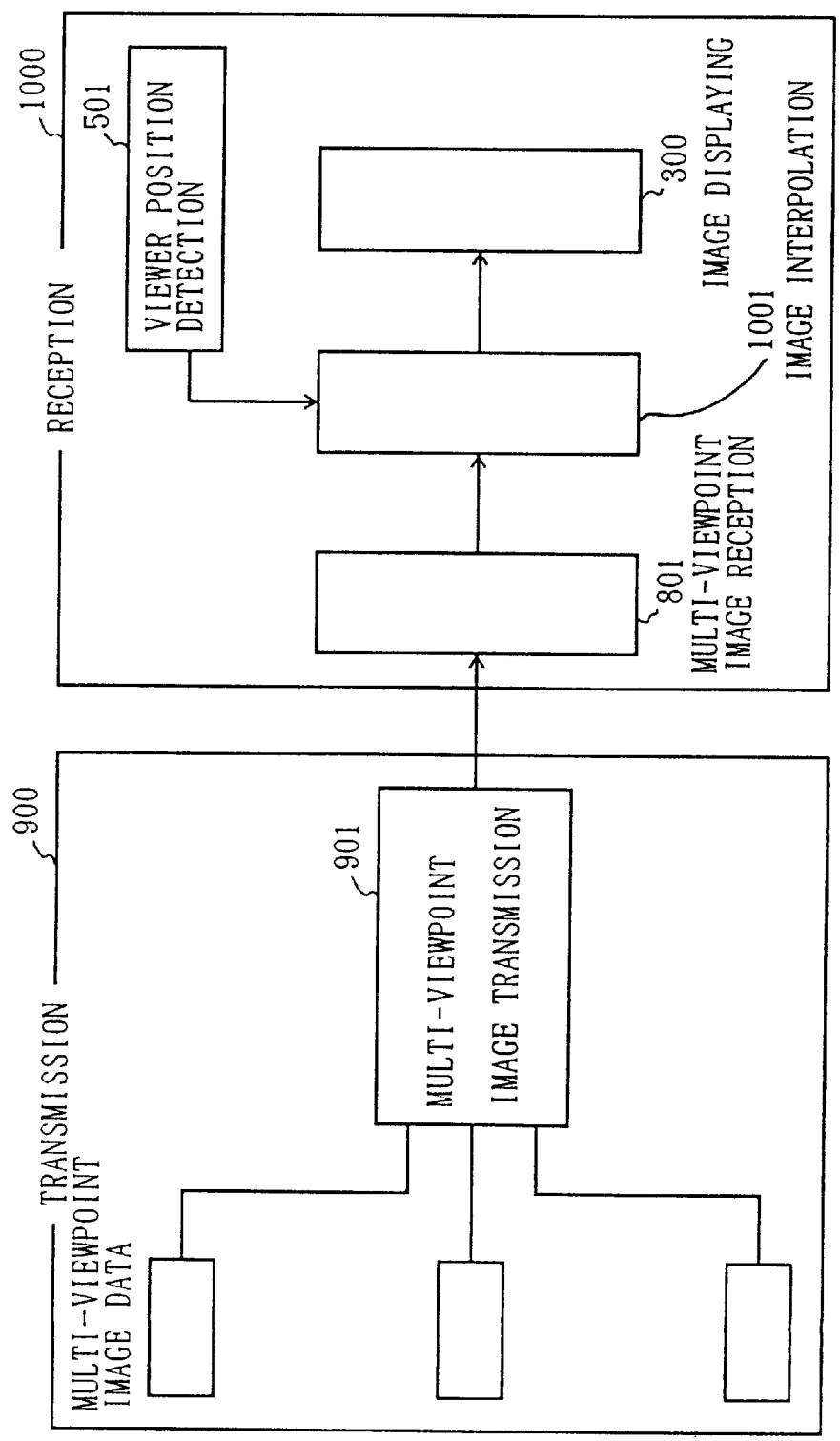
FIG. 65 is a block diagram showing a fourth embodiment of the present invention.

FIG. 65 is a block diagram showing a fourth embodiment of the present invention. In FIG. 65, those components that are the same as the components of FIG. 64 are designated by the same reference numerals, and the description thereof is omitted.

Referring to FIG. 65, numeral 900 indicates a transmitting unit for supplying the multi-viewpoint image generated in the multi-viewpoint image capturing unit 110 or the multi-viewpoint image capturing unit 130 to a receiving unit 1000 using a multi-viewpoint image transmitting unit 901. The receiving unit 1000 receives the multi-viewpoint image using the multi-viewpoint image receiving unit 801. The received signal is supplied to the image distributing part 300 so that the stereoscopic image is formed.

The receiving unit 1000 is provided with the viewer position detecting unit 501 for detecting the viewer who observes the stereoscopic image. The signal generated in the viewer position detecting part 501 is supplied to an image interpolating unit 1001 for subjecting the multi-viewpoint image transmitted from the transmitting unit 900 to interpolation so as to form the stereoscopic image based on the received multi-viewpoint image and the interpolated image thereof.

According to the above-described arrangement, the volume of data transmitted by the transmitting unit 900 is reduced due to the interpolation applied at the receiving end on the multi-viewpoint image.

The present invention is not limited to the above-described embodiments, and variations and modifications may be made without departing from the scope of the present invention.

What is claimed is:

1. A stereoscopic image display method for generating a stereoscopic image from a plurality of two-dimensional images taken of an object from a plurality of viewing angles, said stereoscopic image display method comprising the steps of:
    a) displaying said plurality of two-dimensional images on a plane of display;
    b) deflecting said plurality of two-dimensional images on a plane of projection on which projections of said plurality of two-dimensional images displayed on said plane of display are formed, a deflection angle being dependent on the viewing angle; and
    c) supplying the deflected images to a plurality of virtual apertures provided closest to said plane of projection in a range in which stereoscopic vision is available, wherein
        an interval d between image elements on said plane of projection and a distance D between said plurality of virtual apertures and said plane of projection are set so as to meet a condition $$d/D < \tan A$$

where A indicates a resolution of a viewer.

2. The stereoscopic image display method as claimed in claim 1, wherein said plurality of two-dimensional images are sequentially displayed on said plane of display, and the displayed images are deflected on said plane of projection so as to be distributed to the virtual aperture corresponding to the individual two-dimensional image.

3. The stereoscopic image display method as claimed in claim 2, wherein a distance δ between said plane of display and said plane of projection is set so as to meet a condition $$1/(\delta+D) > (1/D) - C$$

where D denotes a distance between said plurality of virtual apertures and said plane of projection, and C denotes a permissible aberration.

4. The stereoscopic image display method as claimed in claim 1, wherein a composite image formed of image portions derived from a respective one of said plurality of two-dimensional images is displayed on said plane of display, and each of the individual image portions forming the displayed composite image is deflected on said plane of projection so as to be directed to the respective virtual aperture.

5. The stereoscopic image display method as claimed in claim 1, wherein a synthesized image formed of groups of image portions derived from respective ones of said plurality of two-dimensional images is displayed on said plane of display, and each group of image portions forming the displayed synthesized image is deflected on said plane of projection so as to be directed to the respective virtual aperture, the image portions forming each group being derived from one of said plurality of two-dimensional images.

6. The stereoscopic image display method as claimed in claim 1, wherein as the viewer moves away from said plurality of virtual apertures, the deflected images directed to said plurality of virtual apertures are apparently blended with each other from a viewpoint of the viewer so that a vergence angle for said plurality of two-dimensional images becomes small.

7. The stereoscopic image display method as claimed in claim 6, wherein said plane of projection and said plurality of virtual apertures are defined so as to meet a condition $$2D \tan(\Theta/2) > W$$

where D denotes a distance between said plurality of virtual apertures and said plane of projection, Θ denotes an angle formed by ends of said plurality of virtual apertures and a center of said plane of projection, and W denotes a length of said plane of projection in a direction in which said plurality of virtual apertures are arrayed.

8. The stereoscopic image display method as claimed in claim 6, wherein an interval of virtual apertures is set so as to meet a condition $$(2D \tan(\Theta/2)/n) < B/2$$

where D denotes a distance between said plurality of virtual apertures and said plane of projection, Θ denotes an angle formed by ends of said plurality of virtual apertures and a center of said plane of projection, n denotes a number of stereoscopic images, and B denotes a binocular interval, that is, a distance between the right and left eyes.

9. The stereoscopic image display method as claimed in claim 1, wherein a position of the viewer is detected so that images observable from said position are selected from said plurality of two-dimensional images.

10. A multi-viewpoint image capturing method for stereoscopic image display performed by displaying a plurality of two-dimensional images on a plane of display; deflecting said plurality of two-dimensional images on a plane of projection on which projections of said plurality of two-dimensional images displayed on said plane of display are formed, a deflection angle being dependent on a viewing angle; and supplying the deflected images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer, said multi-viewpoint image capturing method comprising the steps of:
a) taking images of a solid object from a plurality of angles; and
b) simultaneously feeding the plurality of two-dimensional images obtained from said plurality of angles to a transmission line.

11. A multi-viewpoint image capturing method for stereoscopic image display performed by displaying a plurality of two-dimensional images on a plane of display; deflecting said plurality of two-dimensional images on a plane of projection on which projections of said plurality of two-dimensional images displayed on said plane of display are formed, a deflection angle being dependent on a viewing angle; and supplying the deflected images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer, said multi-viewpoint image capturing method comprising the steps of:
a) generating three-dimensional images from an object by a three-dimensional image data process; and
b) generating two-dimensional images taken of said three-dimensional images from a plurality of angles.

12. A multi-viewpoint image processing method for stereoscopic image display, said multi-viewpoint image processing method comprising the steps of:
a) displaying a plurality of two-dimensional images on a plane of display;
b) deflecting said plurality of two-dimensional images on a plane of projection on which projections of said plurality of two-dimensional images displayed on said plane of display are formed, a deflection angle being dependent on a viewing angle; and
c) supplying the deflected plurality of two-dimensional images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer,
wherein information relating to said plurality of two-dimensional images taken from a plurality of angles is held in a parallel manner, and information for producing stereoscopic vision of a target image area is extracted from said information relating to said plurality of two-dimensional images.

13. The multi-viewpoint image processing method as claimed in claim 12, wherein said step b) is executed by specifying an address at which said relating information is stored.

14. The multi-viewpoint image processing method as claimed in claim 12, further comprising the step of:
d) compressing said plurality of two-dimensional images taken from the plurality of angles and then attaching a header thereto so as to output synthesized data.

15. The multi-viewpoint image processing method as claimed in claim 14, wherein said step d) is executed such that said plurality of two-dimensional images are received in a form of frames and are compressed based on relations between the frames.

16. The multi-viewpoint image processing method as claimed in claim 14, wherein said synthesized data including said header is read and output in a reverse order, compressed data next to said header being output last.

17. The multi-viewpoint image processing method as claimed in claim 14, further comprising the steps of:
e) outputting, in a parallel manner, compressed data relating to said plurality of two-dimensional images compressed in step d) and constituting said synthesized data; and
f) decompressing said compressed data output in a parallel manner so as to restore said plurality of two-dimensional images.

18. A stereoscopic image display device for displaying a stereoscopic image derived from a plurality of two-dimensional images taken of an object from a plurality of angles, said stereoscopic image display device comprising:
multi-viewpoint image forming means supplied with said plurality of two-dimensional images and forming multi-viewpoint images derived from said plurality of two-dimensional images so that the multi-viewpoint images are apparently formed on a plane of projection from a viewpoint of a viewer; and
image distributing means deflecting said multi-viewpoint images formed by said multi-viewpoint image forming means by a deflection angle dependent on a viewing angle, and supplying the deflected images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer.

19. The stereoscopic image display device as claimed in claim 18, wherein said multi-viewpoint image forming means comprises:
two-dimensional image storing means storing line by line said plurality of two-dimensional images taken of the object from the plurality of angles;
an output control circuit for outputting said plurality of two-dimensional images via respective lines in a parallel manner; and
a matrix display device for displaying images derived from parallel data output by the output control circuit.

20. The stereoscopic image display device as claimed in claim 19, wherein said image distributing means comprises diffraction grating forming means for forming a diffraction grating having a spatial frequency commensurate with a voltage applied to electrodes sandwiching said diffraction grating, incident light being supplied to a desired one of said plurality of virtual apertures by controlling the voltage applied in accordance with the incident light.

21. The stereoscopic image display device as claimed in claim 20, wherein said diffraction grating forming means is implemented by a VGM element.

22. The stereoscopic image display device as claimed in claim 18, wherein said multi-viewpoint image forming means comprises:
   parallel-serial converting means supplied with said plurality of two-dimensional images in a parallel manner and outputting said plurality of two-dimensional images sequentially and serially; and
   a serial display device capable of displaying images derived from serial data output by said parallel-serial converting means.

23. The stereoscopic image display device as claimed in claim 18, wherein said multi-viewpoint image forming means displays each of said plurality of two-dimensional images on a respective image frame, and said image distributing means distributes by deflection said plurality of two-dimensional images to respective virtual apertures.

24. The stereoscopic image display device as claimed in claim 18, wherein said multi-viewpoint image forming means displays composite images each formed of image portions derived from said plurality of two-dimensional images, and said image distributing means distributes by deflection said composite images displayed by said multi-viewpoint image forming means to respective virtual apertures.

25. The stereoscopic image display device as claimed in claim 18, wherein said multi-viewpoint image forming means displays synthsized images produced by arranging image portions derived from said plurality of two-dimensional images, and said image distributing means distributes by deflection said synthesized images displayed by said multi-viewpoint image forming means to respective virtual apertures.

26. The stereoscopic image display device as claimed in claim 18, wherein said image distributing means comprises:
   a plurality of mirrors for reflecting multi-viewpoint images displayed by said multi-viewpoint image forming means so as to supply the multi-viewpoint images to a plane of virtual apertures on which said plurality of virtual apertures are arrayed; and
   control means for controlling an angle of said plurality of mirrors so that the multi-viewpoint images are supplied to predetermined ones of said plurality of virtual apertures.

27. The stereoscopic image display device as claimed in claim 18, wherein said image distributing means comprises:
   an optical element formed to have a predetermined period so as to apply a deflection angle dependent on a position of incidence to incident light; and
   a shutter for controlling incident light incident on said optical element, the controlling being performed within each period of said optical element,
      the incident light being supplied to a desired virtual aperture by opening and closing said shutter in accordance with the incident light.

28. The stereoscopic image display device as claimed in claim 27, wherein said shutter is constructed such that an electro-optical material is sandwiched between supporting members on which electrodes are respectively formed, and said shutter is opened and closed by controlling a voltage applied to said electrodes.

29. The stereoscopic image display device as claimed in claim 18, wherein said image distributing means comprises:
   an optical element having a predetermined period so as to provide a deflection angle dependent on a position of incidence to incident light; and
   a variable-refractive-index element for refracting the incident light incident on said optical element, subjecting the incident light to parallel translation so as to outgo at an angle which is the same as an angle of incidence with said optical element, and controlling a position of incidence on said optical element.

30. The stereoscopic image display device as claimed in claim 18, wherein said image distributing means comprises a prism variable-refractive-index element having a shape of a prism and changing its refractive index according to a voltage applied to said prism variable-refractive-index element, the voltage applied to said prism variable-refractive-index element being controlled in accordance with incident light so as to supply the incident light to a desired virtual aperture.

31. The stereoscopic image displaying device as claimed in claim 18, wherein said image distributing means comprises: a variable-refractive-index element changing its refractive index in accordance with a voltage applied thereto, the refractive index of said variable-refractive-index element being modulated in accordance with incident light.

32. The stereoscopic image display device as claimed in claim 18, wherein said image distributing means comprises birefringence applying means for applying birefringence to incident light; and
   a polarization plane rotating element for rotating a plane of polarization of said incident light in accordance with a voltage applied to said image distributing means, said voltage being controlled in accordance with the incident light so that the polarization plane rotating element rotates the plane of polarization in a desired manner and the incident light is supplied to a desired one of said plurality of virtual apertures.

33. The stereoscopic image display device as claimed in claim 18, wherein said image distributing means comprises a prism liquid crystal panel having a shape of a prism and changing its refractive index in accordance with a voltage applied to said prism liquid crystal panel, said voltage being controlled in accordance with incident light so that the incident light is supplied to a desired one of said plurality of virtual apertures.

34. The stereoscopic image display device as claimed in claim 18, wherein said image distributing means comprises a plurality of prism liquid crystal panels having a shape of a prism,
   each of said plurality of prism liquid crystal panels changing its refractive index in accordance with a voltage applied to thereto; and said voltage being controlled in accordance with incident light so that the incident light is supplied to a desired one of said plurality of virtual apertures.

35. The stereoscopic image display device as claimed in claim 18, wherein said image distributing means comprises:
   plurality of liquid crystal panels having a diffraction grating that changes its spatial frequency in accordance with a voltage applied to the liquid crystal panel; and
   a plurality of diffraction gratings coupled to each of said plurality of liquid crystal panels and providing respective angles of diffraction,
      said voltage applied to the liquid crystal panel being controlled in accordance with incident light so that the incident light is supplied to a desired one of said plurality of virtual apertures.

36. The stereoscopic image display device as claimed in claim 18, wherein said image distributing means is implemented by a lens for directing by refraction each of the multiple-viewpoint images in a predetermined direction.

37. The stereoscopic image display device as claimed in claim 36, wherein said lens is a lenticular lens.

38. The stereoscopic image display device as claimed in claim 36, wherein said lens is a single convex lens.

39. A multi-viewpoint image capturing device for stereoscopic image display performed by displaying a plurality of two-dimensional images on a plane of display; deflecting by a desired angle said plurality of two-dimensional images on a plane of projection on which projections of said plurality of two-dimensional images displayed on said plane of display are formed; and supplying the deflected images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer,
said multi-viewpoint image capturing device comprising a plurality of image capturing units for taking a plurality of images of an object from respective angles.

40. The multi-viewpoint image capturing device as claimed in claim 39, wherein said plurality of image capturing units are a plurality of cameras having their optical axis aligned with the object.

41. The multi-viewpoint image capturing device as claimed in claim 39, characterized in that said plurality of image capturing units comprise:
a plurality of photosensitive elements arranged to receive light from said object such that photo-sensitive surfaces of said plurality of photosensitive elements are parallel to each other; and
a plurality of lenses arranged to supply light from said object to said photosensitive elements such that center axes of said plurality of lenses are parallel to each other.

42. A multi-viewpoint image capturing device for stereoscopic image display performed by displaying a plurality of two-dimensional images on a plane of display; deflecting by a desired angle said plurality of two-dimensional images on a plane of projection on which projections of said plurality of two-dimensional images displayed on said plane of display are formed; and supplying the deflected images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer,
said multi-viewpoint image capturing device comprising:
three-dimensional image generating means for generating three-dimensional images from an object; and
two-dimensional image outputting means for outputting two-dimensional images taken of said three-dimensional images from a plurality of angles.

43. A multi-viewpoint image processing device for stereoscopic image display performed by displaying a plurality of two-dimensional images on a plane of display; deflecting by a desired angle said plurality of two-dimensional images on a plane of projection on which projections of said plurality of two-dimensional images displayed on said plane of display are formed; and supplying the deflected images to a plurality of virtual apertures provided closest to said plane of projection in a range in which stereoscopic vision is available, an interval d between image elements on said plane of projection and a distance D between said plurality of virtual apertures and said plane of projection being set so as to meet a condition $$d/D < \tan A$$

where A indicates a resolution of a viewer,
said multi-viewpoint image processing device comprising:
a captured image buffer for temporarily storing said plurality of two-dimensional images;
compressing and decompressing means for compressing said plurality of two-dimensional images stored in said captured image buffer and decompressing compressed images to restore said plurality of two-dimensional images; and
an output image buffer for temporarily storing said plurality of two-dimensional images.

44. The multi-viewpoint image processing device as claimed in claim 43, further comprising extracting control means for extracting predetermined areas from said plurality of two-dimensional images stored in said captured image buffer, the extraction being effected by specifying addresses in said captured image buffer.

45. The multi-viewpoint image processing device as claimed in claim 43, wherein said compressing and decompressing means comprises:
a frame buffer for storing said plurality of two-dimensional images in units of frames;
relation-based compressing and decompressing units for subjecting said plurality of two-dimensional images stored in the frame buffer to relation-based compression.

46. The multi-viewpoint image processing device as claimed in claim 43, further comprising synthesizing means for obtaining synthesized data by sequentially arraying compressed data obtained by compression in said compressing and decompressing means, attaching a header to the synthesized data, and outputting the synthesized data.

47. The multi-viewpoint image processing device as claimed in claim 46, further comprising reproduction control means for reproducing the synthesized data containing the header in a reverse direction.

48. The multi-viewpoint image processing device as claimed in claim 43, further comprising:
viewer position detecting means for detecting a position of a viewer; and
image selection means for selecting two-dimensional images observable by a viewer from said plurality of two-dimensional images, in accordance with the position of the viewer detected by said viewer position detecting means.

* * * * *